United States Patent
Noda et al.

(10) Patent No.: US 12,287,467 B2
(45) Date of Patent: Apr. 29, 2025

(54) ZOOM LENS AND IMAGING APPARATUS

(71) Applicant: FUJIFILM Corporation, Tokyo (JP)

(72) Inventors: Taiga Noda, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 385 days.

(21) Appl. No.: 17/817,299

(22) Filed: Aug. 3, 2022

(65) Prior Publication Data
US 2022/0390724 A1    Dec. 8, 2022

Related U.S. Application Data

(63) Continuation of application No. 16/984,256, filed on Aug. 4, 2020, now Pat. No. 11,454,789.

(30) Foreign Application Priority Data

Aug. 16, 2019    (JP) .................... 2019-149424

(51) Int. Cl.
*G02B 15/14*    (2006.01)
*G02B 13/18*    (2006.01)
(Continued)

(52) U.S. Cl.
CPC ......... *G02B 15/1451* (2019.08); *G02B 13/18* (2013.01); *G02B 15/145105* (2019.08);
(Continued)

(58) Field of Classification Search
CPC ........ G02B 15/1451; G02B 15/145105; G02B 15/45121; G02B 15/20; G02B 15/16; G02B 27/646; G02B 13/18
See application file for complete search history.

(56) References Cited

U.S. PATENT DOCUMENTS

2013/0335617 A1    12/2013    Imaoka et al.
2014/0347524 A1    11/2014    Iwasawa
(Continued)

FOREIGN PATENT DOCUMENTS

CN    104181682 A    12/2014
JP    2014-016601 A    1/2014
(Continued)

OTHER PUBLICATIONS

An Office Action; "Notice of Reasons for Refusal", mailed by the Japanese Patent Office on May 31, 2022, which corresponds to Japanese Patent Application No. 2019-149424 and is related to U.S. Appl. No. 16/984,256 with English language translation.
(Continued)

*Primary Examiner* — Wyatt A Stoffa
*Assistant Examiner* — Alex Park Rickel
(74) *Attorney, Agent, or Firm* — Studebaker Brackett PLLC

(57) ABSTRACT

A zoom lens includes a positive first lens group, a negative second lens group, a positive third lens group, and a subsequent group consisting of plural lens groups in order from an object side. In a case of zooming, an interval with an adjacent lens group is changed. The third lens group includes two uncemented positive lenses consecutively arranged in order from a side closest to the object side to an image side. A lens group closest to the image side in the subsequent group consists of a negative meniscus lens having a concave surface toward the object side and a positive lens having a convex surface toward the object side in order from the object side to the image side.

20 Claims, 39 Drawing Sheets

(51) Int. Cl.
*G02B 15/20* (2006.01)
*G02B 27/64* (2006.01)

(52) U.S. Cl.
CPC ..... *G02B 15/145121* (2019.08); *G02B 15/20* (2013.01); *G02B 27/646* (2013.01)

(56) References Cited

U.S. PATENT DOCUMENTS

| | | |
|---|---|---|
| 2014/0347545 A1 | 11/2014 | Obikane |
| 2014/0347546 A1 | 11/2014 | Obikane |
| 2019/0361210 A1 | 11/2019 | Machida |
| 2019/0377168 A1* | 12/2019 | Umeda .......... G02B 15/145121 |
| 2019/0384043 A1* | 12/2019 | Machida ........ G02B 15/144105 |
| 2020/0174269 A1 | 6/2020 | Sudoh et al. |
| 2020/0233190 A1 | 7/2020 | Suzuki et al. |

FOREIGN PATENT DOCUMENTS

| | | |
|---|---|---|
| JP | 2014-228721 A | 12/2014 |
| JP | 2014-228808 A | 12/2014 |
| JP | 2017-146588 A | 8/2017 |
| JP | 2019-211527 A | 12/2019 |
| JP | 2020-086357 A | 6/2020 |
| JP | 2020-118738 A | 8/2020 |
| WO | 2018/092292 A1 | 5/2018 |

OTHER PUBLICATIONS

An Office Action mailed by China National Intellectual Property Administration on Jul. 29, 2023, which corresponds to Chinese Patent Application No. 202010809905.9 and is related to U.S. Appl. No. 17/817,299; with English language translation.

* cited by examiner

EXAMPLE 1

EXAMPLE 1

EXAMPLE 1

EXAMPLE 2

EXAMPLE 2

EXAMPLE 3

EXAMPLE 3

EXAMPLE 4

EXAMPLE 4

EXAMPLE 5

EXAMPLE 5

EXAMPLE 6

EXAMPLE 6

EXAMPLE 7

EXAMPLE 7

EXAMPLE 8

EXAMPLE 8

EXAMPLE 9

EXAMPLE 9

EXAMPLE 10

EXAMPLE 10

EXAMPLE 11

EXAMPLE 11

EXAMPLE 12

EXAMPLE 12

EXAMPLE 13

EXAMPLE 13

EXAMPLE 14

EXAMPLE 14

EXAMPLE 15

EXAMPLE 15

EXAMPLE 16

EXAMPLE 16

EXAMPLE 17

EXAMPLE 17

EXAMPLE 18

EXAMPLE 18

ZOOM LENS AND IMAGING APPARATUS

CROSS-REFERENCE TO RELATED APPLICATIONS

The present application is a Continuation of U.S. patent application Ser. No. 16/984,256 filed on Aug. 4, 2020, which claims priority under 35 U.S.C. § 119 to Japanese Patent Application No. 2019-149424, filed on Aug. 16, 2019. The above application is hereby expressly incorporated by reference, in its entirety, into the present application.

BACKGROUND OF THE INVENTION

1. Field of the Invention

The present disclosure relates to a zoom lens and an imaging apparatus.

2. Description of the Related Art

In the related art, for example, a zoom lens having a five-group configuration as disclosed in JP2014-228808A and JP2014-228721A has been known as a lens system applicable to an imaging apparatus such as a digital camera. JP2014-228808A discloses a zoom lens comprising, in order from an object side, a first lens group having a positive refractive power, a second lens group having a negative refractive power, a third lens group having a positive refractive power, a fourth lens group having a negative refractive power, and a fifth lens group having a negative refractive power. JP2014-228721A discloses a zoom lens comprising, in order from the object side, a first lens group having a positive refractive power, a second lens group having a negative refractive power, a positive C lens group having a positive refractive power, a negative A lens group having a negative refractive power, and a negative B lens group having a negative refractive power.

SUMMARY OF THE INVENTION

The zoom lens is required to have an ability to acquire a favorable image having a small change in various types of aberration in the case of zooming while having a high magnification. Meanwhile, the zoom lens is required to be configurable in a small size along with size reduction of the imaging apparatus.

However, the zoom lens disclosed in JP2014-228808A is not said to have a sufficiently high magnification or is not said to sufficiently suppress a change in various types of aberration in the case of the zooming. In the zoom lens disclosed in JP2014-228721A, there is room for improvement in size reduction.

The present disclosure is conceived in view of the above matter. An aim of the present disclosure is to provide a zoom lens that suppresses a change in various types of aberration in a case of zooming while having a high magnification and has a reduced size and favorable optical performance, and an imaging apparatus comprising the zoom lens.

A zoom lens according to one embodiment of the present disclosure comprises only five lens groups consisting of a first lens group having a positive refractive power, a second lens group having a negative refractive power, a third lens group having a positive refractive power, a fourth lens group having a negative refractive power, and a fifth lens group in order from an object side to an image side as lens groups. In a case of zooming from a wide angle end to a telephoto end, an interval between the first lens group and the second lens group is increased, an interval between the second lens group and the third lens group is changed, an interval between the third lens group and the fourth lens group is changed, and an interval between the fourth lens group and the fifth lens group is changed, the third lens group includes two positive lenses consecutively arranged in order from a side closest to the object side to the image side, and the fifth lens group consists of a negative meniscus lens having a concave surface toward the object side and a positive lens having a convex surface toward the object side in order from the object side to the image side.

In the zoom lens of the embodiment, it is preferable that the fourth lens group is moved along an optical axis in a case of focusing.

In the zoom lens of the embodiment, it is preferable that the first lens group at the telephoto end is positioned on the object side from the first lens group at the wide angle end.

In the zoom lens of the embodiment, it is preferable that a stop is arranged between a surface of the second lens group closest to the image side and a surface of the third lens group closest to the image side. In this case, it is preferable that a lens of the third lens group closest to the image side is a biconvex lens, and the biconvex lens of the third lens group closest to the image side is moved in a direction intersecting with an optical axis in a case of image shake correction.

In the zoom lens of the embodiment, it is preferable that in the case of the zooming from the wide angle end to the telephoto end, the third lens group and the fifth lens group are moved as a single unit.

In the zoom lens of the embodiment, it is preferable that a lens of the third lens group closest to the image side is configured to be moved in a direction intersecting with an optical axis in a case of image shake correction, and in a case where a lateral magnification of the fourth lens group at the wide angle end in a state where an object at infinity is focused is denoted by $\beta 4w$, and a lateral magnification of the fourth lens group at the telephoto end in a state where the object at infinity is focused is denoted by $\beta 4t$, Conditional Expression (1) is satisfied, which is represented by $$1.45 < \beta 4t/\beta 4w < 2 \tag{1}.$$

In the zoom lens of the embodiment, it is preferable that in a case where a focal length of the third lens group is denoted by f3, and a focal length of the fifth lens group is denoted by f5, Conditional Expression (2) is satisfied, which is represented by $$-0.05 < f3/f5 < 0.3 \tag{2}.$$

In the zoom lens of the embodiment, it is preferable that the fourth lens group is configured to be moved along an optical axis in a case of focusing, and in a case where a lateral magnification of the fourth lens group at the wide angle end in a state where an object at infinity is focused is denoted by $\beta 4w$, and a lateral magnification of the fifth lens group at the wide angle end in a state where the object at infinity is focused is denoted by $\beta 5w$, Conditional Expression (3) is satisfied, which is represented by $$-3 < (1-\beta 4w^2) \times \beta 5w^2 < -2 \tag{3}.$$

In the zoom lens of the embodiment, it is preferable that the fourth lens group is configured to be moved along an optical axis in a case of focusing, and in a case where a lateral magnification of the fourth lens group at the telephoto end in a state where an object at infinity is focused is denoted by $\beta 4t$, and a lateral magnification of the fifth lens group at the telephoto end in a state where the object at infinity is focused is denoted by β5t, Conditional Expression (4) is satisfied, which is represented by $$-10<(1-\beta 4t^2)\times\beta 5t^2<-7 \quad (4).$$

In the zoom lens of the embodiment, it is preferable that a lens of the third lens group closest to the image side is configured to be moved in a direction intersecting with an optical axis in a case of image shake correction, and in a case where a lateral magnification of the lens of the third lens group closest to the image side at the wide angle end in a state where an object at infinity is focused is denoted by βisw, and a combined lateral magnification of all lens groups on the image side from the third lens group at the wide angle end in a state where the object at infinity is focused is denoted by βrw, Conditional Expression (5) is satisfied, which is represented by $$1.8<(1-\beta isw)\times\beta rw<2.5 \quad (5).$$

In the zoom lens of the embodiment, it is preferable that a lens of the third lens group closest to the image side is configured to be moved in a direction intersecting with an optical axis in a case of image shake correction, and in a case where a lateral magnification of the lens of the third lens group closest to the image side at the telephoto end in a state where an object at infinity is focused is denoted by βist, and a combined lateral magnification of all lens groups on the image side from the third lens group at the telephoto end in a state where the object at infinity is focused is denoted by βrt, Conditional Expression (6) is satisfied, which is represented by $$3.8<(1-\beta ist)\times\beta rt<5 \quad (6).$$

In the zoom lens of the embodiment, it is preferable that a lens of the third lens group closest to the image side is configured to be moved in a direction intersecting with an optical axis in a case of image shake correction, and in a case where a lateral magnification of the lens of the third lens group closest to the image side at the wide angle end in a state where an object at infinity is focused is denoted by βisw, a combined lateral magnification of all lens groups on the image side from the third lens group at the wide angle end in a state where the object at infinity is focused is denoted by βrw, a lateral magnification of the lens of the third lens group closest to the image side at the telephoto end in a state where the object at infinity is focused is denoted by βist, and a combined lateral magnification of all lens groups on the image side from the third lens group at the telephoto end in a state where the object at infinity is focused is denoted by βrt, Conditional Expression (7) is satisfied, which is represented by $$1.5<\{(1-\beta ist)\times\beta rt\}/\{(1-\beta isw)\times\beta rw\}<2.4 \quad (7).$$

In the zoom lens of the embodiment, it is preferable that in a case where a lateral magnification of the second lens group at the wide angle end in a state where an object at infinity is focused is denoted by β2w, and a lateral magnification of the second lens group at the telephoto end in a state where the object at infinity is focused is denoted by β2t, Conditional Expression (8) is satisfied, which is represented by $$3.5<\beta 2t/\beta 2w<5 \quad (8).$$

In the zoom lens of the embodiment, it is preferable that in a case where a lateral magnification of the third lens group at the wide angle end in a state where an object at infinity is focused is denoted by 133w, and a lateral magnification of the third lens group at the telephoto end in a state where the object at infinity is focused is denoted by β3t, Conditional Expression (9) is satisfied, which is represented by $$1.4<\beta 3t/\beta 3w<2 \quad (9).$$

In the zoom lens of the embodiment, it is preferable that in a case where a lateral magnification of the second lens group at the wide angle end in a state where an object at infinity is focused is denoted by β2w, a lateral magnification of the second lens group at the telephoto end in a state where the object at infinity is focused is denoted by β2t, a lateral magnification of the third lens group at the wide angle end in a state where the object at infinity is focused is denoted by β3w, and a lateral magnification of the third lens group at the telephoto end in a state where the object at infinity is focused is denoted by β3t, Conditional Expression (10) is satisfied, which is represented by $$2<(\beta 2t/\beta 2w)/(\beta 3t/\beta 3w)<3 \quad (10).$$

In the zoom lens of the embodiment, it is preferable that the fourth lens group is configured to be moved along an optical axis in a case of focusing, and in a case where a lateral magnification of the third lens group at the wide angle end in a state where an object at infinity is focused is denoted by β3w, a lateral magnification of the third lens group at the telephoto end in a state where the object at infinity is focused is denoted by β3t, a lateral magnification of the fourth lens group at the wide angle end in a state where the object at infinity is focused is denoted by β4w, and a lateral magnification of the fourth lens group at the telephoto end in a state where the object at infinity is focused is denoted by β4t, Conditional Expression (11) is satisfied, which is represented by $$0.8<(\beta 3t/\beta 3w)/(\beta 4t/\beta 4w)<1.2 \quad (11).$$

In the zoom lens of the embodiment, it is preferable that the fourth lens group is moved along an optical axis in a case of focusing, and in a case where a lateral magnification of the fourth lens group at the wide angle end in a state where an object at infinity is focused is denoted by β4w, a lateral magnification of the fourth lens group at the telephoto end in a state where the object at infinity is focused is denoted by β4t, a lateral magnification of the fifth lens group at the wide angle end in a state where the object at infinity is focused is denoted by β5w, and a lateral magnification of the fifth lens group at the telephoto end in a state where the object at infinity is focused is denoted by β5t, Conditional Expression (12) is satisfied, which is represented by $$2.5<\{(1-\beta 4t^2)\times\beta 5t^2\}/\{(1-\beta 4w^2)\times\beta 5w^2\}<3.5 \quad (12).$$

An imaging apparatus according to another embodiment of the present disclosure comprises the zoom lens according to the embodiment of the present disclosure.

In the present specification, "consist of" or "consisting of" means that a lens that substantially does not have a refractive power, and optical elements such as a stop, a filter, and a cover glass other than a lens, mechanism parts such as a lens flange, a lens barrel, an imaging element, and a camera shake correction mechanism, and the like may be included besides illustrated constituents.

In the present specification, a "~ group having a positive refractive power" means that the entire group has a positive refractive power. Similarly, a "~ group having a negative refractive power" means that the entire group has a negative refractive power. A "lens having a positive refractive power" and a "positive lens" have the same meaning. A "lens having a negative refractive power" and a "negative lens" have the same meaning. A "~ lens group" is not limited to a configuration consisting of a plurality of lenses and may be configured to consist of only one lens.

A compound aspherical lens (a lens in which a spherical lens and a film of an aspherical shape formed on the spherical lens are configured as a single unit and function as one aspherical lens as a whole) is not regarded as a cemented lens and is handled as one lens. The sign of a refractive power and a surface shape related to a lens including an aspherical surface are considered in a paraxial region unless otherwise specified.

The "focal length" used in the conditional expressions is a paraxial focal length. Unless otherwise specified, the values used in the conditional expressions are values in a case based on d line in a state where the object at infinity is focused. In the present specification, "d line", "C line", "F line", and "g line" are bright lines. The wavelength of d line is 587.56 nanometers (nm). The wavelength of C line is 656.27 nanometers (nm). The wavelength of F line is 486.13 nanometers (nm). The wavelength of g line is 435.84 nanometers (nm). A partial dispersion ratio θgF of a certain lens between g line and F line is defined as θgF=(Ng−NF)/(NF−NC) in a case where the refractive indexes of the lens with respect to g line, F line, and C line are denoted by Ng, NF, and NC, respectively.

According to the present disclosure, a zoom lens that suppresses a change in various types of aberration in a case of zooming while having a high magnification and has a reduced size and favorable optical performance, and an imaging apparatus comprising the zoom lens can be provided.

DESCRIPTION OF THE PREFERRED EMBODIMENTS

Figure 1:
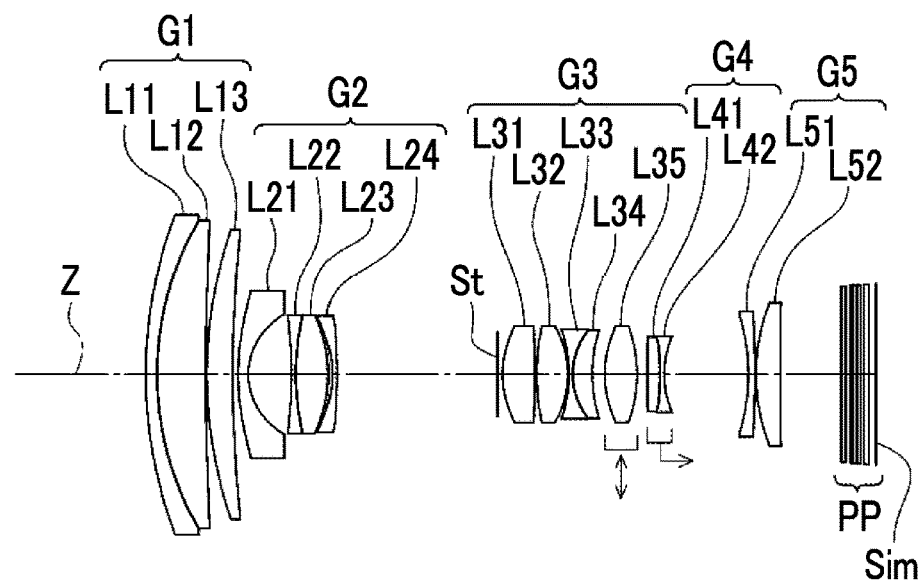
FIG. 1 is a diagram corresponding to a zoom lens of Example 1 of the present disclosure and illustrating a cross-sectional view of a configuration and a movement trajectory of a zoom lens according to one embodiment of the present disclosure.
Figure 2:
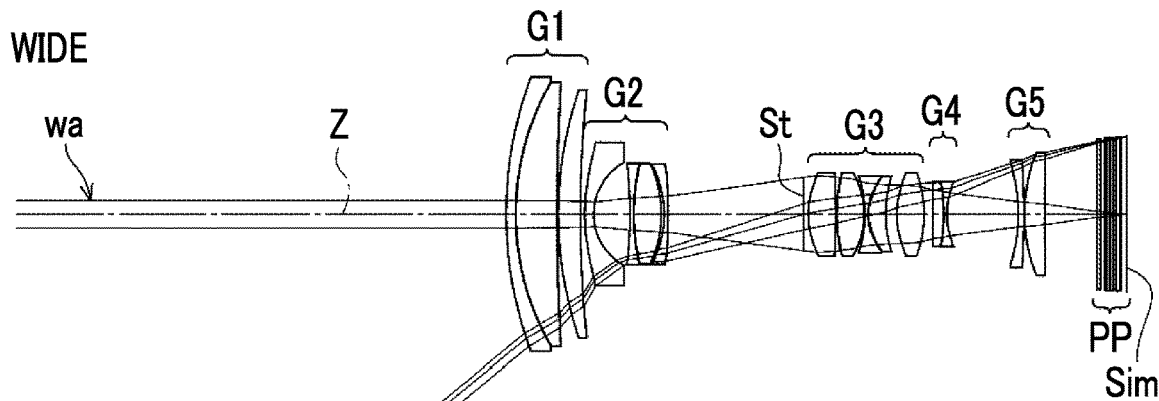
FIG. 2 is a cross-sectional view illustrating a configuration and luminous flux in each zooming state of the zoom lens in FIG. 1.
Figure 2:
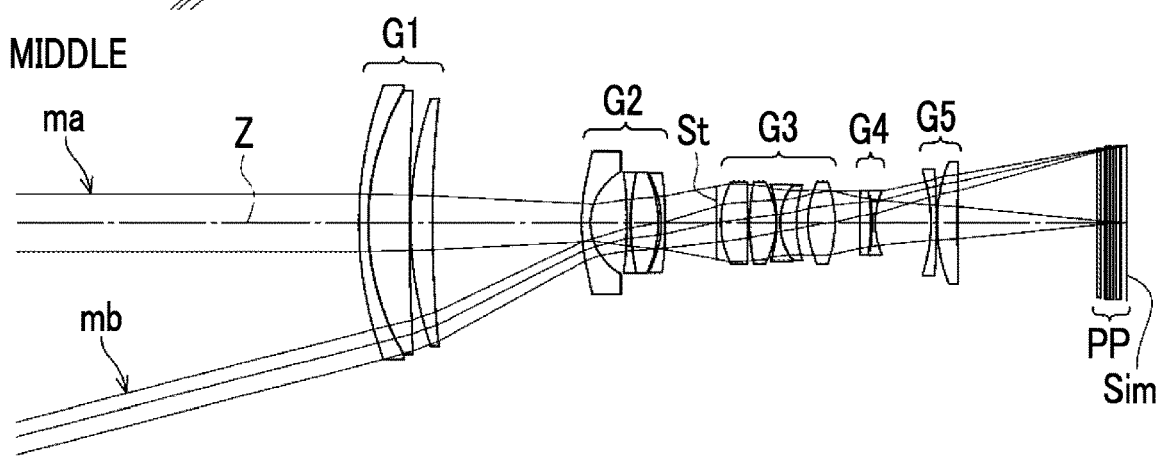
Figure 2:
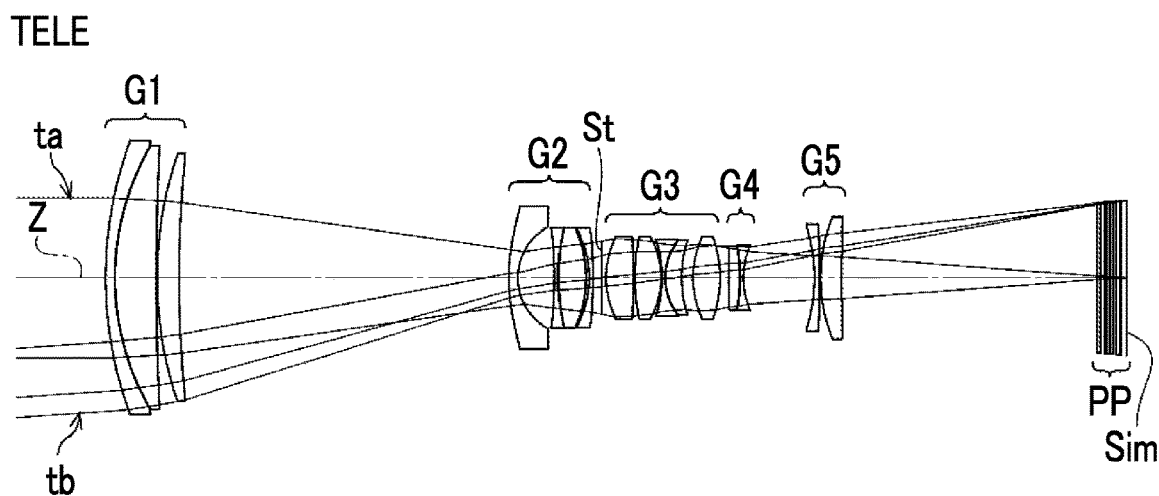

Hereinafter, an embodiment of the present disclosure will be described in detail with reference to the drawings. FIG. 1 illustrates a cross-sectional view of a configuration and a movement trajectory at a wide angle end of a zoom lens according to one embodiment of the present disclosure. FIG. 2 illustrates a cross-sectional view of a configuration and luminous flux in each zooming state of the zoom lens. Examples illustrated in FIG. 1 and FIG. 2 correspond to a zoom lens of Example 1 described later. In FIG. 1 and FIG. 2, a state where an object at infinity is focused is illustrated. A left side is an object side, and a right side is an image side. In FIG. 2, a wide angle end state is illustrated in an upper part denoted by "WIDE", a middle focal length state is illustrated in a middle part denoted by "MIDDLE", and a telephoto end state is illustrated in a lower part denoted by "TELE". In FIG. 2, axial luminous flux wa and luminous flux wb of the maximum angle of view in the wide angle end state, axial luminous flux ma and luminous flux mb of the maximum angle of view in the middle focal length state, and axial luminous flux ta and luminous flux tb of the maximum angle of view in the telephoto end state are illustrated as luminous flux.

In FIG. 1 and FIG. 2, an example in which an optical member PP having a parallel plate shape is arranged on the image side of the zoom lens is illustrated by assuming application of the zoom lens to an imaging apparatus. The optical member PP is a member that is assumed to correspond to various filters and/or a cover glass or the like. For example, the various filters include a low-pass filter, an infrared cut filter, and a filter cutting a specific wavelength range. The optical member PP is a member not having a refractive power, and the optical member PP can be configured not to be included.

The zoom lens according to the embodiment of the present disclosure comprises only five lens groups consisting of a first lens group G1 having a positive refractive power, a second lens group G2 having a negative refractive power, a third lens group G3 having a positive refractive power, a fourth lens group G4 having a negative refractive power, and a fifth lens group G5 as lens groups in order from the object side to the image side along an optical axis Z. By setting the first lens group G1 that is closest to the object side as a lens group having a positive refractive power, the total length of a lens system is easily reduced, and an advantage of size reduction is achieved. In the zoom lens according to the embodiment of the present disclosure, in the case of zooming from a wide angle end to a telephoto end, an interval between the first lens group G1 and the second lens group G2 is increased, and an interval between the second lens group G2 and the third lens group G3 is changed. An interval between the third lens group G3 and the fourth lens group G4 is changed, and an interval between the fourth lens group G4 and the fifth lens group G5 is changed. Employing the above configuration by setting the lens system as a five-group configuration zoom lens results in a configuration appropriate for achieving a high magnification.

For example, in the zoom lens illustrated in FIG. 1, the first lens group G1 consists of three lenses of lenses L11 to L13 in order from the object side to the image side. The second lens group G2 consists of four lenses of lenses L21 to L24 in order from the object side to the image side. The third lens group G3 consists of five lenses of lenses L31 to L35 in order from the object side to the image side. The fourth lens group G4 consists of two lenses of lenses L41 and L42 in order from the object side to the image side. The fifth lens group G5 consists of two lenses of lenses L51 and L52 in order from the object side to the image side.

In the example illustrated in FIG. 1, in the case of the zooming from the wide angle end to the telephoto end, the interval between the first lens group G1 and the second lens group G2 is increased at all times, and the interval between the second lens group G2 and the third lens group G3 is decreased at all times. In addition, in the example illustrated in FIG. 1, all lens groups are moved along the optical axis Z in the case of the zooming. By moving all lens groups in the case of the zooming, an advantage of suppressing a change in aberration in the case of zooming is achieved. In FIG. 1, a cross-sectional view of the configuration of each lens group is illustrated in an upper part, and a schematic movement trajectory of each lens group in the case of the zooming from the wide angle end to the telephoto end is illustrated in a lower part by a curved arrow.

It is preferable to configure the first lens group G1 such that the position of the first lens group G1 at the telephoto end is on the object side from the position of the first lens group G1 at the wide angle end. Such a case results in a configuration suitable for achieving a high magnification. Here, the "position" is a position in an optical axis direction based on an image plane Sim.

In the case of the zooming from the wide angle end to the telephoto end, it is preferable that the third lens group G3 and the fifth lens group G5 are moved as a single unit. In such a case, a mechanism of a barrel cam used for driving a lens group is simplified. Accordingly, the outer diameter of a lens barrel can be reduced. In the example illustrated in FIG. 1, in the case of the zooming from the wide angle end to the telephoto end, it is configured that the third lens group G3 and the fifth lens group G5 are moved to the object side as a single unit. Here, "moved as a single unit" means movement by the same amount in the same direction at the same time.

The third lens group G3 is configured to include two positive lenses that are consecutively arranged in order from a side closest to the object side to the image side. By having this configuration, spherical aberration is easily suppressed, and a change in spherical aberration in the case of the zooming is easily suppressed. In addition, an advantage of achieving a high magnification is achieved. In addition, by consecutively arranging two positive lenses from the side of the third lens group G3 which is closest to the object side and on which luminous flux from the second lens group G2 having a diverging effect is incident, the diameter of luminous flux on the image side from the two positive lenses can be decreased, and an advantage of size reduction is achieved.

The fifth lens group G5 is configured to consist of a negative meniscus lens having a concave surface toward the object side and a positive lens having a convex surface toward the object side in order from the object side to the image side. By arranging a lens having a negative refractive power on the object side in the fifth lens group G5, a change in lateral chromatic aberration in the case of the zooming is suppressed. In addition, by forming this lens in a meniscus shape having a concave surface toward the object side, occurrence of astigmatism is suppressed. As illustrated in FIG. 2, as a principal ray that has the maximum angle of view and is directed toward the image plane Sim from the fifth lens group G5 approaches the image plane Sim, the height of the ray is increased. That is, an inclination angle is formed with respect to the optical axis Z. In such a configuration, by arranging a positive lens having a convex surface toward the object side on a side of the zoom lens closest to the image side, the incidence angle of the principal ray having a peripheral angle of view on the image plane Sim can be further decreased. In addition, as illustrated in FIG. 2, the height of the principal ray having the maximum angle of view in the lens on the side of the zoom lens closest to the image side is changed depending on a zooming state such that the height is greater at the wide angle end than at the telephoto end. By arranging a positive lens having a convex surface toward the object side on the side of the zoom lens closest to the image side, a change in incidence angle of the principal ray having the peripheral angle of view with respect to the image plane Sim in the case of the zooming is easily suppressed using a change in height of the principal ray caused by the zooming state.

In a case where the focal length of the third lens group G3 is denoted by f3 and the focal length of the fifth lens group G5 is denoted by f5, it is preferable that the zoom lens satisfies Conditional Expression (2) below. By setting a corresponding value of Conditional Expression (2) not to be below a lower limit, an advantage of securing a back focus at the wide angle end while implementing a high magnification is achieved. By setting the corresponding value of Conditional Expression (2) not to be above an upper limit, the position of a principal point on the image side can be brought to the object side. Thus, an advantage of reduction of the total length of the lens system is achieved. Furthermore, in a case where it is configured that Conditional Expression (2-1) below is satisfied, more favorable characteristics can be achieved.

$$-0.05 < f3/f5 < 0.3 \quad (2)$$

$$-0.03 < f3/f5 < 0.2 \quad (2\text{-}1)$$

It is preferable that an aperture stop St is arranged between the surface of the second lens group G2 closest to the image side and the surface of the third lens group G3 closest to the image side. By arranging the aperture stop St near the third lens group G3, occurrence of astigmatism can be suppressed by decreasing the height of the principal ray in the third lens group G3. By arranging the aperture stop St in the above range, the effective diameter of the third lens group G3 can be decreased compared to the effective diameter in a case where the aperture stop St is arranged on the object side from the surface of the second lens group G2 closest to the image side, and the height of the principal ray in the third lens group G3 can be decreased. In addition, by arranging the aperture stop St in the above range, the effective diameter of the first lens group G1 can be decreased compared to the effective diameter in a case where the aperture stop St is arranged on the image side from the surface of the third lens group G3 closest to the image side. The diameter of the lens of the first lens group G1 closest to the object side is likely to be increased. Thus, by decreasing the diameter of the first lens group G1, a significant effect is achieved in weight reduction of the zoom lens. In the example illustrated in FIG. 1, the aperture stop St is arranged between the second lens group G2 and the third lens group G3.

In a case where the aperture stop St is arranged between the surface of the second lens group G2 closest to the image side and the surface of the third lens group G3 closest to the image side, it is preferable that image shake correction is performed by moving the lens of the third lens group G3 closest to the image side. That is, it is preferable that a lens group (hereinafter, referred to as a vibration proof lens group) moving in a direction intersecting with the optical axis Z in the case of the image shake correction consists of the lens of the third lens group G3 closest to the image side. The ray height of the principal ray in the third lens group G3 near the aperture stop St is likely to be relatively decreased. Thus, in a case where the vibration proof lens group is composed of the lens of the third lens group G3, a change in aberration in the case of the image shake correction is easily suppressed. In addition, an advantage of favorably maintaining image shake correction performance in the entire zooming range is achieved. Furthermore, in a case where the vibration proof lens group is configured to consist of the lens of the third lens group G3 closest to the image side, an interval for avoiding interference between the vibration proof lens group and a lens adjacent thereto is easily secured in a case where the vibration proof lens group is moved for the image shake correction. Hereinafter, the image shake correction will be referred to as vibration proofing.

In a case where the lens of the third lens group G3 closest to the image side is a biconvex lens as in the example illustrated in FIG. 1, a refractive power can be distributed between a surface on the object side and a surface on the image side. Thus, in a case where the vibration proof lens group is configured to consist of the lens of the third lens group G3 closest to the image side, a change in aberration in the case of the image shake correction is easily suppressed. In addition, an advantage of favorably maintaining the image shake correction performance in the entire zooming range is achieved. A bidirectional arrow of a vertical direction shown below the lens L35 in FIG. 1 indicates that the lens L35 is the vibration proof lens group.

In the configuration in which the vibration proof lens group consists of the lens of the third lens group G3 closest to the image side, in a case where a lateral magnification of the fourth lens group G4 at the wide angle end in a state where an object at infinity is focused is denoted by β4w and the lateral magnification of the fourth lens group G4 at the telephoto end in a state where the object at infinity is focused is denoted by β4t, it is preferable to satisfy Conditional Expression (1) below. Generally, at least the second lens group G2 and the third lens group G3 exhibit a zooming effect in the five-group configuration zoom lens having the refractive power arrangement in the present disclosure. However, by setting the corresponding value of Conditional Expression (1) not to be below the lower limit, a significant amount of the zooming effect can also be distributed to the fourth lens group G4. Thus, since the zooming effect is easily distributed to multiple lens groups, a change in various types of aberration in the case of the zooming is easily suppressed. Consequently, an advantage of achieving a high magnification is achieved. By setting the corresponding value of Conditional Expression (1) not to be above the upper limit, an excessive increase in the ratio of a movement amount of the image in the image plane Sim per movement amount of the vibration proof lens group at the wide angle end and the movement amount of the image in the image plane Sim per movement amount of the vibration proof lens group at the telephoto end can be suppressed, and it is possible to avoid a difficulty in control of the vibration proofing. Furthermore, in a case where it is configured that Conditional Expression (1-1) below is satisfied, more favorable characteristics can be achieved.

$$1.45 < \beta 4t/\beta 4w < 2 \quad (1)$$

$$1.5 < \beta 4t/\beta 4w < 1.9 \quad (1\text{-}1)$$

In the configuration in which the vibration proof lens group consists of the lens of the third lens group G3 closest to the image side, in a case where the lateral magnification of the lens of the third lens group G3 closest to the image side at the wide angle end in a state where the object at infinity is focused is denoted by $\beta isw$ and a combined lateral magnification of all lens groups on the image side from the third lens group G3 at the wide angle end in a state where the object at infinity is focused is denoted by $\beta rw$, it is preferable to satisfy Conditional Expression (5) below. By setting the corresponding value of Conditional Expression (5) not to be below the lower limit, the movement amount of the vibration proof lens group in the case of the image shake correction on a wide angle side can be reduced. By setting the corresponding value of Conditional Expression (5) not to be above the upper limit, an excessive increase in sensitivity of the vibration proofing on the wide angle side can be suppressed. Furthermore, in a case where it is configured that Conditional Expression (5-1) below is satisfied, more favorable characteristics can be achieved.

$$1.8 < (1-\beta isw) \times \beta rw < 2.5 \quad (5)$$

$$1.9 < (1-\beta isw) \times \beta rw < 2.2 \quad (5\text{-}1)$$

In the configuration in which the vibration proof lens group consists of the lens of the third lens group G3 closest to the image side, in a case where the lateral magnification of the lens of the third lens group G3 closest to the image side at the telephoto end in a state where the object at infinity is focused is denoted by $\beta ist$ and the combined lateral magnification of all lens groups on the image side from the third lens group G3 at the telephoto end in a state where the object at infinity is focused is denoted by $\beta rt$, it is preferable to satisfy Conditional Expression (6) below. By setting the corresponding value of Conditional Expression (6) not to be below the lower limit, the movement amount of the vibration proof lens group in the case of the image shake correction on a telephoto side can be reduced. By setting the corresponding value of Conditional Expression (6) not to be above the upper limit, an excessive increase in sensitivity of the vibration proofing on the telephoto side can be suppressed. Furthermore, in a case where it is configured that Conditional Expression (6-1) below is satisfied, more favorable characteristics can be achieved.

$$3.8 < (1-\beta ist) \times \beta rt < 5 \quad (6)$$

$$4 < (1-\beta ist) \times \beta rt < 4.5 \quad (6\text{-}1)$$

In the configuration in which the vibration proof lens group consists of the lens of the third lens group G3 closest to the image side, in a case where the lateral magnification of the lens of the third lens group G3 closest to the image side at the wide angle end in a state where the object at infinity is focused is denoted by $\beta isw$, the combined lateral magnification of all lens groups on the image side from the third lens group G3 at the wide angle end in a state where the object at infinity is focused is denoted by $\beta rw$, the lateral magnification of the lens of the third lens group G3 closest to the image side at the telephoto end in a state where the object at infinity is focused is denoted by $\beta ist$, and the combined lateral magnification of all lens groups on the image side from the third lens group G3 at the telephoto end in a state where the object at infinity is focused is denoted by $\beta rt$, it is preferable to satisfy Conditional Expression (7) below. By setting the corresponding value of Conditional Expression (7) not to be below the lower limit, the movement amount of the vibration proof lens group per vibration proofing angle on the wide angle side can be approximated to the movement amount of the vibration proof lens group vibration proofing angle on the telephoto side. Thus, the vibration proofing is easily controlled. The "vibration proofing angle" is a correction angle of an image shake that can be corrected by moving the vibration proof lens group. By setting the corresponding value of Conditional Expression (7) not to be above the upper limit, an excessive increase in the ratio of the movement amount of the image in the image plane Sim per movement amount of the vibration proof lens group at the wide angle end and the movement amount of the image in the image plane Sim per movement amount of the vibration proof lens group at the telephoto end can be suppressed, and it is possible to avoid a difficulty in control of the vibration proofing. Furthermore, in a case where it is configured that Conditional Expression (7-1) below is satisfied, more favorable characteristics can be achieved.

$$1.5 < \{(1-\beta ist) \times \beta rt\}/\{(1-\beta isw) \times \beta rw\} < 2.4 \quad (7)$$

$$1.7 < \{(1-\beta ist) \times \beta rt\}/\{(1-\beta isw) \times \beta rw\} < 2.2 \quad (7\text{-}1)$$

In a case where the lateral magnification of the second lens group G2 at the wide angle end in a state where the object at infinity is focused is denoted by $\beta 2w$ and the lateral magnification of the second lens group G2 at the telephoto end in a state where the object at infinity is focused is denoted by $\beta 2t$, it is preferable to satisfy Conditional Expression (8) below. By setting the corresponding value of Conditional Expression (8) not to be below the lower limit, an advantage of achieving a high magnification is achieved. By setting the corresponding value of Conditional Expression (8) not to be above the upper limit, an advantage of suppressing a change in various types of aberration, particularly, a change in distortion, in the case of the zooming is achieved. Furthermore, in a case where it is configured that Conditional Expression (8-1) below is satisfied, more favorable characteristics can be achieved.

$$3.5 < \beta 2t/\beta 2w < 5 \quad (8)$$

$$3.7 < \beta 2t/\beta 2w < 4.5 \quad (8\text{-}1)$$

In a case where the lateral magnification of the third lens group G3 at the wide angle end in a state where the object at infinity is focused is denoted by $\beta 3w$ and the lateral magnification of the third lens group G3 at the telephoto end in a state where the object at infinity is focused is denoted by $\beta 3t$, it is preferable to satisfy Conditional Expression (9) below. By setting the corresponding value of Conditional Expression (9) not to be below the lower limit, an advantage of achieving a high magnification is achieved. By setting the corresponding value of Conditional Expression (9) not to be above the upper limit, an advantage of suppression of the movement amount of the third lens group G3 in the case of the zooming is achieved. Furthermore, in a case where it is configured that Conditional Expression (9-1) below is satisfied, more favorable characteristics can be achieved.

$$1.4 < \beta 3t/\beta 3w < 2 \quad (9)$$

$$1.5 < \beta 3t/\beta 3w < 1.8 \quad (9\text{-}1)$$

In a case where the lateral magnification of the second lens group G2 at the wide angle end in a state where the object at infinity is focused is denoted by $\beta 2w$, the lateral magnification of the second lens group G2 at the telephoto end in a state where the object at infinity is focused is denoted by β2t, the lateral magnification of the third lens group G3 at the wide angle end in a state where the object at infinity is focused is denoted by β3w, and the lateral magnification of the third lens group G3 at the telephoto end in a state where the object at infinity is focused is denoted by β3t, it is preferable to satisfy Conditional Expression (10) below. By setting the corresponding value of Conditional Expression (10) not to be below the lower limit, an advantage of suppressing an increase in total length of the lens system at the telephoto end is achieved. By setting the corresponding value of Conditional Expression (10) not to be above the upper limit, an advantage of suppressing a change in various types of aberration, particularly, a change in distortion, in the case of the zooming is achieved. Furthermore, in a case where it is configured that Conditional Expression (10-1) below is satisfied, more favorable characteristics can be achieved.

$$2 < (\beta 2t/\beta 2w)/(\beta 3t/\beta 3w) < 3 \qquad (10)$$

$$1.2 < (\beta 2t/\beta 2w)/(\beta 3t/\beta 3w) < 2.8 \qquad (10\text{-}1)$$

It is preferable that the zoom lens according to the embodiment of the present disclosure performs focusing by moving the fourth lens group G4. That is, in the case of focusing, it is preferable to configure that a lens group (hereinafter, referred to as a focusing lens group) moving along the optical axis Z is the fourth lens group G4. The third lens group G3 arranged adjacent to the object side of the fourth lens group G4 has a positive refractive power. Thus, the height of the ray incident on the fourth lens group G4 from the third lens group G3 is relatively decreased. Therefore, in a case where the fourth lens group G4 is set as the focusing lens group, the effective diameter of the focusing lens group can be decreased. Thus, the weight of the focusing lens group can be reduced. In the example illustrated in FIG. 1, it is configured that only the fourth lens group G4 is moved to the image side in the case of focusing to an object in a short range from the object at infinity. According to this configuration, not only the weight reduction of the focusing lens group but also an effect of being able to reduce a change in angle of view in the case of the focusing are obtained. A horizontal rightward arrow shown below the fourth lens group G4 in FIG. 1 indicates that the fourth lens group G4 is the focusing lens group and is moved to the image side in the case of the focusing to the object in a short range from the object at infinity.

In the configuration in which the focusing lens group consists of the fourth lens group G4, in a case where the lateral magnification of the fourth lens group G4 at the wide angle end in a state where the object at infinity is focused is denoted by β4w and the lateral magnification of the fifth lens group G5 at the wide angle end in a state where the object at infinity is focused is denoted by β5w, it is preferable to satisfy Conditional Expression (3) below. By setting the corresponding value of Conditional Expression (3) not to be below the lower limit, an excessive increase in movement amount of an image position per movement amount of the focusing lens group on the wide angle side can be suppressed, and focusing accuracy can be increased. By setting the corresponding value of Conditional Expression (3) not to be above the upper limit, the movement amount of the focusing lens group in the case of the focusing on the wide angle side can be suppressed. Furthermore, in a case where it is configured that Conditional Expression (3-1) below is satisfied, more favorable characteristics can be achieved.

$$-3 < (1-\beta 4w^2) \times \beta 5w^2 < -2 \qquad (3)$$

$$-2.8 < (1-\beta 4w^2) \times \beta 5w^2 < -2.4 \qquad (3\text{-}1)$$

In the configuration in which the focusing lens group consists of the fourth lens group G4, in a case where the lateral magnification of the fourth lens group G4 at the telephoto end in a state where the object at infinity is focused is denoted by Mt and the lateral magnification of the fifth lens group G5 at the telephoto end in a state where the object at infinity is focused is denoted by β5t, it is preferable to satisfy Conditional Expression (4) below. By setting the corresponding value of Conditional Expression (4) not to be below the lower limit, an excessive increase in movement amount of the image position per movement amount of the focusing lens group on the telephoto side can be suppressed, and focusing accuracy can be increased. By setting the corresponding value of Conditional Expression (4) not to be above the upper limit, the movement amount of the focusing lens group in the case of the focusing on the telephoto side can be suppressed. Furthermore, in a case where it is configured that Conditional Expression (4-1) below is satisfied, more favorable characteristics can be achieved.

$$-10 < (1-\beta 4t^2) \times \beta 5t^2 < -7 \qquad (4)$$

$$-8.5 < (1-\beta 4t^2) \times \beta 5t^2 < -7.3 \qquad (4\text{-}1)$$

In the configuration in which the focusing lens group consists of the fourth lens group G4, in a case where the lateral magnification of the third lens group G3 at the wide angle end in a state where the object at infinity is focused is denoted by β3w, the lateral magnification of the third lens group G3 at the telephoto end in a state where the object at infinity is focused is denoted by β3t, the lateral magnification of the fourth lens group G4 at the wide angle end in a state where the object at infinity is focused is denoted by β4w, and the lateral magnification of the fourth lens group G4 at the telephoto end in a state where the object at infinity is focused is denoted by β4t, it is preferable to satisfy Conditional Expression (11) below. By setting the corresponding value of Conditional Expression (11) not to be below the lower limit, an excessive increase in movement amount of the image position per movement amount of the focusing lens group can be suppressed, and focusing accuracy can be increased. In addition, an advantage of suppressing an increase in total length of the lens system is achieved. By setting the corresponding value of Conditional Expression (11) not to be above the upper limit, the movement amount of the focusing lens group in the case of the focusing can be suppressed. Furthermore, in a case where it is configured that Conditional Expression (11-1) below is satisfied, more favorable characteristics can be achieved.

$$0.8 < (\beta 3t/\beta 3w)/(\beta 4t/\beta 4w) < 1.2 \qquad (11)$$

$$0.9 < (\beta 3t/\beta 3w)/(\beta 4t/\beta 4w) < 1.1 \qquad (11\text{-}1)$$

In the configuration in which the focusing lens group consists of the fourth lens group G4, in a case where the lateral magnification of the fourth lens group G4 at the wide angle end in a state where the object at infinity is focused is denoted by β4w, the lateral magnification of the fourth lens group G4 at the telephoto end in a state where the object at infinity is focused is denoted by β4t, the lateral magnification of the fifth lens group G5 at the wide angle end in a state where the object at infinity is focused is denoted by β5w, and the lateral magnification of the fifth lens group G5 at the telephoto end in a state where the object at infinity is focused is denoted by β5t, it is preferable to satisfy Conditional Expression (12) below. By setting the corresponding value of Conditional Expression (12) not to be below the lower limit, an increase in the ratio of the movement amount of the focusing lens group per amount of change of an object distance on the wide angle side and the movement amount of the focusing lens group per amount of change of the object distance at the telephoto end can be suppressed in the case of performing the focusing by changing the object distance, and the movement amount of the focusing lens group in the case of the focusing on the telephoto side can be suppressed. By setting the corresponding value of Conditional Expression (12) not to be above the upper limit, an increase in the ratio of the movement amount of the image position per movement amount of the focusing lens group on the wide angle side and the movement amount of the image position per movement amount of the focusing lens group at the telephoto end can be suppressed, and an excessive increase in sensitivity of the focusing on the telephoto side can be suppressed. Thus, the focusing accuracy can be increased. Furthermore, in a case where it is configured that Conditional Expression (12-1) below is satisfied, more favorable characteristics can be achieved.

$$2.5<\{(1-\beta 4t^2)\times\beta 5t^2\}/\{(1-\beta 4w^2)\times\beta 5w^2\}<3.5 \quad (12)$$

$$2.7<\{(1-\beta 4t^2)\times\beta 5t^2\}/\{(1-\beta 4w^2)\times\beta 5w^2\}<3.3 \quad (12\text{-}1)$$

It is preferable that the focusing lens group consists of a cemented lens configured by cementing one positive lens and one negative lens in order from the object side. In such a case, a change in spherical aberration and a change in chromatic aberration in the case of the focusing can be suppressed.

From the above matter, it is preferable that the fourth lens group G4 is configured to consist of one positive lens and one negative lens. In the configuration in which the fourth lens group G4 consists of one positive lens and one negative lens, in a case where a d line-based refractive index of the positive lens of the fourth lens group G4 is denoted by N4p and a d line-based refractive index of the negative lens of the fourth lens group G4 is denoted by N4n, it is preferable to satisfy Conditional Expression (17) below. By setting the corresponding value of Conditional Expression (17) not to be below the lower limit, an advantage of suppressing a change in spherical aberration in the case of the focusing is achieved. By setting the corresponding value of Conditional Expression (17) not to be above the upper limit, an advantage of suppressing a change in astigmatism in the case of the focusing is achieved. Furthermore, in a case where it is configured that Conditional Expression (17-1) below is satisfied, more favorable characteristics can be achieved.

$$0.01<N4p-N4n<0.4 \quad (17)$$

$$0.05<N4p-N4n<0.35 \quad (17\text{-}1)$$

In the configuration in which the fourth lens group G4 consists of one positive lens and one negative lens, in a case where the d line-based Abbe number of the negative lens of the fourth lens group G4 is denoted by ν4n and the d line-based Abbe number of the positive lens of the fourth lens group G4 is denoted by ν4p, it is preferable to satisfy Conditional Expression (18) below. By satisfying Conditional Expression (18), a change in chromatic aberration in the case of the focusing is easily suppressed. Furthermore, in a case where it is configured that Conditional Expression (18-1) below is satisfied, more favorable characteristics can be achieved.

$$20<\nu 4n-\nu 4p<40 \quad (18)$$

$$23.5<\nu 4n-\nu 4p<38 \quad (18\text{-}1)$$

In the configuration of the first lens group G1, in a case where an average value of a d line-based refractive index of all positive lenses of the first lens group G1 is denoted by N1p, it is preferable to satisfy Conditional Expression (13) below. By setting the corresponding value of Conditional Expression (13) not to be below the lower limit, an advantage of suppressing a change in distortion in the case of the zooming is achieved. By setting the corresponding value of Conditional Expression (13) not to be above the upper limit, an advantage of suppressing a change in first-order chromatic aberration in the case of the zooming is achieved. Furthermore, in a case where it is configured that Conditional Expression (13-1) below is satisfied, more favorable characteristics can be achieved.

$$1.48<N1p<1.63 \quad (13)$$

$$1.48<N1p<1.62 \quad (13\text{-}1)$$

In addition, in a case where an average value of the d line-based Abbe number of all positive lens of the first lens group G1 is denoted by ν1p, it is preferable to satisfy Conditional Expression (14) below. By setting the corresponding value of Conditional Expression (14) not to be below the lower limit, an advantage of suppressing a change in first-order chromatic aberration in the case of the zooming is achieved. By setting the corresponding value of Conditional Expression (14) not to be above the upper limit, an excessive decrease in refractive index of the positive lenses of the first lens group G1 can be avoided, and an advantage of suppressing a change in spherical aberration in the case of the zooming is achieved. Furthermore, in a case where it is configured that Conditional Expression (14-1) below is satisfied, more favorable characteristics can be achieved.

$$65<\nu 1p<95 \quad (14)$$

$$67<\nu 1p<90 \quad (14\text{-}1)$$

In a case where an average value of a partial dispersion ratio of all negative lenses of the first lens group G1 between g line and F line is denoted by θ1n and the average value of the partial dispersion ratio of all positive lenses of the first lens group G1 between g line and F line is denoted by θ1p, it is preferable to satisfy Conditional Expression (15) below. By setting the corresponding value of Conditional Expression (15) not to be below the lower limit, an advantage of suppressing a change in first-order chromatic aberration in the case of the zooming is achieved. By setting the corresponding value of Conditional Expression (15) not to be above the upper limit, an advantage of suppressing occurrence of second-order chromatic aberration at the telephoto end is achieved. Furthermore, in a case where it is configured that Conditional Expression (15-1) below is satisfied, more favorable characteristics can be achieved.

$$-0.05<\theta 1n-\theta 1p<0.08 \quad (15)$$

$$0<\theta 1n-\theta 1p<0.075 \quad (15\text{-}1)$$

In a case where the average value of the partial dispersion ratio of all negative lenses of the first lens group G1 and the second lens group G2 between g line and F line is denoted by θ12n and the average value of the partial dispersion ratio of all positive lenses of the first lens group G1 and the second lens group G2 between g line and F line is denoted by θ12p, it is preferable to satisfy Conditional Expression (16) below. By satisfying Conditional Expression (16), an advantage of suppressing a change in second-order chromatic aberration in the case of the zooming is achieved. Furthermore, in a case where it is configured that Conditional Expression (16-1) below is satisfied, more favorable characteristics can be achieved.

$$0<\theta 12n-\theta 12p<0.02 \quad (16)$$

$$0<\theta 12n-\theta 12p<0.015 \quad (16\text{-}1)$$

In a case where a d line-based refractive index of the negative meniscus lens of the fifth lens group G5 is denoted by N5n and a d line-based refractive index of the positive lens of the fifth lens group G5 is denoted by N5p, it is preferable to satisfy Conditional Expression (19) below. By setting the corresponding value of Conditional Expression (19) not to be below the lower limit, an advantage of suppressing occurrence of astigmatism is achieved. By setting the corresponding value of Conditional Expression (19) not to be above the upper limit, a decrease in absolute value of the radius of curvature of the positive lens can be avoided, and an advantage of suppressing occurrence of the distortion is achieved. Furthermore, in a case where it is configured that Conditional Expression (19-1) below is satisfied, more favorable characteristics can be achieved.

$$0<N5n-N5p<0.5 \quad (19)$$

$$0<N5n-N5p<0.45 \quad (19\text{-}1)$$

In a case where the d line-based Abbe number of the positive lens of the fifth lens group G5 is denoted by v5p and the d line-based Abbe number of the negative meniscus lens of the fifth lens group G5 is denoted by v5n, it is preferable to satisfy Conditional Expression (20) below. By satisfying Conditional Expression (20), an advantage of suppressing lateral chromatic aberration on the wide angle side is achieved. Furthermore, in a case where it is configured that Conditional Expression (20-1) below is satisfied, more favorable characteristics can be achieved.

$$15<v5p-v5n<35 \quad (20)$$

$$17<v5p-v5n<30 \quad (20\text{-}1)$$

In a case where the focal length of the zoom lens at the wide angle end in a state where the object at infinity is focused is denoted by fw and the focal length of the first lens group G1 is denoted by f1, it is preferable to satisfy Conditional Expression (21) below. By setting the corresponding value of Conditional Expression (21) not to be below the lower limit, the refractive power of the first lens group G1 is not excessively decreased. Thus, the movement amount of the first lens group G1 in the case of the zooming can be suppressed. Accordingly, an advantage of reduction of the total length of the lens system is achieved. By setting the corresponding value of Conditional Expression (21) not to be above the upper limit, the refractive power of the first lens group G1 is not excessively increased. Thus, the interval between the first lens group G1 and the second lens group G2 in the case of the zooming from the wide angle end to the telephoto end can be further increased. Thus, since the amount of change of the position of an image point formed by the first lens group G1, that is, the position of an object point for the second lens group G2, in the case of the zooming can be increased, an advantage of achieving a high magnification is achieved. Furthermore, in a case where it is configured that Conditional Expression (21-1) below is satisfied, more favorable characteristics can be achieved.

$$0.05<fw/f1<0.2 \quad (21)$$

$$0.15<fw/f1<0.19 \quad (21\text{-}1)$$

In a case where the focal length of the zoom lens at the wide angle end in a state where the object at infinity is focused is denoted by fw and the focal length of the second lens group G2 is denoted by f2, it is preferable to satisfy Conditional Expression (22) below. By setting the corresponding value of Conditional Expression (22) not to be below the lower limit, an advantage of suppressing a change in various types of aberration, particularly, a change in distortion, in the case of the zooming is achieved. By setting the corresponding value of Conditional Expression (22) not to be above the upper limit, an advantage of achieving a high magnification is achieved. Furthermore, in a case where it is configured that Conditional Expression (22-1) below is satisfied, more favorable characteristics can be achieved.

$$-2<fw/f2<-0.8 \quad (22)$$

$$-1.6<fw/f2<-1 \quad (22\text{-}1)$$

In a case where the focal length of the zoom lens at the wide angle end in a state where the object at infinity is focused is denoted by fw and the focal length of the third lens group G3 is denoted by f3, it is preferable to satisfy Conditional Expression (23) below. By setting the corresponding value of Conditional Expression (23) not to be below the lower limit, an advantage of achieving a high magnification is achieved. By setting the corresponding value of Conditional Expression (23) not to be above the upper limit, an advantage of suppressing a change in various types of aberration, particularly, a change in spherical aberration, in the case of the zooming is achieved. Furthermore, in a case where it is configured that Conditional Expression (23-1) below is satisfied, more favorable characteristics can be achieved.

$$0.7<fw/f3<1.2 \quad (23)$$

$$0.8<fw/f3<1 \quad (23\text{-}1)$$

In the configuration in which the focusing lens group consists of the fourth lens group G4, in a case where the focal length of the zoom lens at the wide angle end in a state where the object at infinity is focused is denoted by fw and the focal length of the fourth lens group G4 is denoted by f4, it is preferable to satisfy Conditional Expression (24) below. By setting the corresponding value of Conditional Expression (24) not to be below the lower limit, an advantage of suppressing a change in spherical aberration and a change in field curvature in the case of the focusing is achieved. By setting the corresponding value of Conditional Expression (24) not to be above the upper limit, an advantage of achieving a high magnification and reducing the movement amount of the fourth lens group G4 in the case of the focusing is achieved. Furthermore, in a case where it is configured that Conditional Expression (24-1) below is satisfied, more favorable characteristics can be achieved.

$$-0.8<fw/f4<-0.4 \quad (24)$$

$$-0.7<fw/f4<-0.5 \quad (24\text{-}1)$$

In a case where the focal length of the zoom lens at the wide angle end in a state where the object at infinity is focused is denoted by fw and the focal length of the fifth lens group G5 is denoted by f5, it is preferable to satisfy Conditional Expression (25) below. By setting the corresponding value of Conditional Expression (25) not to be below the lower limit, an advantage of decreasing the incidence angle of the principal ray of non-axial luminous flux on the image plane Sim at the wide angle end is achieved. By setting the corresponding value of Conditional Expression (25) not to be above the upper limit, an advantage of reduction of the total length of the lens system is achieved. Furthermore, in a case where it is configured that Conditional Expression (25-1) below is satisfied, more favorable characteristics can be achieved.

$$-0.1 < fw/f5 < 0.15 \tag{25}$$

$$-0.05 < fw/f5 < 0.1 \tag{25-1}$$

As a specific configuration of each lens group, for example, it is possible to configure the following. The first lens group G1 can be configured to consist of, in order from the object side to the image side, a cemented lens into which a negative meniscus lens having a convex surface toward the object side and a positive lens having a convex surface toward the object side are cemented in order from the object side, and a positive lens having a convex surface toward the object side.

The second lens group G2 can be configured to consist of, in order from the object side to the image side, a negative meniscus lens having a concave surface toward the image side, a cemented lens into which a biconcave lens and a biconvex lens are cemented in order from the object side, and a negative lens having a concave surface toward the object side.

The third lens group G3 can be configured to consist of, in order from the object side to the image side, two biconvex lenses, a cemented lens into which a biconcave lens and a positive lens are cemented in order from the object side, and a biconvex lens.

The fourth lens group G4 can be configured to consist of a cemented lens into which a positive lens having a convex surface toward the image side and a biconcave lens are cemented in order from the object side.

The fifth lens group G5 may be a lens group having a positive refractive power or a lens group having a negative refractive power.

The example illustrated in FIG. 1 is one example, and the number of lenses constituting each lens group can be differently set from the example illustrated in FIG. 1. In addition, while an example of moving all lens groups in the case of the zooming is illustrated in FIG. 1, it can be configured that at least one lens group of the first lens group G1 to the fifth lens group G5 is fixed with respect to the image plane Sim in the case of the zooming in a case where the interval between the first lens group G1 and the second lens group G2 is increased and the intervals between the other lens groups and the lens groups adjacent thereto are changed in the case of the zooming from the wide angle end to the telephoto end.

The above preferred configurations and available configurations including the configurations related to the conditional expressions can be randomly combined and preferably, are appropriately selectively employed depending on required specifications. According to the embodiment of the present disclosure, a zoom lens that suppresses a change in various types of aberration in the case of the zooming while having a high magnification and has a reduced size and favorable optical performance can be implemented.

Next, examples of the zoom lens according to the embodiment of the present disclosure will be described.

Example 1

A cross-sectional view of a configuration and a movement trajectory of the zoom lens of Example 1 are illustrated in FIG. 1, and the method and configuration of illustration are described above. Thus, a duplicate description will be partially omitted here. The zoom lens of Example 1 consists of, in order from the object side to the image side, the first lens group G1 having a positive refractive power, the second lens group G2 having a negative refractive power, the aperture stop St, the third lens group G3 having a positive refractive power, the fourth lens group G4 having a negative refractive power, and the fifth lens group G5 having a positive refractive power. In the case of the zooming, all lens groups are moved along the optical axis Z by changing all intervals between the adjacent lens groups. The aperture stop St, the third lens group G3, and the fifth lens group G5 are moved as a single unit in the case of the zooming. The first lens group G1 consists of three lenses of the lenses L11 to L13 in order from the object side to the image side. The second lens group G2 consists of four lenses of the lenses L21 to L24 in order from the object side to the image side. The third lens group G3 consists of five lenses of the lenses L31 to L35 in order from the object side to the image side. The fourth lens group G4 consists of two lenses of the lenses L41 and L42 in order from the object side to the image side. The fifth lens group G5 consists of two lenses of the lenses L51 and L52 in order from the object side to the image side. The focusing lens group consists of the fourth lens group G4. The vibration proof lens group consists of the lens L35. Above is the summary of the zoom lens of Example 1.

For the zoom lens of Example 1, fundamental lens data is shown in Table 1, specifications and variable surface intervals are shown in Table 2, and aspherical coefficients are shown in Table 3. In Table 1, the field of Sn shows a surface number in a case where the surface closest to the object side is a first surface and the number is increased by one at a time in a direction toward the image side. The field of R shows the radius of curvature of each surface. The field of D shows a surface interval on the optical axis between each surface and a surface adjacent thereto on the image side. The field of Nd shows the refractive index of each constituent with respect to d line. The field of vd shows the d line-based Abbe number of each constituent. The field of θgF shows the partial dispersion ratio of each constituent between g line and F line. The field of material shows a material name of each lens, a period, and a manufacturing company name of the material in this order from the left. The manufacturing company name is abbreviated. For example, "OHARA" is Ohara Corporation.

In Table 1, the sign of the radius of curvature of a surface having a shape of a convex surface toward the object side is positive, and the sign of the radius of curvature of a surface having a shape of a convex surface toward the image side is negative. In Table 1, the aperture stop St and the optical member PP are also shown. In Table 1, the surface number and a word (St) are written in the field of the surface number of the surface corresponding to the aperture stop St. A value in the lowermost field of D in Table 1 is an interval between the surface closest to the image side in the table and the image plane Sim. In Table 1, a symbol DD[ ] is used for the variable surface interval in the case of the zooming. The variable surface interval is shown in the field of D with the surface number on the object side of the interval in [ ].

Table 2 shows a zoom magnification Zr, a focal length f, an F number FNo., a maximum total angle of view 2ω, and the value of the variable surface interval in the case of the zooming. In the field of 2ω, (°) means that the unit is degree. In Table 2, values in the wide angle end state, the middle focal length state, and the telephoto end state are shown in the fields marked with WIDE, MIDDLE, and TELE, respectively. Values shown in Table 1 and Table 2 are values in a case based on d line in a state where the object at infinity is focused.

In Table 1, the surface number of an aspherical surface is marked with *, and the numerical value of the paraxial radius of curvature is written in the field of the radius of curvature of the aspherical surface. In Table 3, the field of Sn shows the surface number of the aspherical surface, and the fields of KA and Am (m=3, 4, 5, 6, 7, 8, 9, and 10) show the numerical value of the aspherical coefficient for each aspherical surface. In the numerical value of the aspherical coefficient in Table 3, "E±n" (n: integer) means "×10$^{±n}$". KA and Am are aspherical coefficients in an aspherical expression represented by the following expression.

$$Zd = C \times h^2 / \{1 + (1 - KA \times C^2 \times h^2)^{1/2}\} + \Sigma Am \times h^m$$

where
Zd: aspherical depth (the length of a perpendicular line drawn from a point on an aspherical surface having a height h to a plane that is in contact with an aspherical vertex and is perpendicular to the optical axis)
h: height (a distance from the optical axis to the lens surface)
C: reciprocal of paraxial radius of curvature
KA and Am: aspherical coefficients
In the aspherical expression, $\Sigma$ means the total sum related to m.

In the data of each table, degree is used as the unit of angle, and mm (millimeter) is used as the unit of length. However, since the optical system can be used even in a case where propositional enlargement or propositional reduction is performed, other appropriate units can also be used. In addition, numerical values that are rounded to a predetermined number of digits are written in each table shown below.

TABLE 1

| Example 1 | | | | | | |
|---|---|---|---|---|---|---|
| Sn | R | D | Nd | υd | θgF | Material |
| 1 | 75.02032 | 1.700 | 1.72825 | 28.46 | 0.60772 | S-TIH10.OHARA |
| 2 | 50.13104 | 7.510 | 1.49700 | 81.61 | 0.53887 | FCD1.HOYA |
| 3 | 510.53677 | 0.150 | | | | |
| 4 | 73.75751 | 3.981 | 1.61800 | 63.33 | 0.54414 | S-PHM52.OHARA |
| 5 | 229.19362 | DD[5] | | | | |
| *6 | 36.98327 | 1.600 | 1.80625 | 40.91 | 0.56920 | L-LAH53.OHARA |
| *7 | 10.91515 | 6.603 | | | | |
| 8 | −78.27387 | 0.700 | 1.83481 | 42.72 | 0.56486 | S-LAH55V.OHARA |
| 9 | 42.80686 | 4.977 | 1.80809 | 22.76 | 0.63073 | S-NPH1W.OHARA |
| 10 | −22.83176 | 0.555 | | | | |
| *11 | −18.17986 | 0.700 | 1.85400 | 40.38 | 0.56890 | L-LAH85V.OHARA |
| *12 | −98.96139 | DD[12] | | | | |
| 13 (St) | ∞ | 0.800 | | | | |
| *14 | 16.30902 | 4.952 | 1.58313 | 59.38 | 0.54237 | L-BAL42.OHARA |
| *15 | −85.89030 | 0.286 | | | | |
| 16 | 38.33295 | 4.761 | 1.48749 | 70.24 | 0.53007 | S-FSL5.OHARA |
| 17 | −15.99670 | 0.150 | | | | |
| 18 | −23.42644 | 0.600 | 1.76200 | 40.10 | 0.57655 | S-LAM55.OHARA |
| 19 | 11.62375 | 3.010 | 1.49700 | 81.54 | 0.53748 | S-FPL51.OHARA |
| 20 | 24.07960 | 2.000 | | | | |
| *21 | 16.28110 | 4.966 | 1.49710 | 81.56 | 0.53848 | M-FCD1.HOYA |
| *22 | −22.06601 | DD[22] | | | | |
| 23 | 337.02262 | 2.000 | 1.85026 | 32.27 | 0.59299 | S-LAH71.OHARA |
| 24 | −37.12616 | 0.610 | 1.61800 | 63.33 | 0.54414 | S-PHM52.OHARA |
| 25 | 15.46337 | DD[25] | | | | |
| 26 | −32.34946 | 1.000 | 1.59551 | 39.24 | 0.58043 | S-TIM8.OHARA |
| 27 | −165.15771 | 0.150 | | | | |
| 28 | 31.55363 | 3.713 | 1.51823 | 58.90 | 0.54567 | S-NSL3.OHARA |
| 29 | 831.30892 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 2

Example 1

| | WIDE | MIDDLE | TELE |
|---|---|---|---|
| Zr | 1.0 | 2.8 | 10.5 |
| f | 18.56 | 52.66 | 193.94 |
| Bf | 13.69 | 29.57 | 50.40 |
| FNo. | 3.61 | 4.92 | 6.51 |
| 2ω (°) | 80.2 | 29.8 | 8.4 |
| DD[5] | 0.8000 | 26.9745 | 59.5779 |
| DD[12] | 24.6282 | 9.3161 | 1.5664 |
| DD[22] | 1.5425 | 4.4166 | 1.5699 |
| DD[25] | 12.9376 | 10.0635 | 12.9102 |
| DD[29] | 9.4201 | 25.3177 | 46.1454 |

TABLE 3

Example 1

| Sn | 6 | 7 | 11 | 12 | 14 |
|---|---|---|---|---|---|
| KA | 1.0000000E+00 | 1.0000000E+00 | 1.0000000E+00 | 1.0000000E+00 | 1.0000000E+00 |
| A3 | 2.8322016E−20 | 3.7645909E−20 | 0.0000000E+00 | 0.0000000E+00 | 0.0000000E+00 |
| A4 | −6.9718629E−06 | 5.4470844E−06 | 1.0521810E−04 | 6.0569616E−05 | −2.5388318E−05 |
| A5 | −1.1203176E−06 | −2.7045984E−06 | −1.7363055E−05 | −1.5672296E−05 | 4.4228139E−06 |
| A6 | 3.5096625E−09 | 1.1248556E−07 | −3.2780120E−07 | −4.4257528E−07 | −8.0990608E−07 |
| A7 | 7.5943066E−09 | 1.3796185E−08 | 3.4423607E−07 | 3.0666628E−07 | 1.7396541E−08 |
| A8 | −5.4407844E−10 | −1.5949152E−09 | −1.3544676E−08 | −9.9480263E−09 | 1.1458960E−08 |
| A9 | −6.9778758E−13 | −7.4096275E−11 | −1.8198073E−09 | −1.8442006E−09 | −5.8424825E−10 |
| A10 | 7.0631617E−13 | 5.4695469E−12 | 1.0836930E−10 | 9.3550831E−11 | −1.2002775E−10 |

| Sn | 15 | 21 | 22 |
|---|---|---|---|
| KA | 1.0000000E+00 | 1.0000000E+00 | 1.0000000E+00 |
| A3 | 2.1684043E−20 | 2.7755576E−18 | −2.7755576E−18 |
| A4 | 3.7818969E−05 | −3.5667218E−05 | 4.6756192E−05 |
| A5 | 2.3364345E−06 | −2.3566153E−05 | −1.8725677E−05 |
| A6 | 3.4604176E−08 | 1.0242280E−05 | 7.0843781E−06 |
| A7 | 1.1945631E−08 | −2.5067482E−06 | −1.6842049E−06 |
| A8 | 2.9106172E−09 | 3.7210860E−07 | 2.5602515E−07 |
| A9 | −4.8712067E−10 | −3.1632712E−08 | −2.2678637E−08 |
| A10 | −6.2927652E−11 | 1.0924510E−09 | 8.0898304E−10 |

Figure 3:
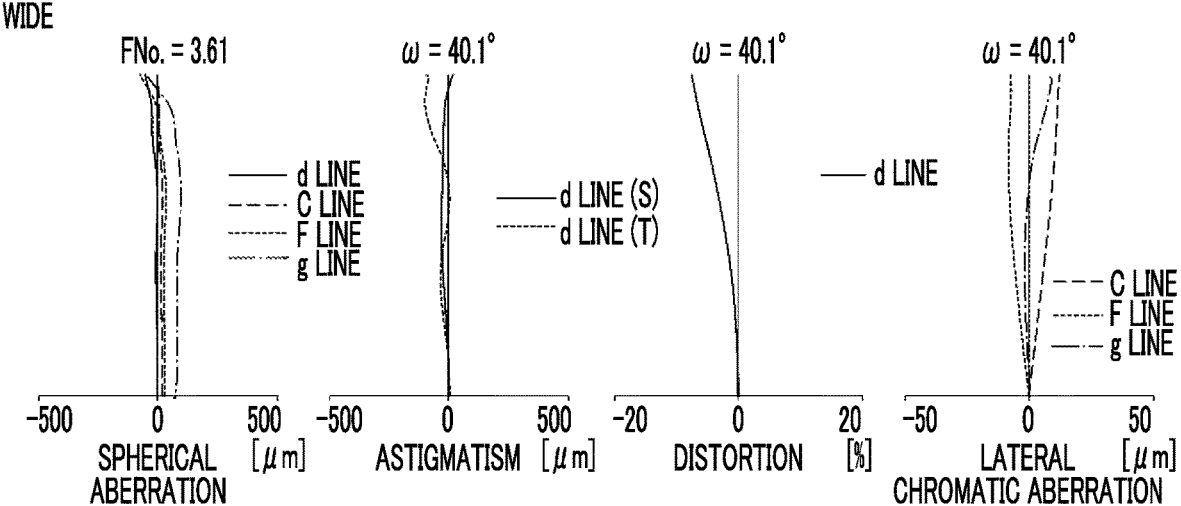
FIG. 3 is each aberration diagram of the zoom lens of Example 1 of the present disclosure.
Figure 3:
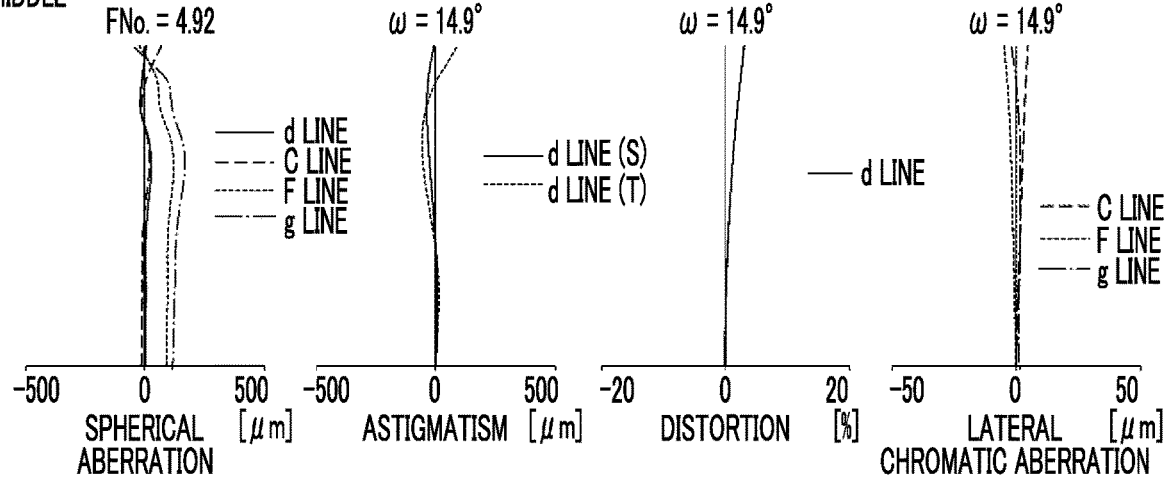
Figure 3:
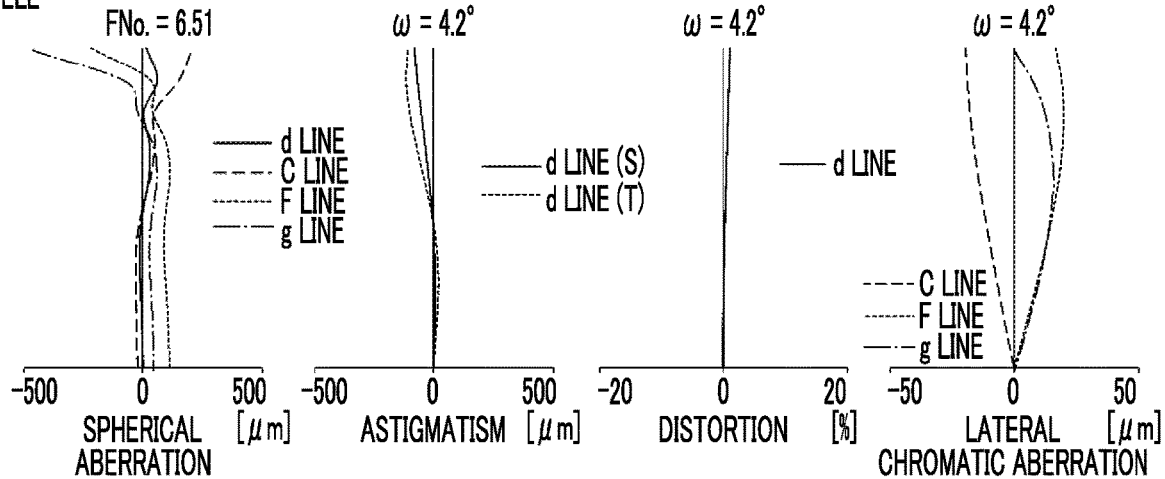

FIG. 3 illustrates aberration diagrams in a state where the zoom lens of Example 1 is focused on the object at infinity. In FIG. 3, in order from the left, spherical aberration, astigmatism, distortion, and lateral chromatic aberration are illustrated. In FIG. 3, aberration in the wide angle end state is illustrated in an upper part denoted by "WIDE", aberration in the middle focal length state is illustrated in a middle part denoted by "MIDDLE", and aberration in the telephoto end state is illustrated in a lower part denoted by "TELE". In the spherical aberration diagram, a solid line, a long broken line, a short broken line, and a one-dot chain line illustrate aberration on d line, C line, F line, and g line, respectively. In the astigmatism diagram, a solid line illustrates aberration on d line in a sagittal direction, and a short broken line illustrates aberration on d line in a tangential direction. In the distortion diagram, a solid line illustrates aberration on d line. In the lateral chromatic aberration diagram, a long broken line, a short broken line, and a one-dot chain line illustrate aberration on C line, F line, and g line, respectively. In the spherical aberration diagram, FNo. means the F number. In other aberration diagrams, ω means a half angle of view.

Symbols, meanings, writing methods, and illustration methods of each data related to Example 1 are the same in the following examples unless otherwise specified. Thus, duplicate descriptions will be omitted below.

Example 2

Figure 4:
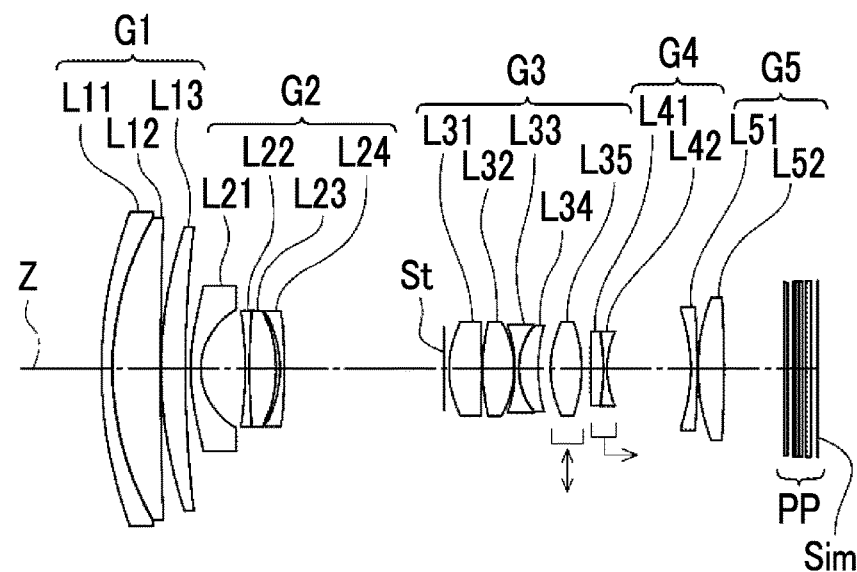
FIG. 4 is a diagram illustrating a cross-sectional view of a configuration and a movement trajectory of a zoom lens of Example 2 of the present disclosure.
Figure 5:
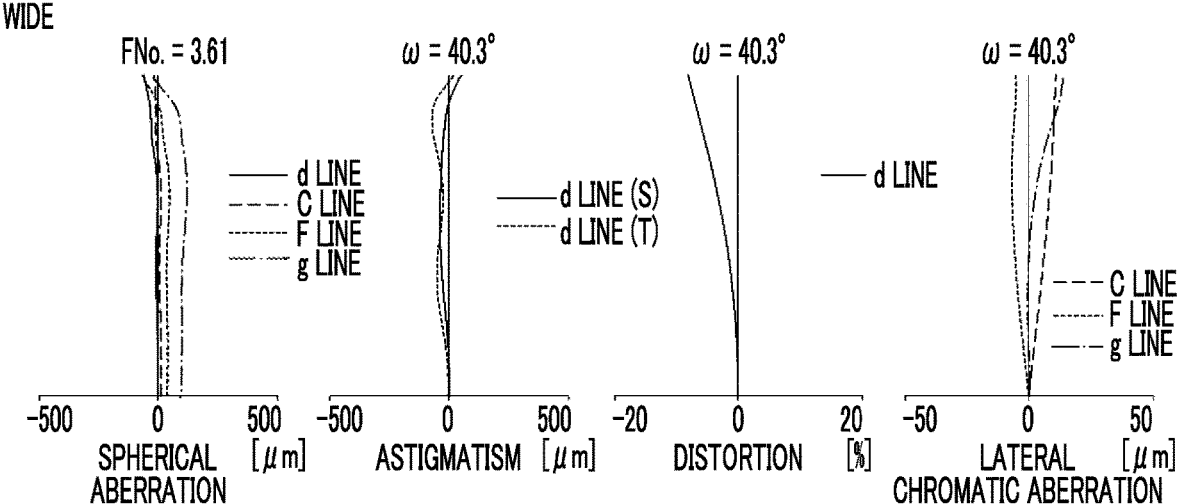
FIG. 5 is each aberration diagram of the zoom lens of Example 2 of the present disclosure.
Figure 5:
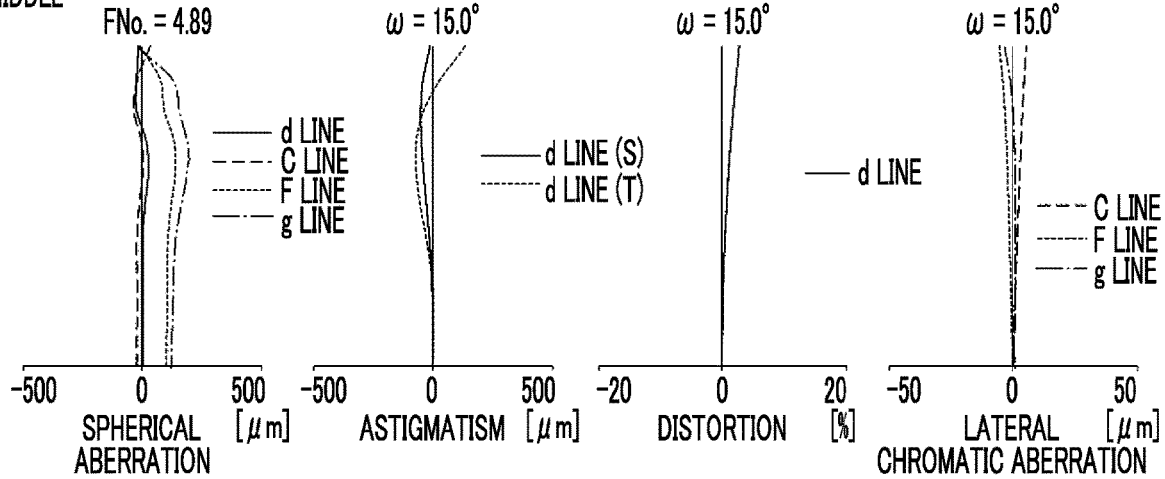
Figure 5:
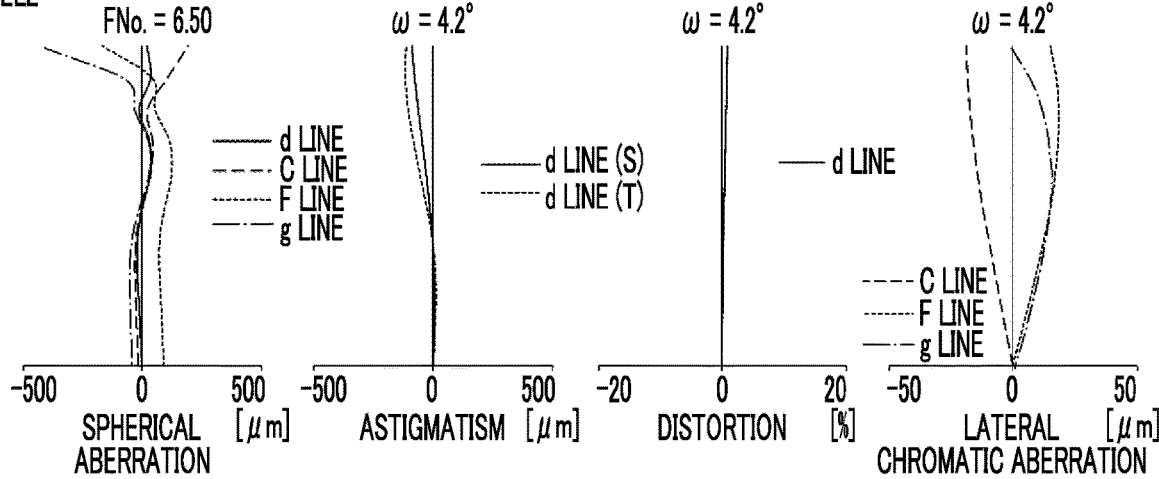

FIG. 4 illustrates a cross-sectional view of a configuration and a movement trajectory of a zoom lens of Example 2. The zoom lens of Example 2 has the same configuration as the summary of the zoom lens of Example 1. For the zoom lens of Example 2, fundamental lens data is shown in Table 4, specifications and variable surface intervals are shown in Table 5, aspherical coefficients are shown in Table 6, and aberration diagrams are illustrated in FIG. 5.

TABLE 4

Example 2

| Sn | R | D | Nd | νd | θgF | Material |
|---|---|---|---|---|---|---|
| 1 | 75.43404 | 1.700 | 1.72825 | 28.46 | 0.60772 | S-TIH10.OHARA |
| 2 | 50.92945 | 7.510 | 1.49700 | 81.61 | 0.53887 | FCD1.HOYA |
| 3 | 655.04512 | 0.150 | | | | |

TABLE 4-continued

Example 2

| Sn | R | D | Nd | νd | θgF | Material |
|---|---|---|---|---|---|---|
| 4 | 75.29607 | 3.772 | 1.61800 | 63.33 | 0.54414 | S-PHM52.OHARA |
| 5 | 207.30462 | DD[5] | | | | |
| *6 | 35.43465 | 1.600 | 1.80625 | 40.91 | 0.56920 | L-LAH53.OHARA |
| *7 | 10.88801 | 6.955 | | | | |
| 8 | −65.17996 | 0.710 | 1.85150 | 40.78 | 0.56958 | S-LAH89.OHARA |
| 9 | 128.93634 | 4.000 | 1.89286 | 20.36 | 0.63944 | S-NPH4.OHARA |
| 10 | −24.23940 | 0.649 | | | | |
| *11 | −18.13411 | 0.700 | 1.85400 | 40.38 | 0.56890 | L-LAH85V.OHARA |
| *12 | −99.70650 | DD[12] | | | | |
| 13 (St) | ∞ | 0.800 | | | | |
| *14 | 16.55845 | 5.106 | 1.58313 | 59.38 | 0.54237 | L-BAL42.OHARA |
| *15 | −93.39924 | 0.150 | | | | |
| 16 | 33.32866 | 4.899 | 1.48749 | 70.24 | 0.53007 | S-FSL5.OHARA |
| 17 | −15.86566 | 0.150 | | | | |
| 18 | −22.75060 | 0.600 | 1.76200 | 40.10 | 0.57655 | S-LAM55.OHARA |
| 19 | 11.40787 | 3.054 | 1.49700 | 81.54 | 0.53748 | S-FPL51.OHARA |
| 20 | 24.31658 | 2.000 | | | | |
| *21 | 16.11905 | 4.876 | 1.49710 | 81.56 | 0.53848 | M-FCD1.HOYA |
| *22 | −22.29854 | DD[22] | | | | |
| 23 | 570.76326 | 2.000 | 1.85026 | 32.27 | 0.59299 | S-LAH71.OHARA |
| 24 | −34.90723 | 0.610 | 1.61800 | 63.33 | 0.54414 | S-PHM52.OHARA |
| 25 | 15.63765 | DD[25] | | | | |
| 26 | −30.23390 | 1.000 | 1.59551 | 39.24 | 0.58043 | S-TIM8.OHARA |
| 27 | −156.22937 | 0.150 | | | | |
| 28 | 33.65211 | 4.085 | 1.51823 | 58.90 | 0.54567 | S-NSL3.OHARA |
| 29 | −195.37955 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 5

Example 2

| | WIDE | MIDDLE | TELE |
|---|---|---|---|
| Zr | 1.0 | 2.8 | 10.5 |
| f | 18.55 | 52.65 | 193.91 |
| Bf | 13.62 | 29.69 | 51.89 |
| FNo. | 3.61 | 4.89 | 6.50 |
| 2ω (°) | 80.6 | 30.0 | 8.4 |
| DD[5] | 0.8000 | 27.6636 | 60.8067 |
| DD[12] | 24.9582 | 9.3634 | 1.4918 |
| DD[22] | 1.4010 | 4.2767 | 1.4300 |
| DD[25] | 13.0549 | 10.1792 | 13.0259 |
| DD[29] | 9.3550 | 25.4481 | 47.6410 |

TABLE 6

Example 2

| Sn | 6 | 7 | 11 | 12 | 14 |
|---|---|---|---|---|---|
| KA | 1.0000000E+00 | 1.0000000E+00 | 1.0000000E+00 | 1.0000000E+00 | 1.0000000E+00 |
| A3 | 0.0000000E+00 | 2.5097273E−20 | −8.6736174E−20 | 0.0000000E+00 | 0.0000000E+00 |
| A4 | −6.2341019E−06 | 5.4488494E−06 | 1.2146849E−04 | 7.4386191E−05 | −2.5094684E−05 |
| A5 | −1.8378092E−06 | −3.4736971E−06 | −1.7190735E−05 | −1.5572149E−05 | 5.0832530E−06 |
| A6 | 2.6772759E−08 | 1.0052013E−07 | −7.8437780E−07 | −8.6519657E−07 | −9.2966939E−07 |
| A7 | 1.1018042E−08 | 1.7810325E−08 | 3.4039642E−07 | 3.0374741E−07 | 9.4922598E−09 |
| A8 | −6.4546357E−10 | −2.1327018E−09 | −8.4032816E−09 | −5.1131416E−09 | 1.3591904E−08 |
| A9 | −6.2380872E−12 | −8.7542197E−11 | −1.8058352E−09 | −1.8324110E−09 | −5.4538939E−10 |
| A10 | 8.1286798E−13 | 7.7147951E−12 | 8.7711818E−11 | 7.4486651E−11 | −1.3074577E−10 |

| Sn | 15 | 21 | 22 |
|---|---|---|---|
| KA | 1.0000000E+00 | 1.0000000E+00 | 1.0000000E+00 |
| A3 | −2.1684043E−20 | −5.5511151E−18 | −1.3877788E−18 |
| A4 | 3.4112400E−05 | −3.6388643E−05 | 4.6457731E−05 |
| A5 | 2.9836837E−06 | −2.3778366E−05 | −1.8721529E−05 |
| A6 | −9.4057345E−08 | 1.0286911E−05 | 7.1103392E−06 |
| A7 | 5.3221347E−09 | −2.4985069E−06 | −1.6754177E−06 |

TABLE 6-continued

| Example 2 | | | |
|---|---|---|---|
| A8  | 5.4107376E−09  | 3.1189453E−07  | 2.5522715E−07 |
| A9  | −4.4694094E−10 | −3.1669690E−08 | −2.2711362E−08 |
| A10 | −7.4138153E−11 | 1.0929458E−09  | 8.1480651E−10 |

Example 3

Figure 6:
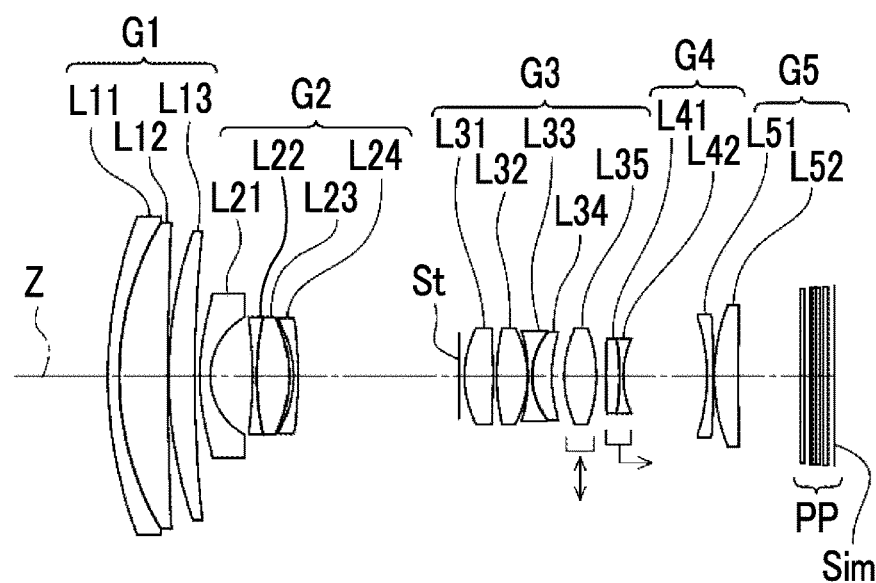
FIG. 6 is a diagram illustrating a cross-sectional view of a configuration and a movement trajectory of a zoom lens of Example 3 of the present disclosure.
Figure 7:
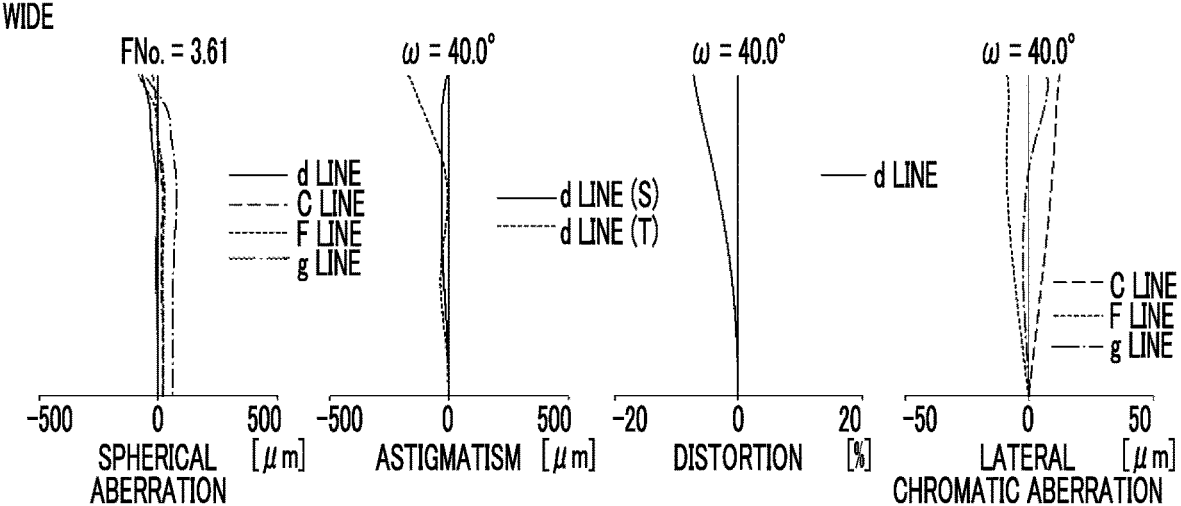
FIG. 7 is each aberration diagram of the zoom lens of Example 3 of the present disclosure.
Figure 7:
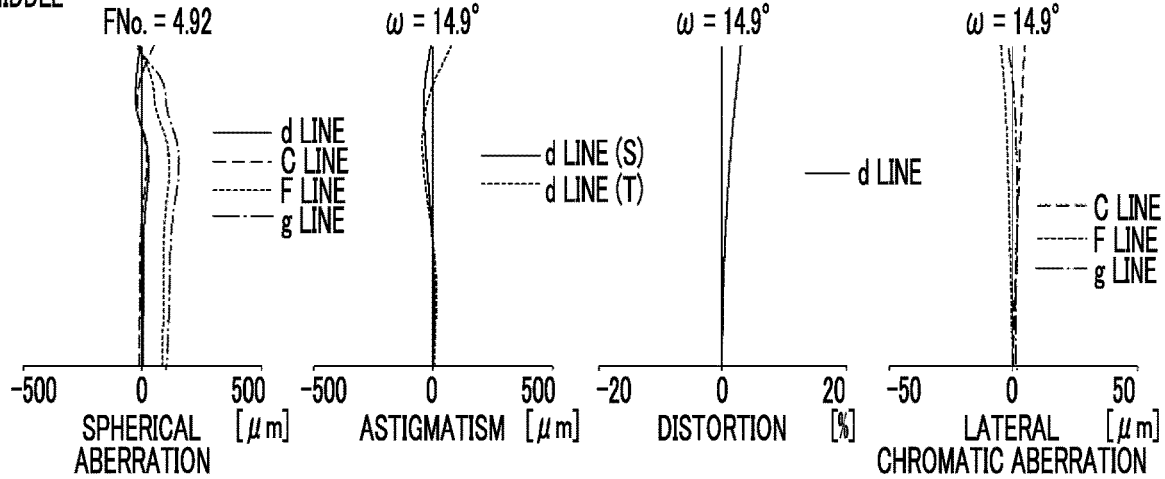
Figure 7:
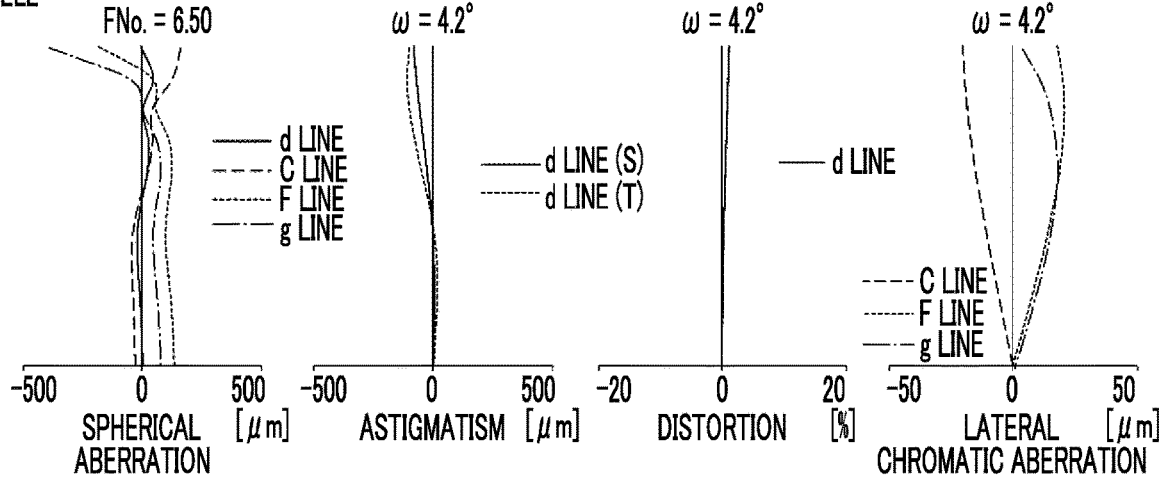

FIG. 6 illustrates a cross-sectional view of a configuration and a movement trajectory of a zoom lens of Example 3. The zoom lens of Example 3 has the same configuration as the summary of the zoom lens of Example 1. For the zoom lens of Example 3, fundamental lens data is shown in Table 7, specifications and variable surface intervals are shown in Table 8, aspherical coefficients are shown in Table 9, and aberration diagrams are illustrated in FIG. 7.

TABLE 7

| Example 3 | | | | | | |
|---|---|---|---|---|---|---|
| Sn | R | D | Nd | υd | θgF | Material |
| 1    | 74.97977   | 1.700  | 1.72825 | 28.46 | 0.60772 | S-TIH10.OHARA |
| 2    | 50.13533   | 7.510  | 1.49700 | 81.61 | 0.53887 | FCD1.HOYA |
| 3    | 528.12157  | 0.150  |         |       |         |               |
| 4    | 73.28678   | 3.986  | 1.61800 | 63.33 | 0.54414 | S-PHM52.OHARA |
| 5    | 224.08849  | DD[5]  |         |       |         |               |
| *6   | 36.13808   | 1.600  | 1.85400 | 40.38 | 0.56890 | L-LAH85V.OHARA |
| *7   | 11.03500   | 6.500  |         |       |         |               |
| 8    | −73.75388  | 0.700  | 1.83481 | 42.72 | 0.56486 | S-LAH55V.OHARA |
| 9    | 45.82539   | 4.965  | 1.80809 | 22.76 | 0.63073 | S-NPH1W.OHARA |
| 10   | −22.63981  | 0.615  |         |       |         |               |
| *11  | −18.12073  | 0.700  | 1.85400 | 40.38 | 0.56890 | L-LAH85V.OHARA |
| *12  | −83.11136  | DD[12] |         |       |         |               |
| 13 (St) | ∞       | 0.800  |         |       |         |               |
| *14  | 16.44461   | 4.457  | 1.58313 | 59.38 | 0.54237 | L-BAL42.OHARA |
| *15  | −99.99871  | 0.540  |         |       |         |               |
| 16   | 36.09690   | 4.720  | 1.48749 | 70.24 | 0.53007 | S-FSL5.OHARA |
| 17   | −16.64378  | 0.150  |         |       |         |               |
| 18   | −25.16182  | 0.600  | 1.76200 | 40.10 | 0.57655 | S-LAM55.OHARA |
| 19   | 11.58278   | 3.010  | 1.49700 | 81.54 | 0.53748 | S-FPL51.OHARA |
| 20   | 23.31982   | 2.000  |         |       |         |               |
| *21  | 16.36365   | 4.977  | 1.49710 | 81.56 | 0.53848 | M-FCD1.HOYA |
| *22  | −22.04184  | DD[22] |         |       |         |               |
| 23   | 286.19107  | 2.000  | 1.85026 | 32.27 | 0.59299 | S-LAH71.OHARA |
| 24   | −37.89491  | 0.610  | 1.61800 | 63.33 | 0.54414 | S-PHM52.OHARA |
| 25   | 15.37393   | DD[25] |         |       |         |               |
| 26   | −31.74285  | 1.000  | 1.60342 | 38.03 | 0.58356 | S-TIM5.OHARA |
| 27   | −163.37264 | 0.150  |         |       |         |               |
| 28   | 31.57461   | 3.702  | 1.51823 | 58.90 | 0.54567 | S-NSL3.OHARA |
| 29   | 1115.63507 | DD[29] |         |       |         |               |
| 30   | ∞          | 0.600  | 1.54763 | 54.99 | 0.55229 |               |
| 31   | ∞          | 0.810  |         |       |         |               |
| 32   | ∞          | 0.350  | 1.54763 | 54.99 | 0.55229 |               |
| 33   | ∞          | 0.600  | 1.54763 | 54.99 | 0.55229 |               |
| 34   | ∞          | 0.600  | 1.54763 | 54.99 | 0.55229 |               |
| 35   | ∞          | 0.500  |         |       |         |               |
| 36   | ∞          | 0.700  | 1.49784 | 54.95 | 0.54959 |               |
| 37   | ∞          | 1.100  |         |       |         |               |

TABLE 8

| Example 3 | | | |
|---|---|---|---|
|        | WIDE    | MIDDLE  | TELE    |
| Zr     | 1.0     | 2.8     | 10.5    |
| f      | 18.55   | 52.65   | 193.89  |
| Bf     | 13.88   | 29.64   | 50.33   |
| FNo.   | 3.61    | 4.92    | 6.50    |
| 2ω (°) | 80.0    | 29.8    | 8.4     |
| DD[5]  | 0.8000  | 27.0028 | 59.4955 |
| DD[12] | 24.8262 | 9.3870  | 1.5701  |

TABLE 8-continued

| Example 3 | | | |
|---|---|---|---|
|        | WIDE    | MIDDLE  | TELE    |
| DD[22] | 1.5618  | 4.4370  | 1.5823  |
| DD[25] | 12.8679 | 9.9927  | 12.8474 |
| DD[29] | 9.6114  | 25.3844 | 46.0827 |

TABLE 9

Example 3

| Sn | 6 | 7 | 11 | 12 | 14 |
|---|---|---|---|---|---|
| KA | 1.0000000E+00 | 1.0000000E+00 | 1.0000000E+00 | 1.0000000E+00 | 1.0000000E+00 |
| A3 | −2.6299015E−20 | 5.0194545E−20 | 0.0000000E+00 | 0.0000000E+00 | −4.3368087E−20 |
| A4 | −5.3068781E−06 | 8.0182606E−06 | 1.2060971E−04 | 7.5357454E−05 | −2.4152137E−05 |
| A5 | −1.1438270E−06 | −2.5500789E−06 | −1.6848800E−05 | −1.5353623E−05 | 4.5563435E−06 |
| A6 | −2.3058017E−08 | 1.0946458E−07 | −6.8059737E−07 | −7.6866139E−07 | −8.0765904E−07 |
| A7 | 7.1517232E−09 | 9.6260168E−09 | 3.3959991E−07 | 3.0292907E−07 | 2.0118759E−08 |
| A8 | −4.2131489E−10 | −1.6472811E−09 | −1.0089682E−08 | −6.7040513E−09 | 1.1391140E−08 |
| A9 | 4.1223380E−13 | −6.5815296E−11 | −1.7968462E−09 | −1.8259580E−09 | −5.9411016E−10 |
| A10 | 5.3555650E−13 | 5.0705584E−12 | 9.6366238E−11 | 8.1861873E−11 | −1.1851515E−10 |

| Sn | 15 | 21 | 22 |
|---|---|---|---|
| KA | 1.0000000E+00 | 1.0000000E+00 | 1.0000000E+00 |
| A3 | 0.0000000E+00 | 2.7755576E−18 | 4.1633363E−18 |
| A4 | 3.6670358E−05 | −3.4759916E−05 | 4.6910242E−05 |
| A5 | 2.4607635E−06 | −2.3490700E−05 | −1.8600577E−05 |
| A6 | 1.7156678E−08 | 1.0194977E−05 | 7.0410926E−06 |
| A7 | 8.2464909E−09 | −2.5069026E−06 | −1.6887989E−06 |
| A8 | 3.9302470E−09 | 3.7246002E−07 | 2.5682887E−07 |
| A9 | −4.7997045E−10 | −3.1630404E−08 | −2.2651328E−08 |
| A10 | −7.2096952E−11 | 1.0918861E−09 | 8.0416027E−10 |

Example 4

Figure 8:
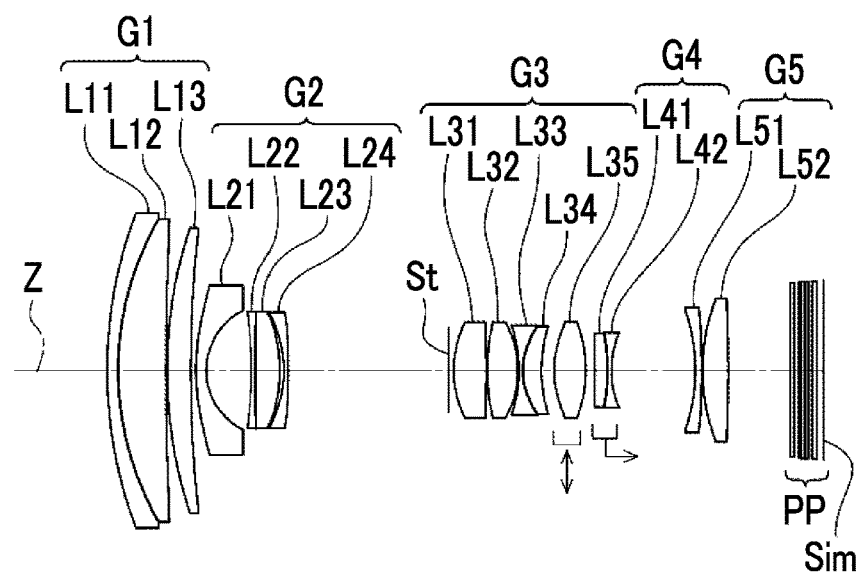
FIG. 8 is a diagram illustrating a cross-sectional view of a configuration and a movement trajectory of a zoom lens of Example 4 of the present disclosure.
Figure 8:
Figure 9:
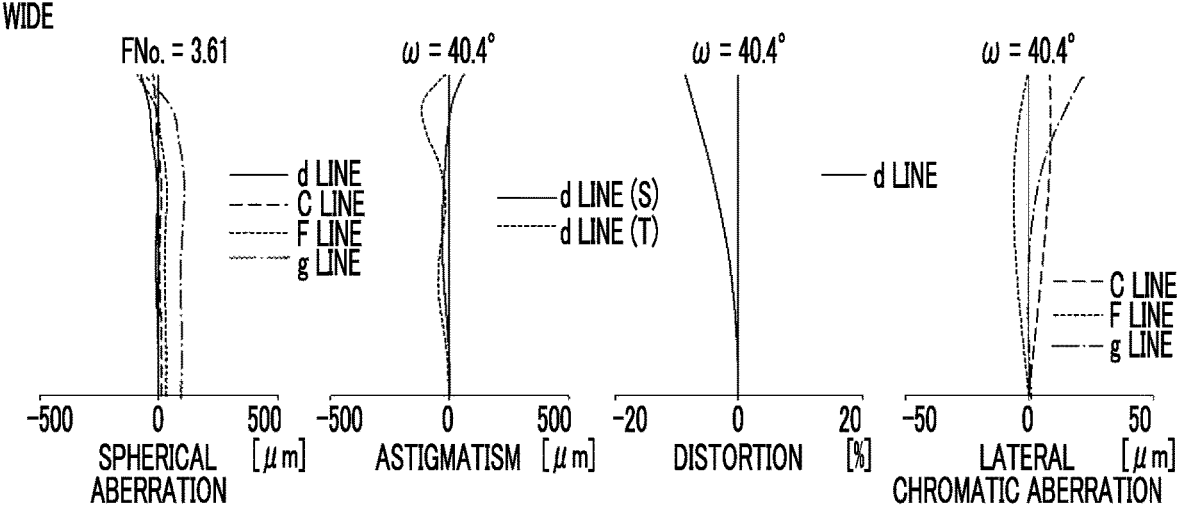
FIG. 9 is each aberration diagram of the zoom lens of Example 4 of the present disclosure.
Figure 9:
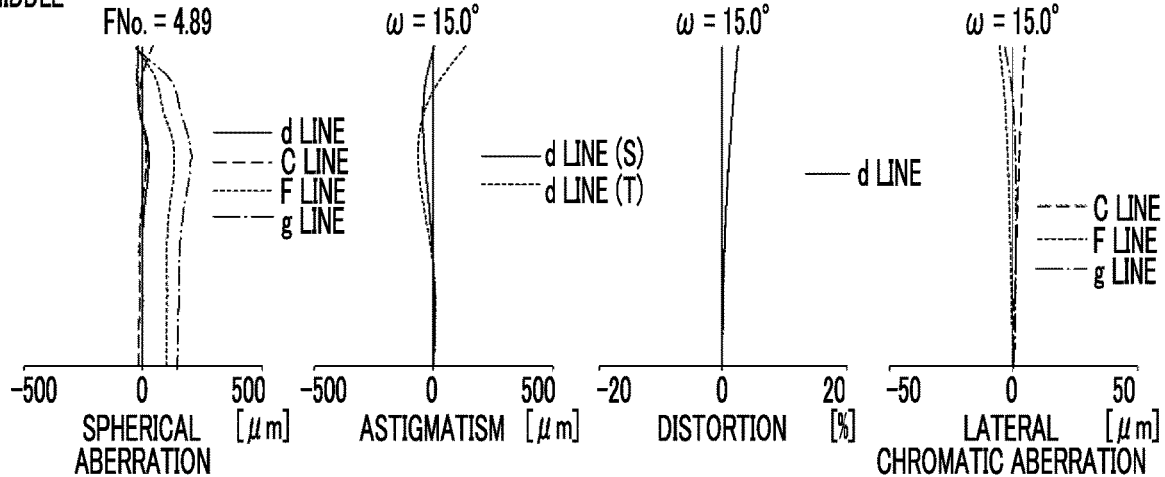
Figure 9:
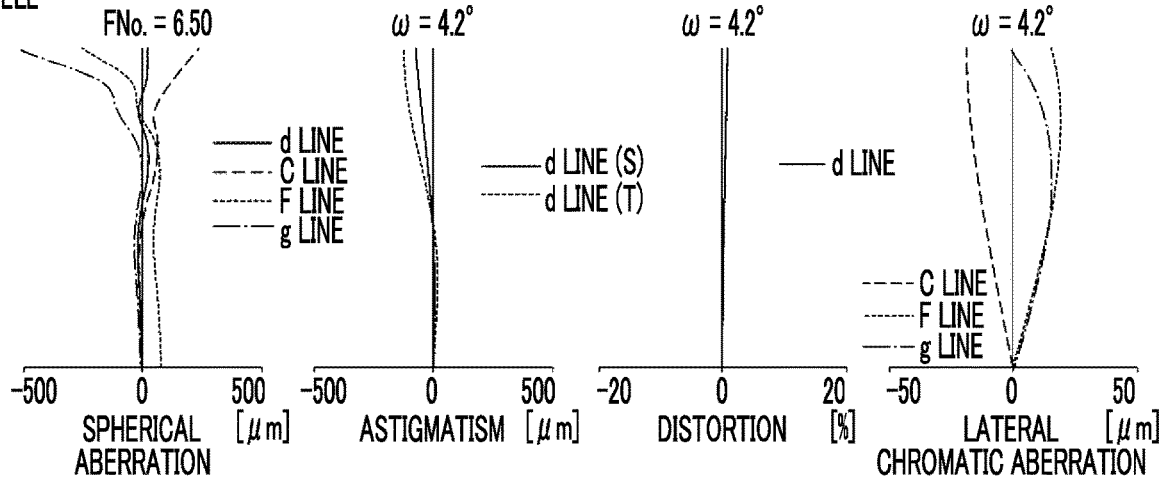

FIG. 8 illustrates a cross-sectional view of a configuration and a movement trajectory of a zoom lens of Example 4. The zoom lens of Example 4 has the same configuration as the summary of the zoom lens of Example 1. For the zoom lens of Example 4, fundamental lens data is shown in Table 10, specifications and variable surface intervals are shown in Table 11, aspherical coefficients are shown in Table 12, and aberration diagrams are illustrated in FIG. 9.

TABLE 10

Example 4

| Sn | R | D | Nd | υd | θgF | Material |
|---|---|---|---|---|---|---|
| 1 | 75.05563 | 1.700 | 1.72825 | 28.46 | 0.60772 | S-TIH10.OHARA |
| 2 | 50.72147 | 7.510 | 1.49700 | 81.61 | 0.53887 | FCD1.HOYA |
| 3 | 607.18165 | 0.150 | | | | |
| 4 | 76.64402 | 3.699 | 1.61800 | 63.33 | 0.54414 | S-PHM52.OHARA |
| 5 | 211.18452 | DD[5] | | | | |
| *6 | 35.77430 | 1.600 | 1.76450 | 49.10 | 0.55289 | L-LAH91.OHARA |
| *7 | 10.74477 | 7.143 | | | | |
| 8 | −65.85876 | 0.710 | 1.85150 | 40.78 | 0.56958 | S-LAH89.OHARA |
| 9 | 484.98624 | 3.608 | 1.89286 | 20.36 | 0.63944 | S-NPH4.OHARA |
| 10 | −24.91488 | 0.631 | | | | |
| *11 | −18.29839 | 0.700 | 1.85400 | 40.38 | 0.56890 | L-LAH85V.OHARA |
| *12 | −99.89126 | DD[12] | | | | |
| 13 (St) | ∞ | 0.800 | | | | |
| *14 | 16.65339 | 5.103 | 1.58313 | 59.38 | 0.54237 | L-BAL42.OHARA |
| *15 | −91.61794 | 0.150 | | | | |
| 16 | 34.45472 | 4.823 | 1.48749 | 70.24 | 0.53007 | S-FSL5.OHARA |
| 17 | −15.77507 | 0.150 | | | | |
| 18 | −22.63906 | 0.600 | 1.76200 | 40.10 | 0.57655 | S-LAM55.OHARA |
| 19 | 11.73467 | 3.010 | 1.49700 | 81.54 | 0.53748 | S-FPL51.OHARA |
| 20 | 24.24847 | 2.000 | | | | |
| *21 | 16.20044 | 4.921 | 1.49710 | 81.56 | 0.53848 | M-FCD1.HOYA |
| *22 | −22.05615 | DD[22] | | | | |
| 23 | 1774.57843 | 2.000 | 1.85026 | 32.27 | 0.59299 | S-LAH71.OHARA |
| 24 | −32.27646 | 0.610 | 1.61800 | 63.33 | 0.54414 | S-PHM52.OHARA |
| 25 | 15.77366 | DD[25] | | | | |
| 26 | −30.38987 | 1.000 | 1.59551 | 39.24 | 0.58043 | S-TIM8.OHARA |
| 27 | −113.69277 | 0.150 | | | | |
| 28 | 33.28456 | 3.986 | 1.51823 | 58.90 | 0.54567 | S-NSL3.OHARA |
| 29 | −309.67068 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 11

| | Example 4 | | |
|---|---|---|---|
| | WIDE | MIDDLE | TELE |
| Zr | 1.0 | 2.8 | 10.5 |
| f | 18.55 | 52.64 | 193.90 |
| Bf | 13.92 | 30.19 | 52.81 |
| FNo. | 3.61 | 4.89 | 6.50 |
| 2ω (°) | 80.8 | 30.0 | 8.4 |
| DD[5] | 0.8000 | 27.7331 | 61.4618 |
| DD[12] | 25.0609 | 9.2962 | 1.4096 |
| DD[22] | 1.4142 | 4.2899 | 1.4432 |
| DD[25] | 13.1237 | 10.2480 | 13.0947 |
| DD[29] | 9.6525 | 25.9531 | 48.5604 |

TABLE 12

| | Example 4 | | | |
|---|---|---|---|---|
| Sn | 6 | 7 | 11 | 12 |
| KA | 1.0000000E+00 | 1.0000000E+00 | 1.0000000E+00 | 1.0000000E+00 |
| A3 | −4.0460023E−20 | −6.2743181E−20 | −8.6736174E−20 | 8.6736174E−20 |
| A4 | −5.4813332E−06 | 5.5067170E−06 | 1.2135932E−04 | 7.4142589E−05 |
| A5 | −1.7997128E−06 | −3.3626600E−06 | −1.7270359E−05 | −1.5725204E−05 |
| A6 | 2.9029425E−08 | 9.5272012E−08 | −8.0767231E−07 | −8.7833246E−07 |
| A7 | 1.0848018E−08 | 1.8577971E−08 | 3.4201457E−07 | 3.0515167E−07 |
| A8 | −6.6265476E−10 | −1.9850317E−09 | −7.8355569E−09 | −4.689788 1E−09 |
| A9 | −6.3301629E−12 | −9.2540789E−11 | −1.8165868E−09 | −1.8414489E−09 |
| A10 | 8.2732875E−13 | 7.0215557E−12 | 8.4116137E−11 | 7.1334995E−11 |
| Sn | 14 | 15 | 21 | 22 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | −1.3877788E−18 |
| A4 | −2.5198934E−05 | 3.4104233E−05 | −3.7818792E−05 | 4.6444213E−05 |
| A5 | 5.2340586E−06 | 3.2369126E−06 | −2.3682105E−05 | −1.8958088E−05 |
| A6 | −9.0664943E−07 | −5.3149800E−08 | 1.0272849E−05 | 7.1023268E−06 |
| A7 | 7.9119502E−09 | 3.5334516E−09 | −2.5006756E−06 | −1.6729435E−06 |
| A8 | 1.3257787E−08 | 4.7585946E−09 | 3.7220504E−07 | 2.5537033E−07 |
| A9 | −5.4022930E−10 | −4.4041304E−10 | −3.1657548E−08 | −2.2721376E−08 |
| A10 | −1.2942588E−10 | −7.0978248E−11 | 1.0915494E−09 | 8.1404195E−10 |

Example 5

Figure 10:
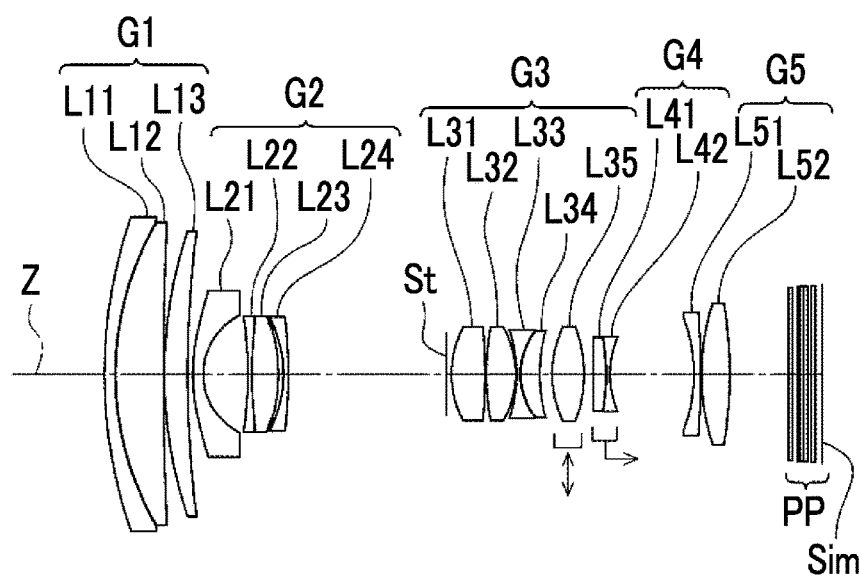
FIG. 10 is a diagram illustrating a cross-sectional view of a configuration and a movement trajectory of a zoom lens of Example 5 of the present disclosure.
Figure 11:
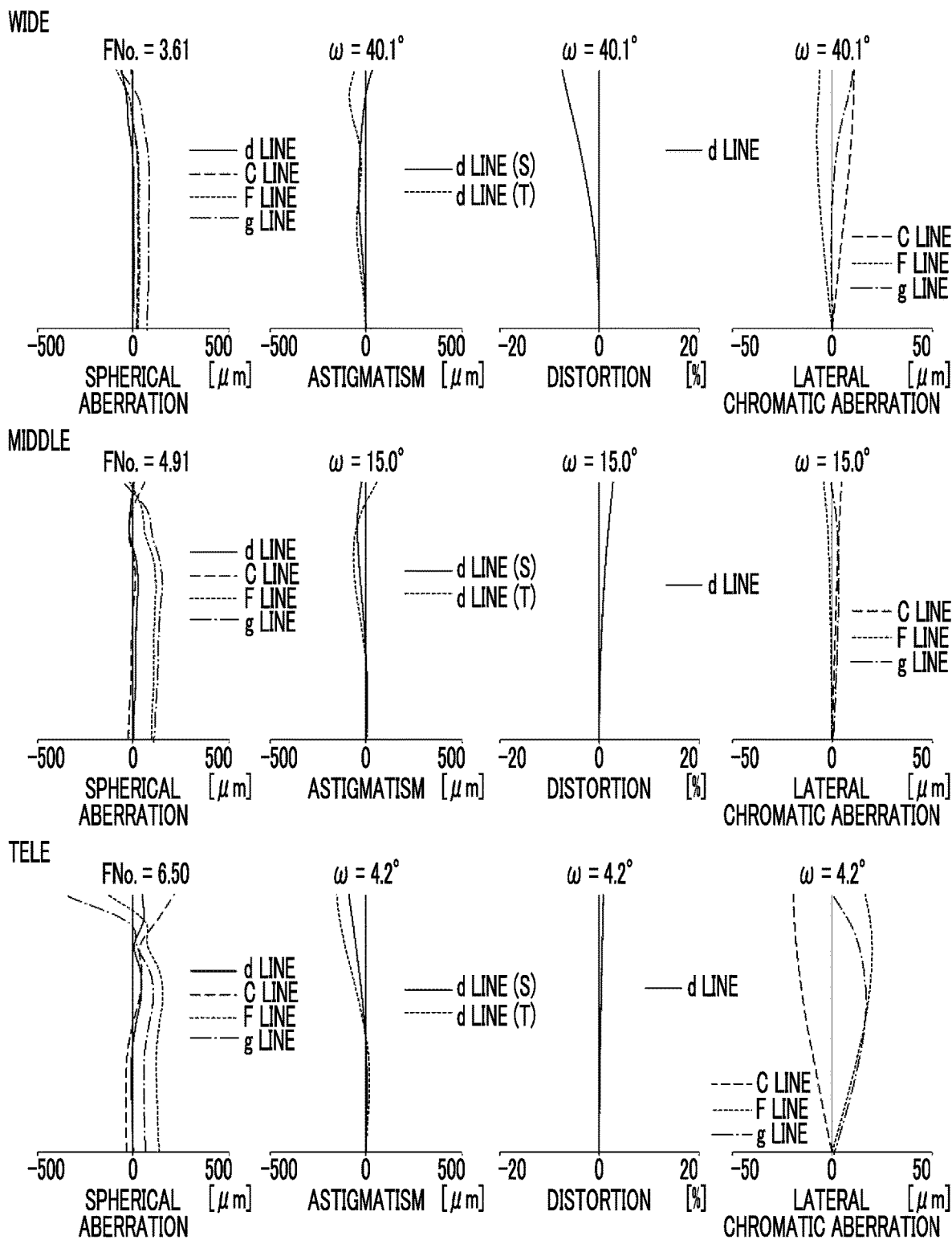
FIG. 11 is each aberration diagram of the zoom lens of Example 5 of the present disclosure.

FIG. 10 illustrates a cross-sectional view of a configuration and a movement trajectory of a zoom lens of Example 5. The zoom lens of Example 5 has the same configuration as the summary of the zoom lens of Example 1. For the zoom lens of Example 5, fundamental lens data is shown in Table 13, specifications and variable surface intervals are shown in Table 14, aspherical coefficients are shown in Table 15, and aberration diagrams are illustrated in FIG. 11.

TABLE 13

| | Example 5 | | | | | |
|---|---|---|---|---|---|---|
| Sn | R | D | Nd | νd | θgF | Material |
| 1 | 80.40248 | 1.700 | 1.72151 | 29.23 | 0.60541 | S-TIH18.OHARA |
| 2 | 50.65252 | 7.499 | 1.55032 | 75.50 | 0.54001 | FCD705.HOYA |
| 3 | 529.94837 | 0.150 | | | | |
| 4 | 76.17836 | 3.654 | 1.61800 | 63.33 | 0.54414 | S-PHM52.OHARA |
| 5 | 199.73213 | DD[5] | | | | |
| *6 | 32.47548 | 1.600 | 1.80625 | 40.91 | 0.56920 | L-LAH53.OHARA |
| *7 | 10.75272 | 6.961 | | | | |
| 8 | −66.93738 | 0.710 | 1.85150 | 40.78 | 0.56958 | S-LAH89.OHARA |
| 9 | 78.57459 | 4.014 | 1.89286 | 20.36 | 0.63944 | S-NPH4.OHARA |
| 10 | −26.77509 | 0.799 | | | | |
| *11 | −18.43630 | 0.700 | 1.85400 | 40.38 | 0.56890 | L-LAH85V.OHARA |
| *12 | −92.31998 | DD[12] | | | | |
| 13 (St) | ∞ | 0.800 | | | | |

TABLE 13-continued

Example 5

| Sn | R | D | Nd | νd | θgF | Material |
|---|---|---|---|---|---|---|
| *14 | 16.25675 | 5.213 | 1.58313 | 59.38 | 0.54237 | L-BAL42.OHARA |
| *15 | −69.47115 | 0.215 | | | | |
| 16 | 45.59660 | 4.591 | 1.48749 | 70.24 | 0.53007 | S-FSL5.OHARA |
| 17 | −15.97605 | 0.150 | | | | |
| 18 | −23.41498 | 0.600 | 1.76200 | 40.10 | 0.57655 | S-LAM55.OHARA |
| 19 | 11.78349 | 3.010 | 1.49700 | 81.54 | 0.53748 | S-FPL51.OHARA |
| 20 | 25.12439 | 2.000 | | | | |
| *21 | 16.38269 | 4.986 | 1.49710 | 81.56 | 0.53848 | M-FCD1.HOYA |
| *22 | −21.89142 | DD[22] | | | | |
| 23 | 611.01440 | 2.000 | 1.85026 | 32.27 | 0.59299 | S-LAH71.OHARA |
| 24 | −35.30580 | 0.610 | 1.61800 | 63.33 | 0.54414 | S-PHM52.OHARA |
| 25 | 15.90950 | DD[25] | | | | |
| 26 | −26.43627 | 1.000 | 1.59551 | 39.24 | 0.58043 | S-TIM8.OHARA |
| 27 | −158.96949 | 0.150 | | | | |
| 28 | 38.16559 | 4.406 | 1.51823 | 58.90 | 0.54567 | S-NSL3.OHARA |
| 29 | −74.35123 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 14

Example 5

| | WIDE | MIDDLE | TELE |
|---|---|---|---|
| Zr | 1.0 | 2.8 | 10.5 |
| f | 18.55 | 52.64 | 193.87 |
| Bf | 13.47 | 30.23 | 52.61 |
| FNo. | 3.61 | 4.91 | 6.50 |
| 2ω (°) | 80.2 | 30.0 | 8.4 |
| DD[5] | 0.8000 | 27.2150 | 60.6934 |

TABLE 14-continued

Example 5

| | WIDE | MIDDLE | TELE |
|---|---|---|---|
| DD[12] | 24.6988 | 9.2284 | 1.5544 |
| DD[22] | 1.4592 | 4.3378 | 1.4972 |
| DD[25] | 13.1127 | 10.2341 | 13.0747 |
| DD[29] | 9.1952 | 25.9853 | 48.3649 |

TABLE 15

Example 5

| Sn | 6 | 7 | 11 | 12 |
|---|---|---|---|---|
| KA | 1.0000000E+00 | 1.0000000E+00 | 1.0000000E+00 | 1.0000000E+00 |
| A3 | −1.6184009E−20 | 0.0000000E+00 | 0.0000000E+00 | 0.0000000E+00 |
| A4 | −1.5319076E−05 | −9.7349545E−06 | 1.2822030E−04 | 8.0087777E−05 |
| A5 | −5.4172205E−07 | −1.2730723E−06 | −1.6983419E−05 | −1.5045569E−05 |
| A6 | 8.1953726E−08 | 8.6237245E−08 | −8.5635745E−07 | −9.7459339E−07 |
| A7 | 3.5909968E−09 | 5.8416652E−09 | 3.4546024E−07 | 3.0452130E−07 |
| A8 | −7.7954286E−10 | −1.4452881E−10 | −7.6353704E−09 | −3.9691454E−09 |
| A9 | 5.2853346E−12 | −4.3272424E−11 | −1.8440512E−09 | −1.8515267E−09 |
| A10 | 8.9414920E−13 | −1.0366092E−12 | 8.3987485E−11 | 6.8045250E−11 |

| Sn | 14 | 15 | 21 | 22 |
|---|---|---|---|---|
| KA | 1.0000000E+00 | 1.0000000E+00 | 1.0000000E+00 | 1.0000000E+00 |
| A3 | 4.3368087E−20 | −2.1684043E−20 | 1.3877788E−18 | 1.3877788E−18 |
| A4 | −3.0526978E−05 | 3.6617953E−05 | −3.5427977E−05 | 4.5886324E−05 |
| A5 | 5.1014873E−06 | 2.7900679E−06 | −2.4000847E−05 | −1.9075554E−05 |
| A6 | −8.3498034E−07 | −2.1151195E−08 | 1.0271931E−05 | 7.0695998E−06 |
| A7 | 5.1321099E−10 | 4.3216964E−09 | −2.5020401E−06 | −1.6671658E−06 |
| A8 | 1.2306918E−08 | 3.1473766E−09 | 3.7204627E−07 | 2.5515206E−07 |
| A9 | −4.9576990E−10 | −4.4032016E−10 | −3.1661988E−08 | −2.2767335E−08 |
| A10 | −1.2332562E−10 | −6.2258688E−11 | 1.0912980E−09 | 8.1373249E−10 |

Example 6

Figure 12:
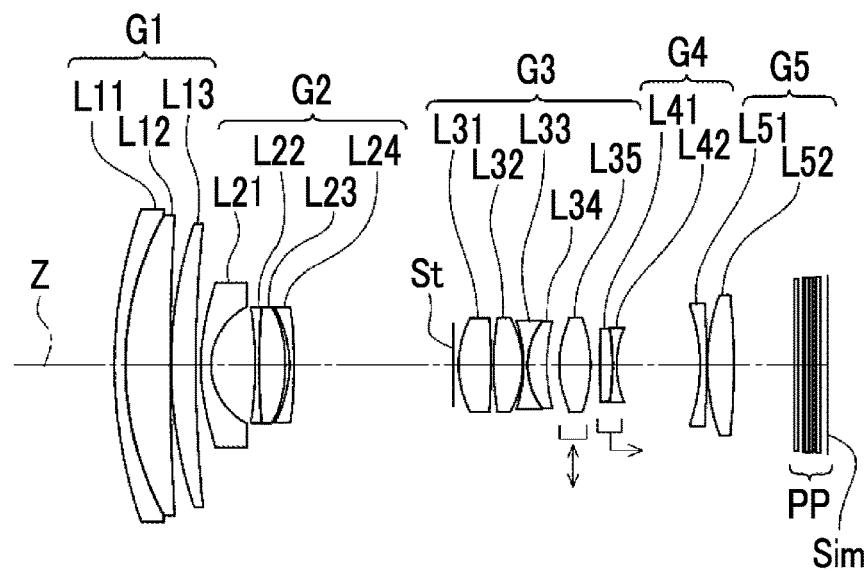
FIG. 12 is a diagram illustrating a cross-sectional view of a configuration and a movement trajectory of a zoom lens of Example 6 of the present disclosure.
Figure 12:
Figure 13:
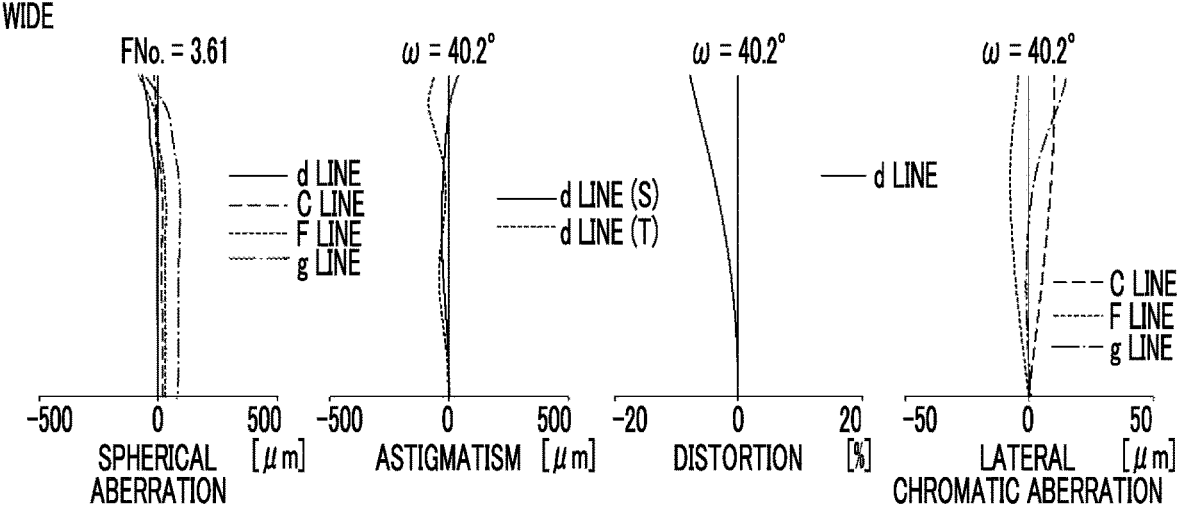
FIG. 13 is each aberration diagram of the zoom lens of Example 6 of the present disclosure.
Figure 13:
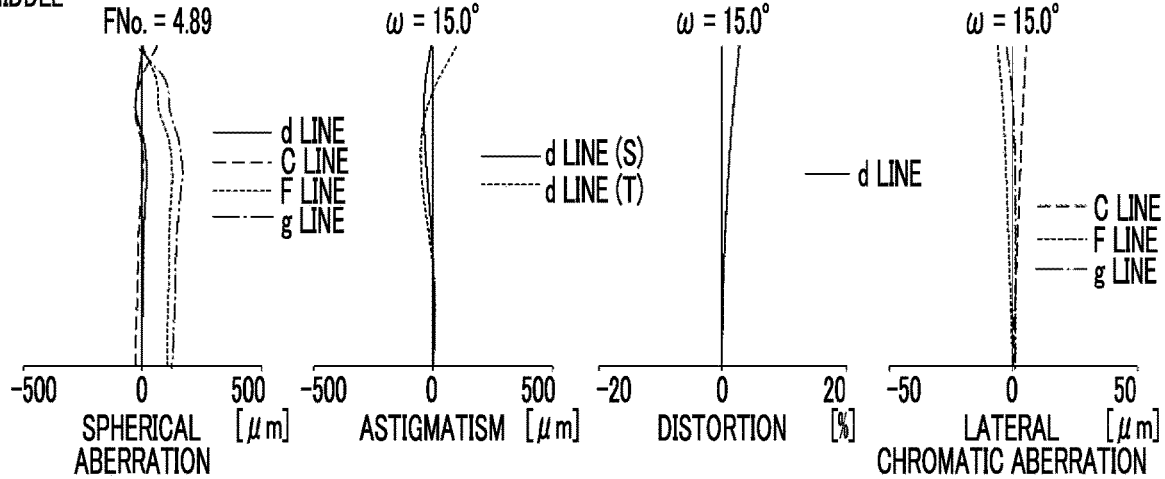
Figure 13:
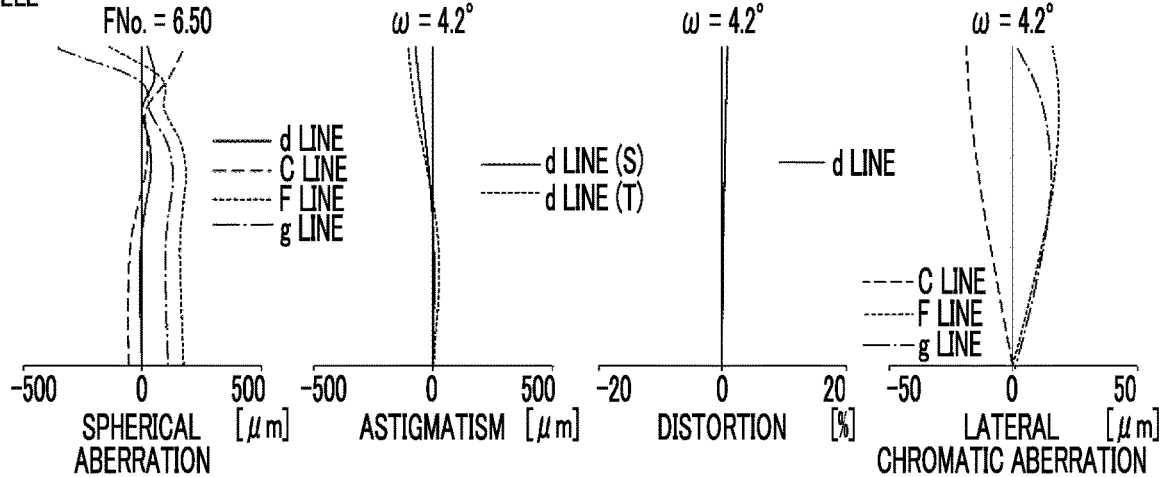

FIG. 12 illustrates a cross-sectional view of a configuration and a movement trajectory of a zoom lens of Example 6. The zoom lens of Example 6 has the same configuration as the summary of the zoom lens of Example 1. For the zoom lens of Example 6, fundamental lens data is shown in Table 16, specifications and variable surface intervals are shown in Table 17, aspherical coefficients are shown in Table 18, and aberration diagrams are illustrated in FIG. 13.

TABLE 16

Example 6

| Sn | R | D | Nd | νd | θgF | Material |
|---|---|---|---|---|---|---|
| 1 | 79.92287 | 1.700 | 1.78880 | 28.43 | 0.60092 | S-NBH58.OHARA |
| 2 | 52.66219 | 7.044 | 1.55032 | 75.50 | 0.54001 | FCD705.HOYA |
| 3 | 439.93535 | 0.150 | | | | |
| 4 | 76.10953 | 3.847 | 1.61800 | 63.33 | 0.54414 | S-PHM52.OHARA |
| 5 | 230.16327 | DD[5] | | | | |
| *6 | 32.14936 | 1.600 | 1.80625 | 40.91 | 0.56920 | L-LAH53.OHARA |
| *7 | 10.67382 | 6.968 | | | | |
| 8 | −62.59400 | 0.710 | 1.85150 | 40.78 | 0.56958 | S-LAH89.OHARA |
| 9 | 134.75172 | 3.961 | 1.89286 | 20.36 | 0.63944 | S-NPH4.OHARA |
| 10 | −24.35505 | 0.650 | | | | |
| *11 | −17.97468 | 0.700 | 1.85400 | 40.38 | 0.56890 | L-LAH85V.OHARA |
| *12 | −95.43792 | DD[12] | | | | |
| 13 (St) | ∞ | 0.800 | | | | |
| *14 | 16.36858 | 5.071 | 1.58313 | 59.38 | 0.54237 | L-BAL42.OHARA |
| *15 | −70.69613 | 0.435 | | | | |
| 16 | 49.18247 | 4.553 | 1.48749 | 70.24 | 0.53007 | S-FSL5.OHARA |
| 17 | −15.88302 | 0.150 | | | | |
| 18 | −23.66575 | 0.600 | 1.76200 | 40.10 | 0.57655 | S-LAM55.OHARA |
| 19 | 11.73080 | 3.074 | 1.49700 | 81.54 | 0.53748 | S-FPL51.OHARA |
| 20 | 26.16320 | 2.000 | | | | |
| *21 | 16.54925 | 4.958 | 1.49710 | 81.56 | 0.53848 | M-FCD1.HOYA |
| *22 | −22.18290 | DD[22] | | | | |
| 23 | 472.08939 | 2.000 | 1.85026 | 32.27 | 0.59299 | S-LAH71.OHARA |
| 24 | −36.35401 | 0.610 | 1.61800 | 63.33 | 0.54414 | S-PHM52.OHARA |
| 25 | 15.89944 | DD[25] | | | | |
| 26 | −29.77929 | 1.000 | 1.59551 | 39.24 | 0.58043 | S-TIM8.OHARA |
| 27 | −205.39455 | 0.150 | | | | |
| 28 | 35.47663 | 4.141 | 1.51823 | 58.90 | 0.54567 | S-NSL3.OHARA |
| 29 | −122.39563 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 17

Example 6

| | WIDE | MIDDLE | TELE |
|---|---|---|---|
| Zr | 1.0 | 2.8 | 10.5 |
| f | 18.55 | 52.65 | 193.88 |
| Bf | 13.74 | 30.03 | 52.40 |
| FNo. | 3.61 | 4.89 | 6.50 |
| 2ω (°) | 80.4 | 30.0 | 8.4 |
| DD[5] | 0.8000 | 27.7604 | 61.1444 |
| DD[12] | 25.0596 | 9.4095 | 1.5352 |
| DD[22] | 1.4620 | 4.3449 | 1.4992 |
| DD[25] | 13.1207 | 10.2378 | 13.0835 |
| DD[29] | 9.4733 | 25.7893 | 48.1815 |

TABLE 18

Example 6

| Sn | 6 | 7 | 11 | 12 |
|---|---|---|---|---|
| KA | 1.0000000E+00 | 1.0000000E+00 | 1.0000000E+00 | 1.0000000E+00 |
| A3 | −1.6184009E−20 | 2.5097273E−20 | 8.6736174E−20 | 0.0000000E+00 |
| A4 | −2.0348045E−05 | −1.4170348E−05 | 1.2744253E−04 | 7.9435367E−05 |

TABLE 18-continued

| | Example 6 | | | |
|---|---|---|---|---|
| A5 | −7.3969500E−07 | −1.9536216E−06 | −1.7720815E−05 | −1.6128064E−05 |
| A6 | 9.6741402E−08 | 1.4695133E−07 | 8.4715645E−07 | −9.2004767E−07 |
| A7 | 5.0894900E−09 | 2.9692363E−09 | 3.5311142E−07 | 3.1473371E−07 |
| A8 | −7.9668072E−10 | −9.5273043E−10 | −7.8284326E−09 | −4.6838112E−09 |
| A9 | 2.4664562E−12 | 2.4717334E−11 | 1.8734026E−09 | 1.8867120E−09 |
| A10 | 9.0534508E−13 | 2.0584837E−12 | 8.5831468E−11 | 7.0875762E−11 |
| Sn | 14 | 15 | 21 | 22 |
| KA | 1.0000000E+00 | 1.0000000E+00 | 1.0000000E+00 | 1.0000000E+00 |
| A3 | −4.3368087E−20 | −4.3368087E−20 | 2.7755576E−18 | 1.3877788E−18 |
| A4 | −2.8053913E−05 | 3.7443495E−05 | −3.6116018E−05 | 4.3021969E−05 |
| A5 | 4.5822557E−06 | 2.9346366E−06 | −2.3221932E−05 | −1.8634608E−05 |
| A6 | −8.2861580E−07 | −7.8224689E−08 | 1.0214602E−05 | 7.0838589E−06 |
| A7 | 1.0279914E−08 | 3.1810096E−09 | 2.5121375E−06 | −1.6798238E−06 |
| A8 | 1.1719800E−08 | 4.2669894E−09 | 3.7244174E−07 | 2.5499037E−07 |
| A9 | −5.4087682E−10 | −4.3913601E−10 | 3.1609884E−08 | −2.2701053E−08 |
| A10 | −1.1934390E−10 | −6.8101492E−11 | 1.0914415E−09 | 8.1521406E−10 |

Example 7

Figure 14:
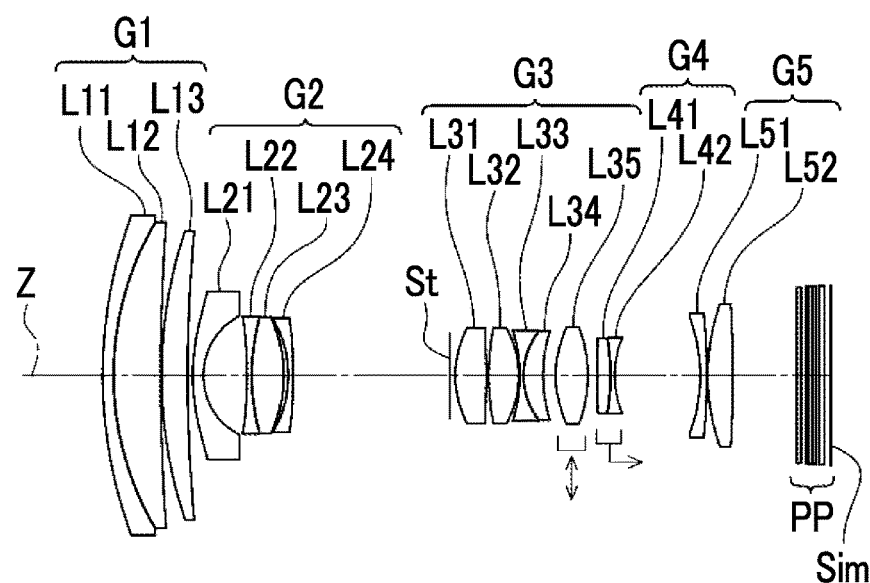
FIG. 14 is a diagram illustrating a cross-sectional view of a configuration and a movement trajectory of a zoom lens of Example 7 of the present disclosure.
Figure 15:
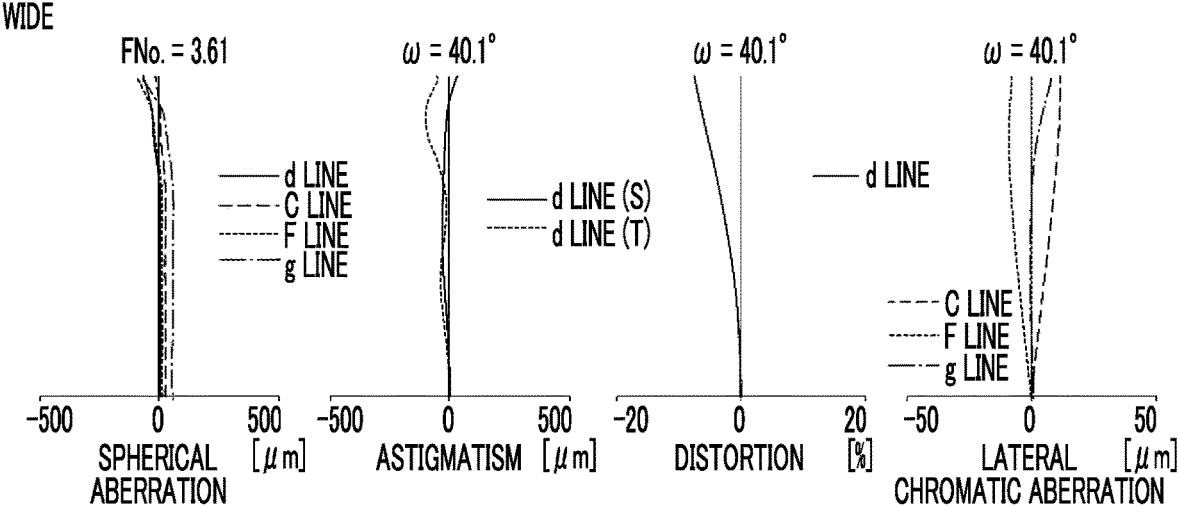
FIG. 15 is each aberration diagram of the zoom lens of Example 7 of the present disclosure.
Figure 15:
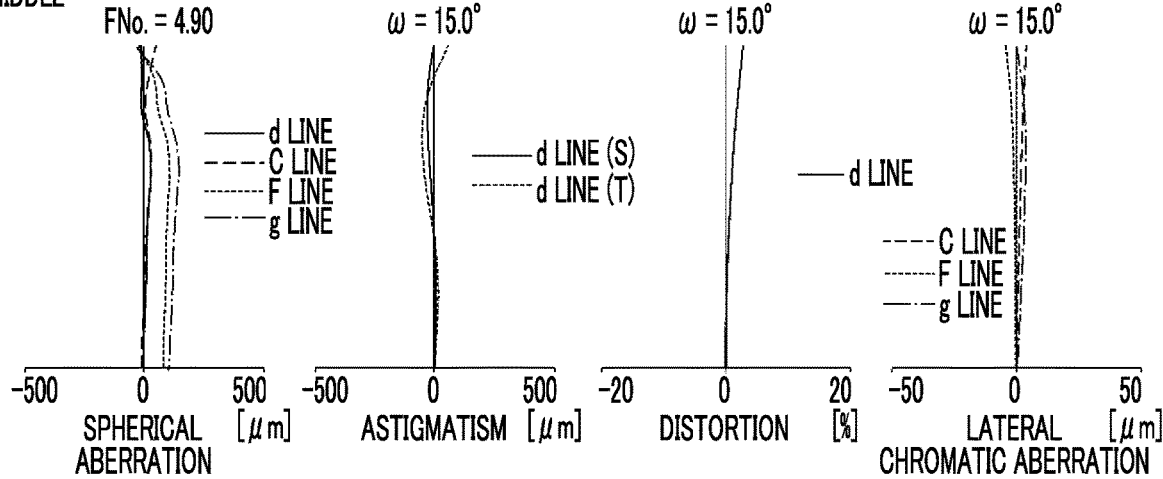
Figure 15:
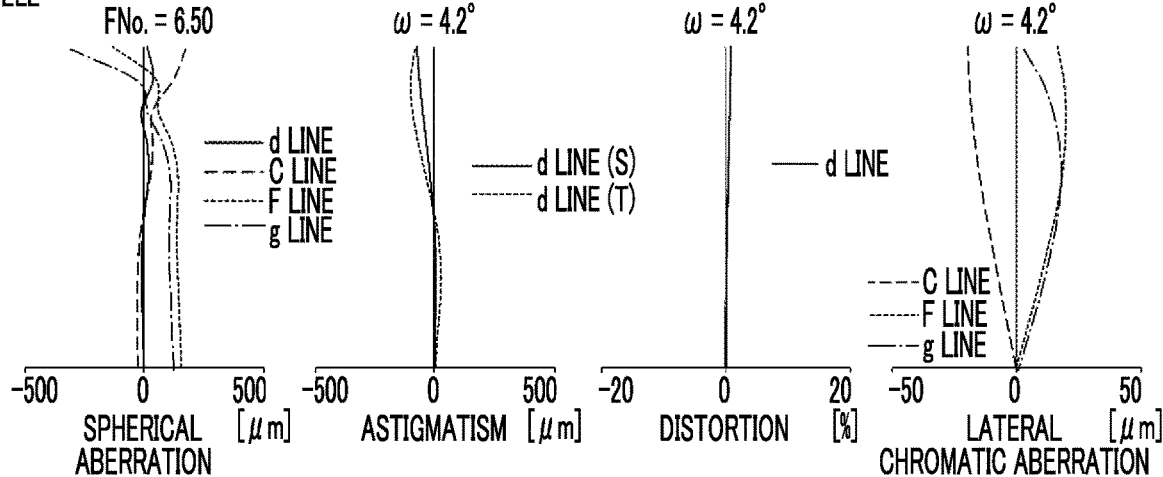

FIG. 14 illustrates a cross-sectional view of a configuration and a movement trajectory of a zoom lens of Example 7. The zoom lens of Example 7 has the same configuration as the summary of the zoom lens of Example 1. For the zoom lens of Example 7, fundamental lens data is shown in Table 19, specifications and variable surface intervals are shown in Table 20, aspherical coefficients are shown in Table 21, and aberration diagrams are illustrated in FIG. 15.

TABLE 19

| | Example 7 | | | | | |
|---|---|---|---|---|---|---|
| Sn | R | D | Nd | vd | θgF | Material |
| 1 | 75.66699 | 1.700 | 1.78880 | 28.43 | 0.60092 | S-NBH58.OHARA |
| 2 | 49.99538 | 7.222 | 1.53775 | 74.70 | 0.53936 | S-FPM3.OHARA |
| 3 | 355.03398 | 0.150 | | | | |
| 4 | 75.36110 | 4.014 | 1.61800 | 63.33 | 0.54414 | S-PHM52.OHARA |
| 5 | 259.87697 | DD[5] | | | | |
| *6 | 33.38828 | 1.600 | 1.80625 | 40.91 | 0.56920 | L-LAH53.OHARA |
| *7 | 10.87241 | 6.742 | | | | |
| 8 | −67.88106 | 0.710 | 1.85150 | 40.78 | 0.56958 | S-LAH89.OHARA |
| 9 | 36.13072 | 4.874 | 1.85896 | 22.73 | 0.62844 | S-NPH5.OHARA |
| 10 | −25.31658 | 0.676 | | | | |
| *11 | −18.28537 | 0.700 | 1.85400 | 40.38 | 0.56890 | L-LAH85V.OHARA |
| *12 | −99.94155 | DD[12] | | | | |
| 13 (St) | ∞ | 0.800 | | | | |
| *14 | 16.46536 | 4.763 | 1.58313 | 59.38 | 0.54237 | L-BAL42.OHARA |
| *15 | −80.44065 | 0.374 | | | | |
| 16 | 41.01419 | 4.584 | 1.48749 | 70.24 | 0.53007 | S-FSL5.OHARA |
| 17 | −16.55040 | 0.150 | | | | |
| 18 | −24.95776 | 0.600 | 1.76200 | 40.10 | 0.57655 | S-LAM55.OHARA |
| 19 | 11.77474 | 3.035 | 1.49700 | 81.54 | 0.53748 | S-FPL51.OHARA |
| 20 | 24.94427 | 2.000 | | | | |
| *21 | 16.55738 | 4.958 | 1.49710 | 81.56 | 0.53848 | M-FCD1.H0YA |
| *22 | −22.08017 | DD[22] | | | | |
| 23 | 731.87447 | 2.000 | 1.85026 | 32.27 | 0.59299 | S-LAH71.OHARA |
| 24 | −33.33886 | 0.610 | 1.61800 | 63.33 | 0.54414 | S-PHM52.OHARA |
| 25 | 15.79853 | DD[25] | | | | |
| 26 | −28.27858 | 1.000 | 1.59270 | 35.31 | 0.59336 | S-FTM16.OHARA |
| 27 | −108.22522 | 0.150 | | | | |
| 28 | 35.07131 | 3.872 | 1.53996 | 59.46 | 0.54418 | S-BAL12.OHARA |
| 29 | −234.26012 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 20

| | Example 7 | | |
|---|---|---|---|
| | WIDE | MIDDLE | TELE |
| Zr | 1.0 | 2.8 | 10.5 |
| f | 18.55 | 52.65 | 193.89 |
| Bf | 14.12 | 30.43 | 52.80 |
| FNo. | 3.61 | 4.90 | 6.50 |
| 2ω (°) | 80.2 | 30.0 | 8.4 |
| DD[5] | 0.8000 | 27.2636 | 59.8713 |
| DD[12] | 24.2213 | 9.0890 | 1.4272 |
| DD[22] | 1.4974 | 4.3857 | 1.5264 |
| DD[25] | 13.1659 | 10.2776 | 13.1369 |
| DD[29] | 9.8489 | 26.1769 | 48.5565 |

TABLE 21

| | Example 7 | | | |
|---|---|---|---|---|
| Sn | 6 | 7 | 11 | 12 |
| KA | 1.0000000E+00 | 1.0000000E+00 | 1.0000000E+00 | 1.0000000E+00 |
| A3 | −2.4276014E−20 | 6.2743181E−21 | 8.6736174E−20 | 0.0000000E+00 |
| A4 | 2.1999093E−05 | 1.6567941E−05 | 1.2246297E−04 | 7.7029115E−05 |
| A5 | −1.7265184E−07 | −1.3981369E−06 | −1.8008704E−05 | −1.6121527E−05 |
| A6 | 9.6077960E−08 | 1.4303847E−07 | −6.4430545E−07 | −7.6771669E−07 |
| A7 | 3.2921494E−09 | 6.2327755E−09 | 3.5387342E−07 | 3.1855125E−07 |
| A8 | −8.0440070E−10 | −6.0986383E−10 | −1.0339468E−08 | −7.0301299E−09 |
| A9 | 4.6628743E−12 | 4.4579722E−11 | −1.8762048E−09 | −1.8996026E−09 |
| A10 | 9.5470240E−13 | 4.0503481E−13 | 9.6333514E−11 | 8.3255910E−11 |
| Sn | 14 | 15 | 21 | 22 |
| KA | 1.0000000E+00 | 1.0000000E+00 | 1.0000000E+00 | 1.0000000E+00 |
| A3 | −4.3368087E−20 | 0.0000000E+00 | −2.7755576E−18 | 1.3877788E−18 |
| A4 | −2.7733939E−05 | 3.5670903E−05 | −3.4847209E−05 | 4.4862828E−05 |
| A5 | 4.8649481E−06 | 3.0919649E−06 | −2.3237056E−05 | −1.8590974E−05 |
| A6 | −7.8747430E−07 | −2.9459464E−08 | 1.0177329E−05 | 7.0248154E−06 |
| A7 | 6.8386462E−09 | −5.0343912E−09 | −2.5112638E−06 | −1.6812635E−06 |
| A8 | 1.0769758E−08 | 3.6739360E−09 | 3.7238188E−07 | 2.5577451E−07 |
| A9 | −5.1796165E−10 | −4.0529851E−10 | −3.1617906E−08 | −2.2700324E−08 |
| A10 | −1.1265376E−10 | −6.6860242E−11 | 1.0937184E−09 | 8.1223108E−10 |

Example 8

Figure 16:
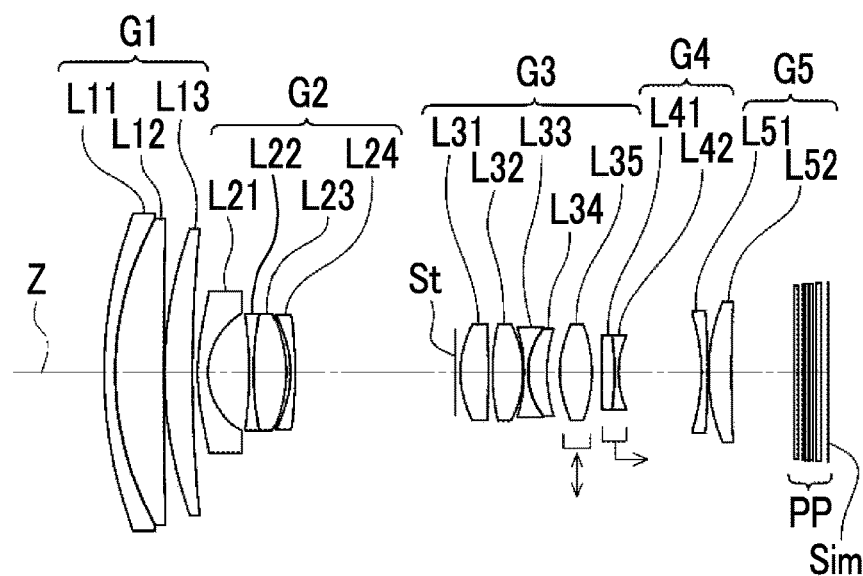
FIG. 16 is a diagram illustrating a cross-sectional view of a configuration and a movement trajectory of a zoom lens of Example 8 of the present disclosure.
Figure 17:
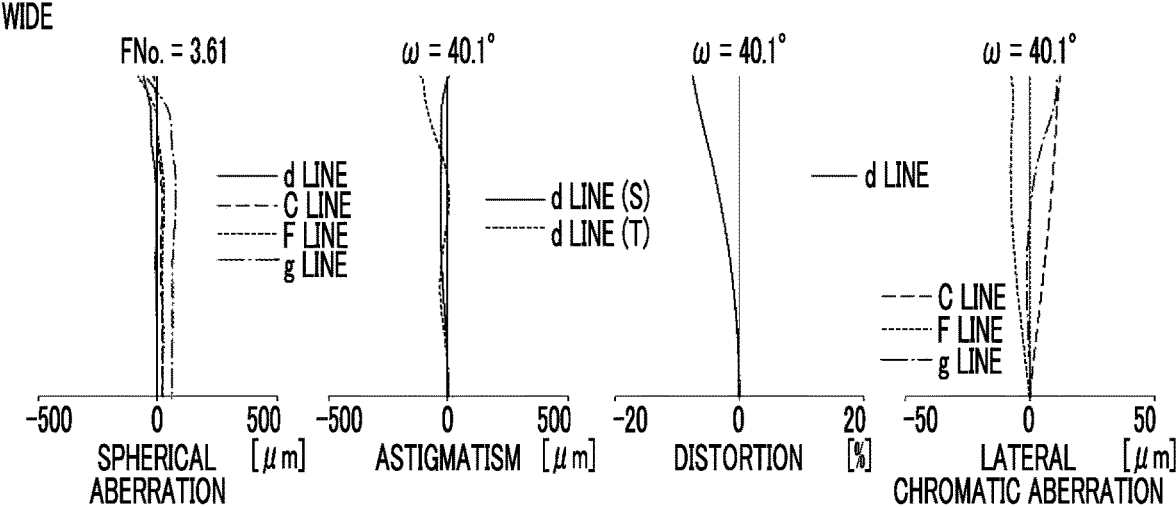
FIG. 17 is each aberration diagram of the zoom lens of Example 8 of the present disclosure.
Figure 17:
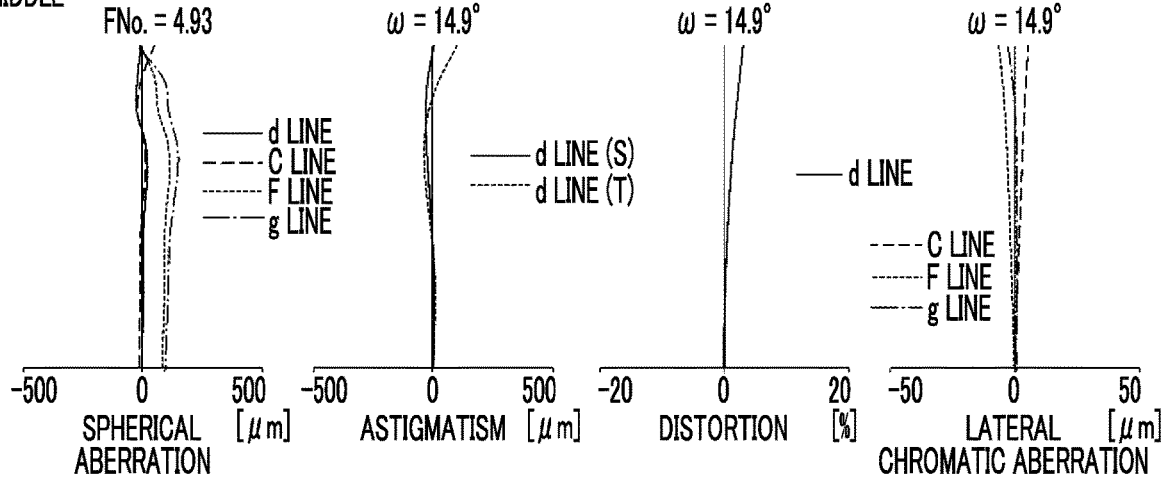
Figure 17:
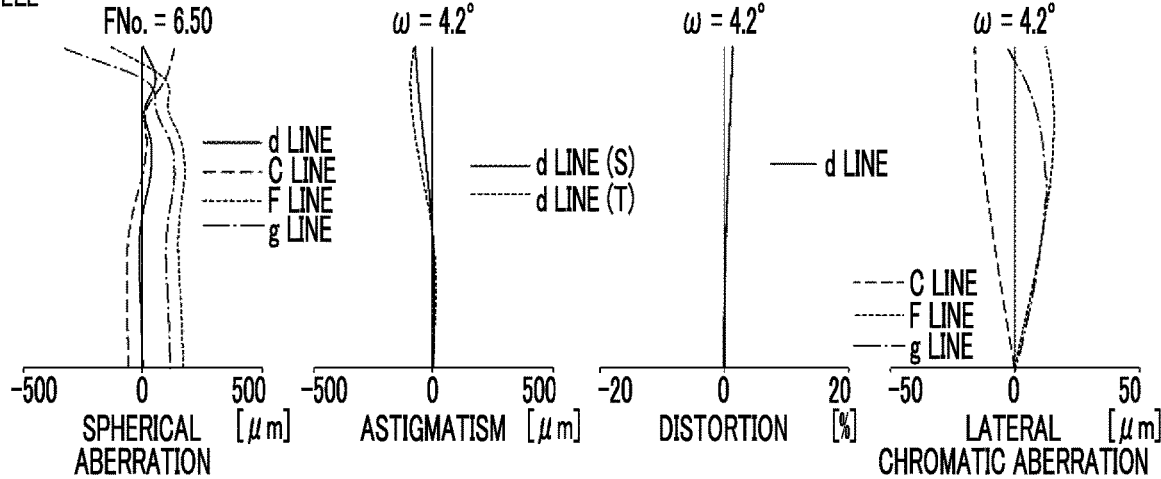

FIG. 16 illustrates a cross-sectional view of a configuration and a movement trajectory of a zoom lens of Example 8. The zoom lens of Example 8 has the same configuration as the summary of the zoom lens of Example 1. For the zoom lens of Example 8, fundamental lens data is shown in Table 22, specifications and variable surface intervals are shown in Table 23, aspherical coefficients are shown in Table 24, and aberration diagrams are illustrated in FIG. 17.

TABLE 22

| | Example 8 | | | | | |
|---|---|---|---|---|---|---|
| Sn | R | D | Nd | vd | θgF | Material |
| 1 | 74.33604 | 1.700 | 1.72825 | 28.46 | 0.60772 | S-TIH10.OHARA |
| 2 | 52.03931 | 7.510 | 1.43700 | 95.10 | 0.53364 | FCD100.HOYA |
| 3 | 1019.16393 | 0.150 | | | | |
| 4 | 69.37909 | 4.301 | 1.59522 | 67.73 | 0.54426 | S-FPM2.OHARA |
| 5 | 240.30144 | DD[5] | | | | |
| *6 | 38.02095 | 1.600 | 1.85400 | 40.38 | 0.56890 | L-LAH85V.OHARA |
| *7 | 11.17666 | 6.388 | | | | |
| 8 | −69.57968 | 0.700 | 1.83481 | 42.72 | 0.56486 | S-LAH55V.OHARA |
| 9 | 46.15304 | 4.985 | 1.80809 | 22.76 | 0.63073 | S-NPHIW.OHARA |
| 10 | −22.39544 | 0.656 | | | | |
| *11 | −17.97541 | 0.700 | 1.85400 | 40.38 | 0.56890 | L-LAH85V.OHARA |
| *12 | −76.61644 | DD[12] | | | | |
| 13 (St) | ∞ | 0.800 | | | | |

TABLE 22-continued

Example 8

| Sn | R | D | Nd | vd | θgF | Material |
|---|---|---|---|---|---|---|
| *14 | 16.52046 | 4.317 | 1.58313 | 59.38 | 0.54237 | L-BAL42.OHARA |
| *15 | −96.80188 | 0.629 | | | | |
| 16 | 35.08851 | 4.749 | 1.48749 | 70.24 | 0.53007 | S-FSL5.OHARA |
| 17 | −16.69743 | 0.150 | | | | |
| 18 | −25.07416 | 0.600 | 1.76200 | 40.10 | 0.57655 | S-LAM55.OHARA |
| 19 | 11.49486 | 3.010 | 1.49700 | 81.54 | 0.53748 | S-FPL51.OHARA |
| 20 | 23.12636 | 2.000 | | | | |
| *21 | 16.32963 | 4.992 | 1.49710 | 81.56 | 0.53848 | M-FCD1.HOYA |
| *22 | −21.94226 | DD[22] | | | | |
| 23 | 294.60398 | 2.000 | 1.85026 | 32.27 | 0.59299 | S-LAH71.OHARA |
| 24 | −38.08535 | 0.610 | 1.61800 | 63.33 | 0.54414 | S-PHM52.OHARA |
| 25 | 15.35656 | DD[25] | | | | |
| 26 | −31.80299 | 1.000 | 1.60342 | 38.03 | 0.58356 | S-TIM5.OHARA |
| 27 | −136.22114 | 0.150 | | | | |
| 28 | 30.95153 | 3.534 | 1.51823 | 58.90 | 0.54567 | S-NSL3.OHARA |
| 29 | 273.53517 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 23

Example 8

| | WIDE | MIDDLE | TELE |
|---|---|---|---|
| Zr | 1.0 | 2.8 | 10.5 |
| f | 18.56 | 52.66 | 193.91 |
| Bf | 13.93 | 29.62 | 49.86 |
| FNo. | 3.61 | 4.93 | 6.50 |
| 2ω (°) | 80.2 | 29.8 | 8.4 |
| DD[5] | 0.8000 | 26.8487 | 59.4570 |
| DD[12] | 24.8124 | 9.3522 | 1.5585 |
| DD[22] | 1.5202 | 4.3965 | 1.5398 |
| DD[25] | 12.7806 | 9.9043 | 12.7610 |
| DD[29] | 9.6628 | 25.3677 | 45.6360 |

TABLE 24

Example 8

| Sn | 6 | 7 | 11 | 12 |
|---|---|---|---|---|
| KA | 1.0000000E+00 | 1.0000000E+00 | 1.0000000E+00 | 1.0000000E+00 |
| A3 | −1.6184009E−20 | −2.5097273E−20 | 0.0000000E+00 | 8.6736174E−20 |
| A4 | −4.6186677E−06 | 1.0391977E−05 | 1.2172142E−04 | 7.6458407E−05 |
| A5 | −9.9556002E−07 | −2.4256537E−06 | −1.6936171E−05 | −1.5224891E−05 |
| A6 | −3.2958767E−08 | 1.1222168E−07 | −6.5180330E−07 | −7.7109665E−07 |
| A7 | 6.2762313E−09 | 1.0990602E−08 | 3.4013061E−07 | 3.0171799E−07 |
| A8 | −3.9228446E−10 | −1.5644707E−09 | −1.0647387E−08 | −6.9462819E−09 |
| A9 | 2.0303618E−12 | −7.0693502E−11 | −1.7989955E−09 | −1.8194262E−09 |
| A10 | 5.2190379E−13 | 4.9857639E−12 | 9.9284552E−11 | 8.3990687E−11 |

| Sn | 14 | 15 | 21 | 22 |
|---|---|---|---|---|
| KA | 1.0000000E+00 | 1.0000000E+00 | 1.0000000E+00 | 1.0000000E+00 |
| A3 | 4.3368087E−20 | 2.1684043E−20 | −5.5511151E−18 | 0.0000000E+00 |
| A4 | −2.4382447E−05 | 3.5363981E−05 | −3.5831781E−05 | 4.5885303E−05 |
| A5 | 4.7146949E−06 | 2.4110064E−06 | −2.3797785E−05 | −1.8535650E−05 |
| A6 | −8.6242528E−07 | −4.3142472E−08 | 1.0240679E−05 | 7.0511517E−06 |
| A7 | 1.9035308E−08 | 9.6786553E−09 | −2.5067019E−06 | −1.6941601E−06 |
| A8 | 1.2632532E−08 | 5.3467738E−09 | 3.7128934E−07 | 2.5651339E−07 |
| A9 | −5.9130805E−10 | −4.8536575E−10 | −3.1620721E−08 | −2.2624023E−08 |
| A10 | −1.2541796E−10 | −8.0032464E−11 | 1.0999586E−09 | 8.0634339E−10 |

Example 9

Figure 18:
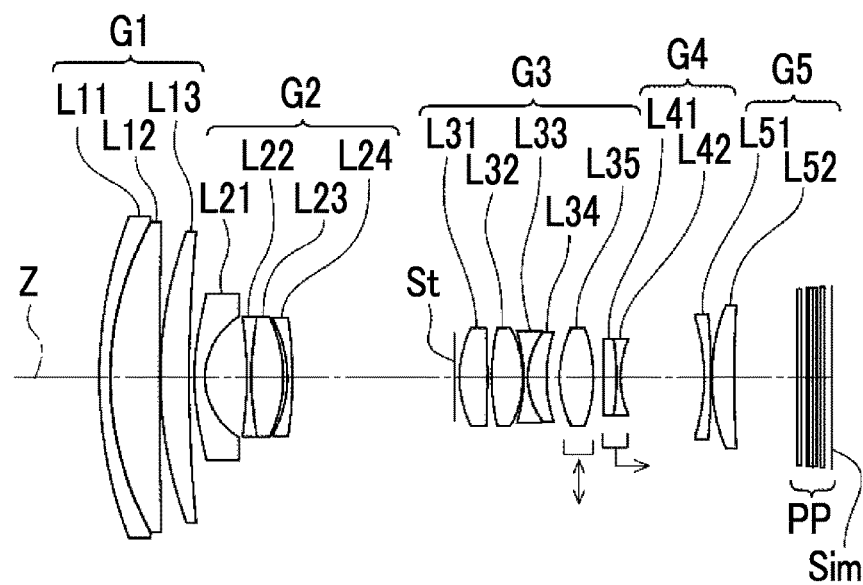
FIG. 18 is a diagram illustrating a cross-sectional view of a configuration and a movement trajectory of a zoom lens of Example 9 of the present disclosure.
Figure 19:
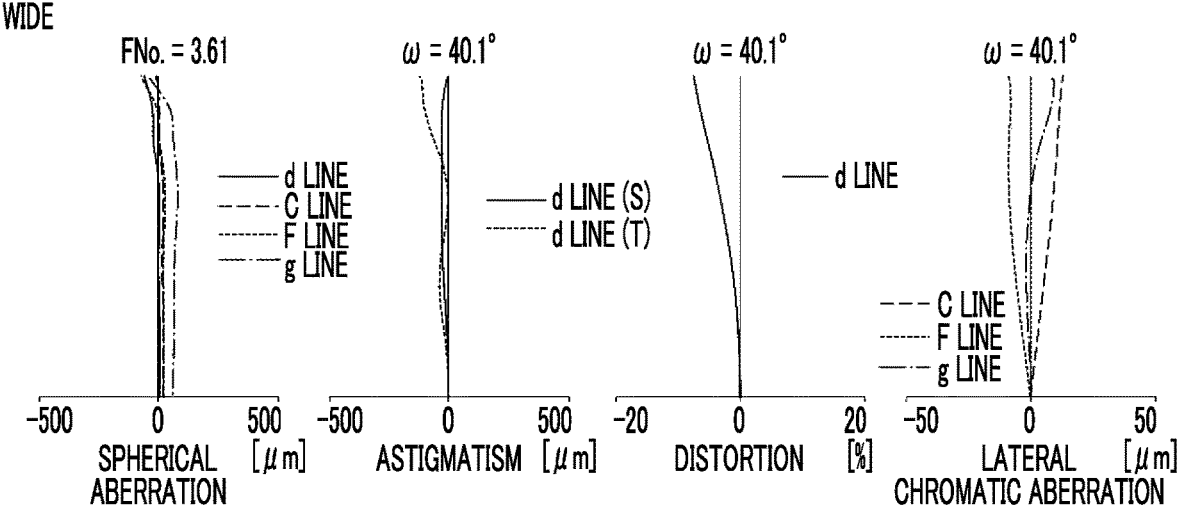
FIG. 19 is each aberration diagram of the zoom lens of Example 9 of the present disclosure.
Figure 19:
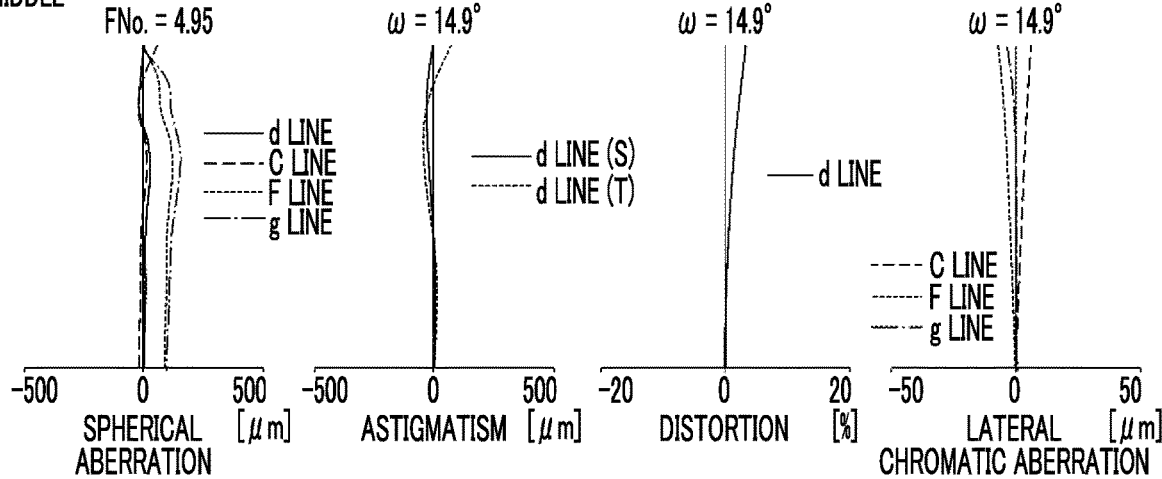
Figure 19:
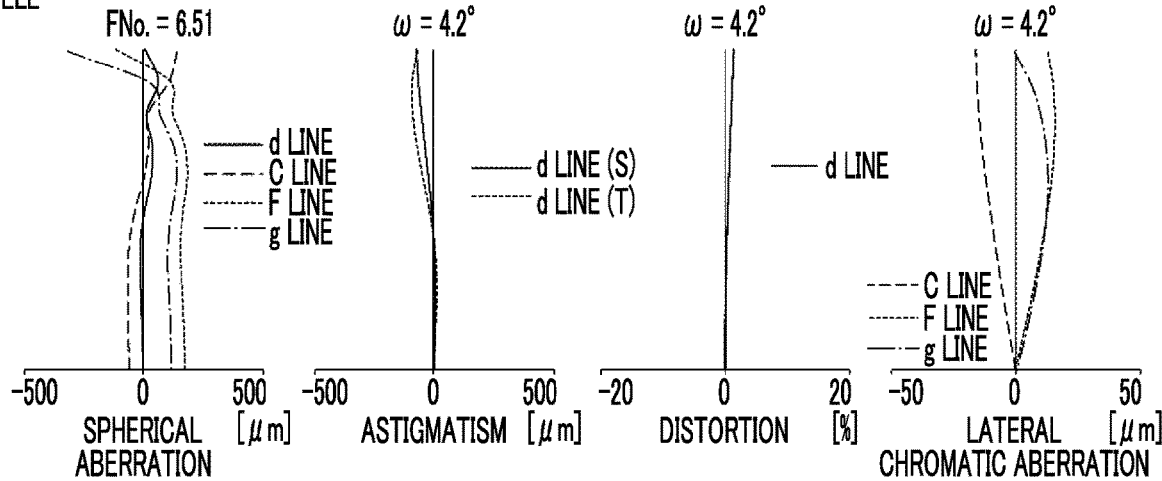

FIG. 18 illustrates a cross-sectional view of a configuration and a movement trajectory of a zoom lens of Example 9. The zoom lens of Example 9 has the same configuration as the summary of the zoom lens of Example 1. For the zoom lens of Example 9, fundamental lens data is shown in Table 25, specifications and variable surface intervals are shown in Table 26, aspherical coefficients are shown in Table 27, and aberration diagrams are illustrated in FIG. 19.

TABLE 24

Example 9

| Sn | R | D | Nd | νd | θgF | Material |
|---|---|---|---|---|---|---|
| 1 | 73.90783 | 1.700 | 1.72825 | 28.46 | 0.60772 | S-TIH1O.OHARA |
| 2 | 52.39567 | 7.510 | 1.41390 | 100.82 | 0.53373 | K-FIR100UV.SUMITA |
| 3 | 1331.89310 | 0.150 | | | | |
| 4 | 68.52761 | 4.375 | 1.59522 | 67.73 | 0.54426 | S-FPM2.OHARA |
| 5 | 252.53888 | DD[5] | | | | |
| *6 | 37.98215 | 1.600 | 1.85400 | 40.38 | 0.56890 | L-LAH85V.OHARA |
| *7 | 11.17108 | 6.405 | | | | |
| 8 | −69.37635 | 0.700 | 1.83481 | 42.72 | 0.56486 | S-LAH55V.OHARA |
| 9 | 47.02659 | 4.970 | 1.80809 | 22.76 | 0.63073 | S-NPHIW.OHARA |
| 10 | −22.40343 | 0.658 | | | | |
| *11 | −17.98027 | 0.700 | 1.85400 | 40.38 | 0.56890 | L-LAH85V.OHARA |
| *12 | −75.69489 | DD[12] | | | | |
| 13 (St) | ∞ | 0.800 | | | | |
| *14 | 16.53163 | 4.311 | 1.58313 | 59.38 | 0.54237 | L-BAL42.OHARA |
| *15 | −96.29985 | 0.656 | | | | |
| 16 | 35.33126 | 4.736 | 1.48749 | 70.24 | 0.53007 | S-FSL5.0HARA |
| 17 | −16.66820 | 0.150 | | | | |
| 18 | −24.97859 | 0.600 | 1.76200 | 40.10 | 0.57655 | S-LAM55.0HARA |
| 19 | 11.52003 | 3.010 | 1.49700 | 81.54 | 0.53748 | S-FPL51.OHARA |
| 20 | 23.14806 | 2.000 | | | | |
| *21 | 16.36129 | 4.989 | 1.49710 | 81.56 | 0.53848 | M-FCD1.H0YA |
| *22 | −21.92208 | DD[22] | | | | |
| 23 | 287.44316 | 2.000 | 1.85026 | 32.27 | 0.59299 | S-LAH71.OHARA |
| 24 | −38.46553 | 0.610 | 1.61800 | 63.33 | 0.54414 | S-PHM52.0HARA |
| 25 | 15.40833 | DD[25] | | | | |
| 26 | −32.05887 | 1.000 | 1.60342 | 38.03 | 0.58356 | S-TIM5 .OHARA |
| 27 | −126.15262 | 0.150 | | | | |
| 28 | 30.70326 | 3.436 | 1.51823 | 58.90 | 0.54567 | S-NSL3.0HARA |
| 29 | 193.17470 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 26

Example 9

| | WIDE | MIDDLE | TELE |
|---|---|---|---|
| Zr | 1.0 | 2.8 | 10.5 |
| f | 18.55 | 52.65 | 193.89 |
| Bf | 13.93 | 29.70 | 49.71 |
| FNo. | 3.61 | 4.95 | 6.51 |
| 2ω (°) | 80.2 | 29.8 | 8.4 |
| DD[5] | 0.8000 | 26.7422 | 59.5664 |

TABLE 26-continued

Example 9

| | WIDE | MIDDLE | TELE |
|---|---|---|---|
| DD[12] | 24.7887 | 9.3171 | 1.5273 |
| DD[22] | 1.5475 | 4.4240 | 1.5673 |
| DD[25] | 12.8107 | 9.9342 | 12.7909 |
| DD[29] | 9.6528 | 25.4492 | 45.4714 |

TABLE 27

Example 9

| Sn | 6 | 7 | 11 | 12 |
|---|---|---|---|---|
| KA | 1.0000000E+00 | 1.0000000E+00 | 1.0000000E+00 | 1.0000000E+00 |
| A3 | 3.2368018E−20 | −3.7645909E−20 | 0.0000000E+00 | 0.0000000E+00 |
| A4 | −5.5454768E−06 | 9.5941331E−06 | 1.2054304E−04 | 7.5289618E−05 |

TABLE 27-continued

| | Example 9 | | | |
|---|---|---|---|---|
| A5 | −9.6967296E−07 | −2.5883204E−06 | −1.6966009E−05 | −1.5209590E−05 |
| A6 | −2.5730561E−08 | 1.3088713E−07 | −6.2160828E−07 | −7.4320145E−07 |
| A7 | 6.1615797E−09 | 1.2201681E−08 | 3.4051477E−07 | 3.0169761E−07 |
| A8 | −4.1836653E−10 | −1.7200827E−09 | −1.0969639E−08 | −7.2372344E−09 |
| A9 | 2.2001503E−12 | −7.3731598E−11 | −1.8003829E−09 | −1.8196497E−09 |
| A10 | 5.5689670E−13 | 5.4382939E−12 | 1.0054963E−10 | 8.5106687E−11 |
| Sn | 14 | 15 | 21 | 22 |
| KA | 1.0000000E+00 | 1.0000000E+00 | 1.0000000E+00 | 1.0000000E+00 |
| A3 | 4.3368087E−20 | −2.1684043E−20 | −4.1633363E−18 | 0.0000000E+00 |
| A4 | −2.4623157E−05 | 3.5200088E−05 | −3.5059947E−05 | 4.6141794E−05 |
| A5 | 4.7327157E−06 | 2.4102738E−06 | −2.3874311E−05 | −1.8549272E−05 |
| A6 | −8.5746237E−07 | −4.3755605E−08 | 1.0224800E−05 | 7.0413916E−06 |
| A7 | 1.8845198E−08 | 9.8424141E−09 | −2.5056275E−06 | −1.6944183E−06 |
| A8 | 1.2588562E−08 | 5.3647137E−09 | 3.7142963E−07 | 2.5662454E−07 |
| A9 | −5.9061708E−10 | −4.8609583E−10 | −3.1625870E−08 | −2.2622108E−08 |
| A10 | −1.2529590E−10 | −8.0074437E−11 | 1.0995136E−09 | 8.0589100E−10 |

Example 10

Figure 20:
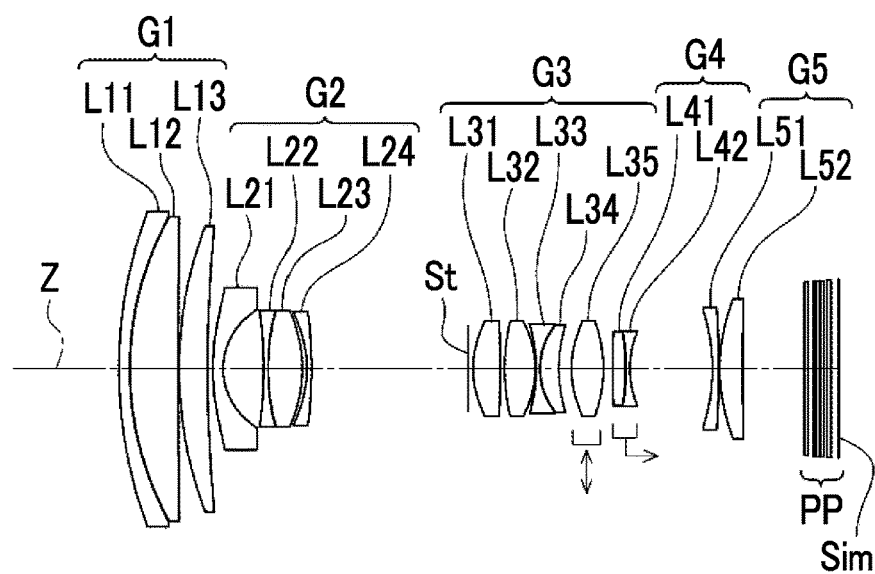
FIG. 20 is a diagram illustrating a cross-sectional view of a configuration and a movement trajectory of a zoom lens of Example 10 of the present disclosure.
Figure 21:
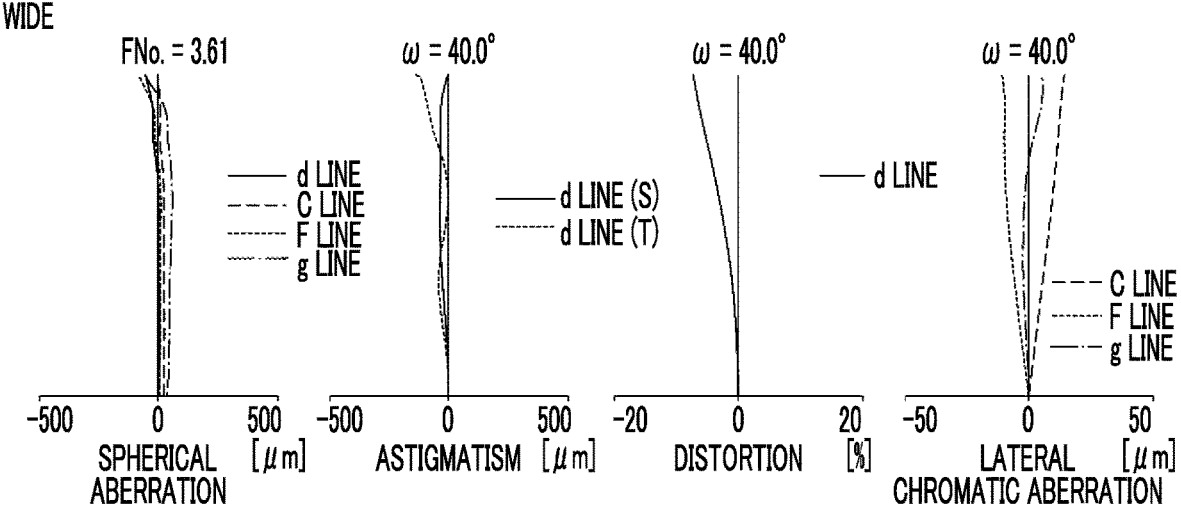
FIG. 21 is each aberration diagram of the zoom lens of Example 10 of the present disclosure.
Figure 21:
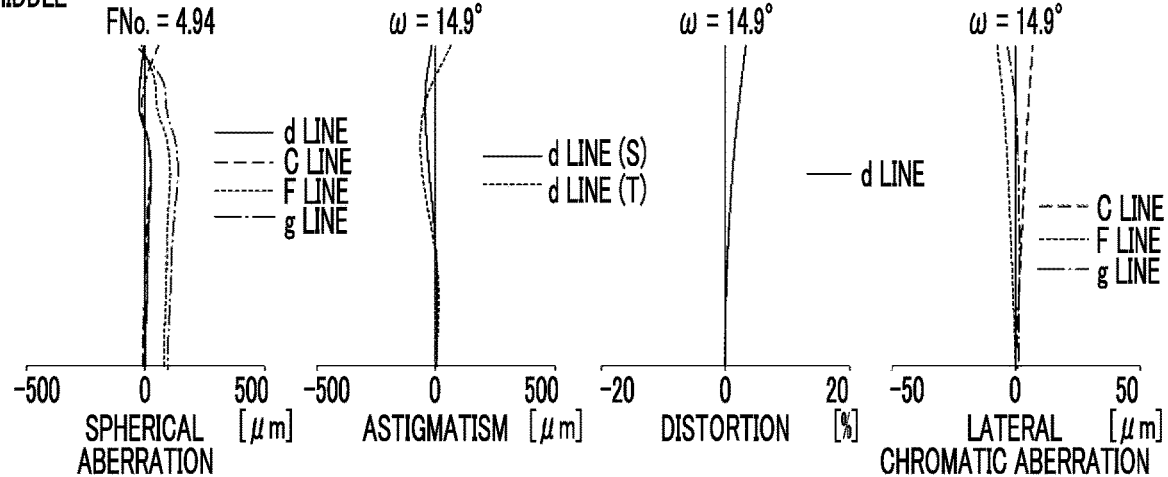
Figure 21:
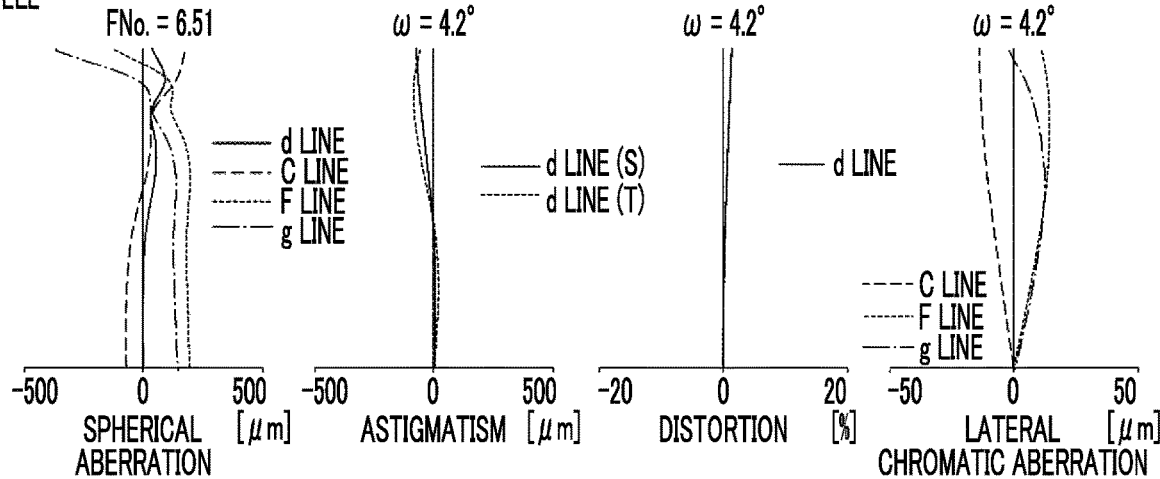

FIG. 20 illustrates a cross-sectional view of a configuration and a movement trajectory of a zoom lens of Example 10. The zoom lens of Example 10 has the same configuration as the summary of the zoom lens of Example 1. For the zoom lens of Example 10, fundamental lens data is shown in Table 28, specifications and variable surface intervals are shown in Table 29, aspherical coefficients are shown in Table 30, and aberration diagrams are illustrated in FIG. 21.

TABLE 28

| | Example 10 | | | | | |
|---|---|---|---|---|---|---|
| Sn | R | D | Nd | νd | θgF | Material |
| 1 | 75.16082 | 1.700 | 1.72825 | 28.46 | 0.60772 | S-TIH10.OHARA |
| 2 | 52.86131 | 7.510 | 1.41390 | 100.82 | 0.53373 | K-FIR100UV.SUMITA |
| 3 | 1661.14885 | 0.150 | | | | |
| 4 | 67.42076 | 4.465 | 1.59282 | 68.62 | 0.54414 | FCD515.HOYA |
| 5 | 251.89285 | DD[5] | | | | |
| *6 | 36.92591 | 1.600 | 1.85400 | 40.38 | 0.56890 | L-LAH85V.OHARA |
| *7 | 11.13601 | 6.324 | | | | |
| 8 | −71.72162 | 0.700 | 1.83481 | 42.72 | 0.56486 | S-LAH55V.OHARA |
| 9 | 35.40762 | 5.261 | 1.80809 | 22.76 | 0.63073 | S-NPH1W.OHARA |
| 10 | −22.88396 | 0.715 | | | | |
| *11 | −18.38455 | 0.700 | 1.86100 | 37.10 | 0.57857 | L-LAH94.OHARA |
| *12 | −83.67682 | DD[12] | | | | |
| 13 (St) | ∞ | 0.800 | | | | |
| *14 | 16.65712 | 4.210 | 1.58313 | 59.38 | 0.54237 | L-BAL42.OHARA |
| *15 | −100.00351 | 0.672 | | | | |
| 16 | 33.63672 | 4.757 | 1.48749 | 70.24 | 0.53007 | S-FSL5.OHARA |
| 17 | −16.86531 | 0.150 | | | | |
| 18 | −25.60835 | 0.600 | 1.76200 | 40.10 | 0.57655 | S-LAM55.OHARA |
| 19 | 11.48769 | 3.010 | 1.49700 | 81.54 | 0.53748 | S-FPL51.OHARA |
| 20 | 23.10878 | 2.000 | | | | |
| *21 | 16.38349 | 4.978 | 1.49710 | 81.56 | 0.53848 | M-FCD1.H0YA |
| *22 | −21.98099 | DD[22] | | | | |
| 23 | 475.99386 | 2.000 | 1.85026 | 32.27 | 0.59299 | S-LAH71.OHARA |
| 24 | −38.85360 | 0.610 | 1.59522 | 67.73 | 0.54426 | S-FPM2.OHARA |
| 25 | 15.28440 | DD[25] | | | | |
| 26 | −31.23122 | 1.000 | 1.60342 | 38.03 | 0.58356 | S-TIM5.OHARA |
| 27 | −152.82722 | 0.150 | | | | |
| 28 | 31.65194 | 3.580 | 1.51823 | 58.90 | 0.54567 | S-NSL3.OHARA |
| 29 | 490.59824 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 29

| | Example 10 | | |
|---|---|---|---|
| | WIDE | MIDDLE | TELE |
| Zr | 1.0 | 2.8 | 10.5 |
| f | 18.56 | 52.66 | 193.91 |
| Bf | 13.91 | 29.68 | 49.94 |
| FNo. | 3.61 | 4.94 | 6.51 |
| 2ω (°) | 80.0 | 29.8 | 8.4 |
| DD[5] | 0.8000 | 26.8056 | 59.1668 |
| DD[12] | 24.3834 | 9.2359 | 1.5288 |
| DD[22] | 1.4615 | 4.3374 | 1.4817 |
| DD[25] | 12.8907 | 10.0148 | 12.8705 |
| DD[29] | 9.6306 | 25.4254 | 45.7041 |

TABLE 30

| | Example 10 | | | |
|---|---|---|---|---|
| Sn | 6 | 7 | 11 | 12 |
| KA | 1.0000000E+00 | 1.0000000E+00 | 1.0000000E+00 | 1.0000000E+00 |
| A3 | −2.8322016E−20 | 1.2548636E−20 | 0.0000000E+00 | 0.0000000E+00 |
| A4 | −9.1216737E−06 | 5.3135381E−06 | 1.1268010E−04 | 6.8179620E−05 |
| A5 | −8.4459266E−07 | −2.7078902E−06 | −1.7103697E−05 | −1.5175526E−05 |
| A6 | −7.6856168E−09 | 1.6553998E−07 | −4.9231461E−07 | −6.3114757E−07 |
| A7 | 5.6931098E−09 | 1.1270059E−08 | 3.4092579E−07 | 3.0265139E−07 |
| A8 | −4.6624148E−10 | −2.0009426E−09 | −1.1938411E−08 | −8.0527353E−09 |
| A9 | 2.9643529E−12 | −6.3459674E−11 | −1.7957757E−09 | −1.8265257E−09 |
| A10 | 6.0010706E−13 | 5.9635646E−12 | 1.0328760E−10 | 8.7636489E−11 |
| Sn | 14 | 15 | 21 | 22 |
| KA | 1.0000000E+00 | 1.0000000E+00 | 1.0000000E+00 | 1.0000000E+00 |
| A3 | 0.0000000E+00 | −4.3368087E−20 | 1.3877788E−18 | 4.1633363E−18 |
| A4 | −2.4530717E−05 | 3.5083362E−05 | −3.4250906E−05 | 4.6092971E−05 |
| A5 | 4.7936127E−06 | 2.4796672E−06 | −2.4015413E−05 | −1.8484457E−05 |
| A6 | −7.9872201E−07 | 1.5055854E−09 | 1.0284087E−05 | 7.0632182E−06 |
| A7 | 1.6096956E−08 | 8.0278077E−09 | −2.5037305E−06 | −1.6952867E−06 |
| A8 | 1.1764692E−08 | 4.5685743E−09 | 3.7010176E−07 | 2.5615737E−07 |
| A9 | −5.7359066E−10 | −4.7785680E−10 | −3.1636360E−08 | −2.2616523E−08 |
| A10 | −1.2139248E−10 | −7.6579627E−11 | 1.1068771E−09 | 8.0759984E−10 |

Example 11

Figure 22:
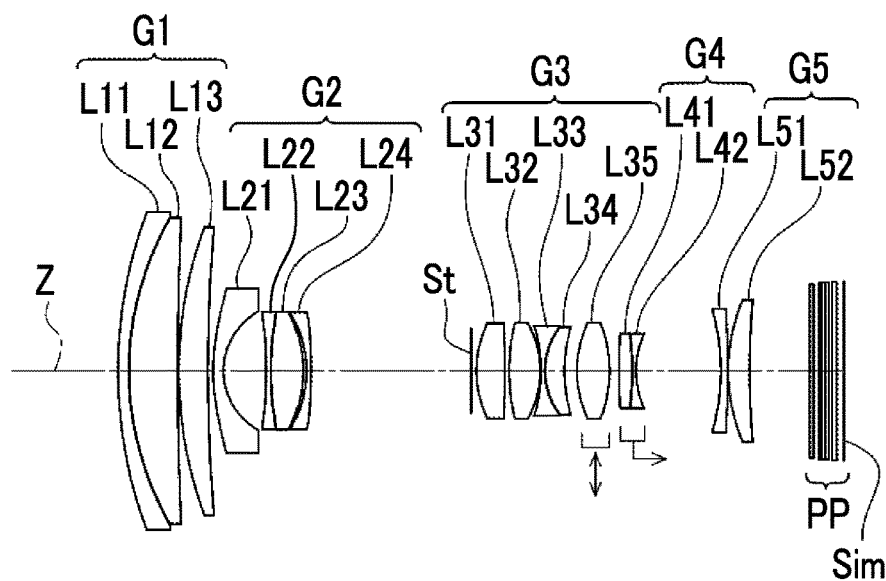
FIG. 22 is a diagram illustrating a cross-sectional view of a configuration and a movement trajectory of a zoom lens of Example 11 of the present disclosure.
Figure 23:
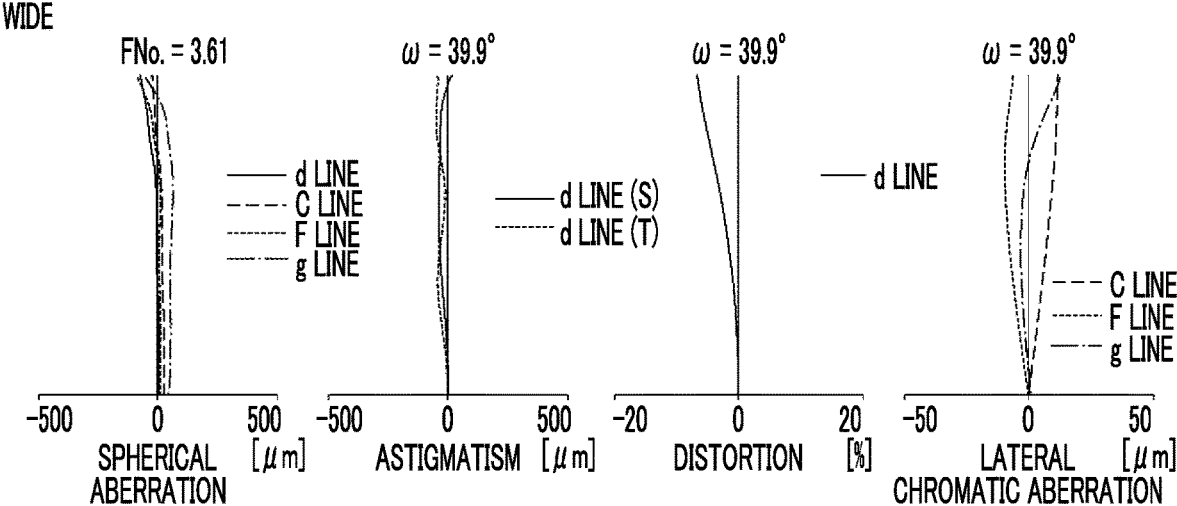
FIG. 23 is each aberration diagram of the zoom lens of Example 11 of the present disclosure.
Figure 23:
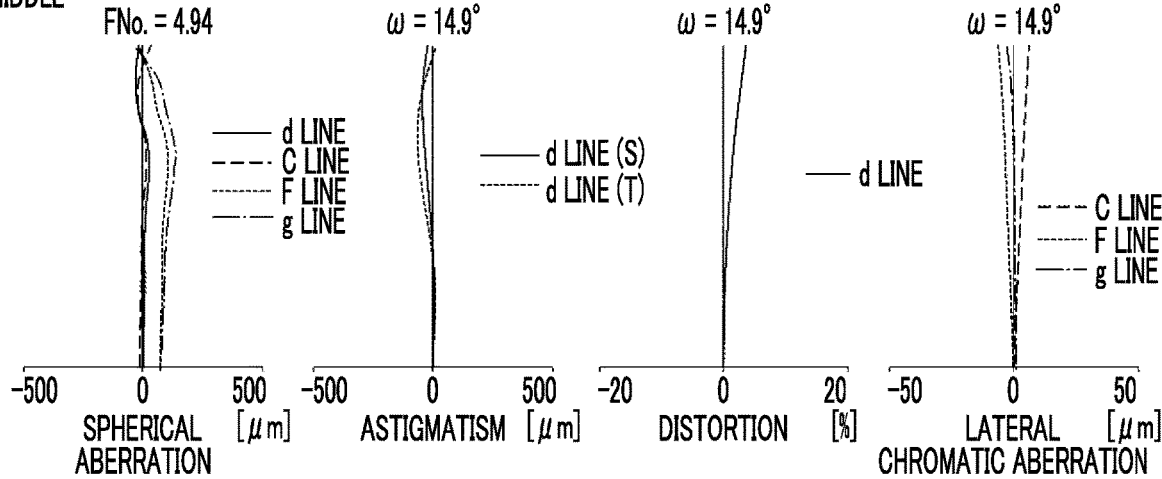
Figure 23:
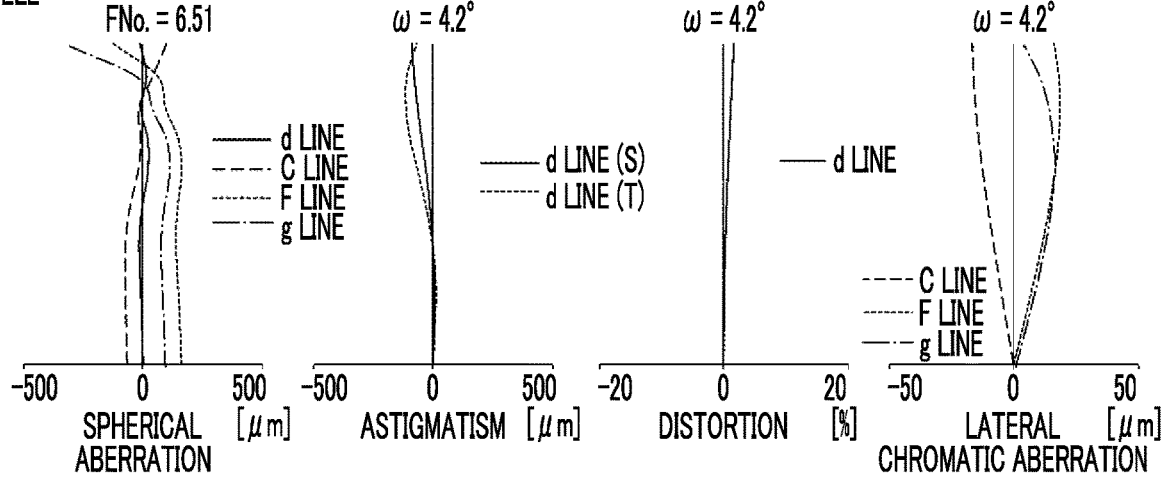

FIG. 22 illustrates a cross-sectional view of a configuration and a movement trajectory of a zoom lens of Example 11. The zoom lens of Example 11 has the same configuration as the summary of the zoom lens of Example 1 except that the fifth lens group G5 has a negative refractive power. For the zoom lens of Example 11, fundamental lens data is shown in Table 31, specifications and variable surface intervals are shown in Table 32, aspherical coefficients are shown in Table 33, and aberration diagrams are illustrated in FIG. 23.

TABLE 31

| | Example 11 | | | | | |
|---|---|---|---|---|---|---|
| Sn | R | D | Nd | νd | θgF | Material |
| 1 | 75.70299 | 1.700 | 1.69895 | 30.13 | 0.60298 | S-TIM35.OHARA |
| 2 | 50.90555 | 7.510 | 1.43700 | 95.10 | 0.53364 | FCD100.HOYA |
| 3 | 639.17995 | 0.150 | | | | |
| 4 | 68.88187 | 4.508 | 1.59282 | 68.62 | 0.54414 | FCD515.HOYA |
| 5 | 283.59615 | DD[5] | | | | |
| *6 | 34.37981 | 1.600 | 1.85400 | 40.38 | 0.56890 | L-LAH85V.OHARA |
| *7 | 10.98901 | 6.609 | | | | |
| 8 | −71.51416 | 0.700 | 1.83481 | 42.72 | 0.56486 | S-LAH55V.OHARA |
| 9 | 51.28111 | 4.952 | 1.80809 | 22.76 | 0.63073 | S-NPHIW.OHARA |
| 10 | −21.72110 | 0.515 | | | | |
| *11 | −17.54932 | 0.700 | 1.85400 | 40.38 | 0.56890 | L-LAH85V.OHARA |

TABLE 31-continued

Example 11

| Sn | R | D | Nd | ud | θgF | Material |
|---|---|---|---|---|---|---|
| *12 | −84.77184 | DD[12] | | | | |
| 13 (St) | ∞ | 0.800 | | | | |
| *14 | 17.13518 | 4.394 | 1.58313 | 59.38 | 0.54237 | L-BAL42.OHARA |
| *15 | −99.99813 | 0.687 | | | | |
| 16 | 33.74503 | 4.765 | 1.48749 | 70.24 | 0.53007 | S-FSL5.OHARA |
| 17 | −16.49330 | 0.150 | | | | |
| 18 | −24.88430 | 0.600 | 1.76200 | 40.10 | 0.57655 | S-LAM55.OHARA |
| 19 | 11.96991 | 3.010 | 1.49700 | 81.54 | 0.53748 | S-FPL51.OHARA |
| 20 | 23.07931 | 2.000 | | | | |
| *21 | 16.49756 | 5.049 | 1.49710 | 81.56 | 0.53848 | M-FCD1.HOYA |
| *22 | −21.73039 | DD[22] | | | | |
| 23 | 154.06781 | 2.000 | 1.85026 | 32.27 | 0.59299 | S-LAH71.OHARA |
| 24 | −46.69333 | 0.610 | 1.61800 | 63.33 | 0.54414 | S-PHM52.OHARA |
| 25 | 15.19180 | DD[25] | | | | |
| 26 | −37.57823 | 1.000 | 1.65412 | 39.68 | 0.57378 | S-NBH5.OHARA |
| 27 | −257.27931 | 0.150 | | | | |
| 28 | 29.75306 | 3.304 | 1.53996 | 59.46 | 0.54418 | S-BAL12.OHARA |
| 29 | 121.62625 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 32

Example 11

| | WIDE | MIDDLE | TELE |
|---|---|---|---|
| Zr | 1.0 | 2.8 | 10.5 |
| f | 18.56 | 52.66 | 193.89 |
| Bf | 13.57 | 28.96 | 48.28 |
| FNo. | 3.61 | 4.94 | 6.51 |
| 2ω (°) | 79.8 | 29.8 | 8.4 |
| DD[5] | 0.80000 | 26.8047 | 59.2248 |

TABLE 32-continued

Example 11

| | WIDE | MIDDLE | TELE |
|---|---|---|---|
| DD[12] | 24.6858 | 9.4103 | 1.5524 |
| DD[22] | 1.5199 | 4.4013 | 1.5547 |
| DD[25] | 13.0415 | 10.1601 | 13.0067 |
| DD[29] | 9.2906 | 24.7015 | 44.0436 |

TABLE 33

Example 11

| Sn | 6 | 7 | 11 | 12 | 14 |
|---|---|---|---|---|---|
| KA | 1.0000000E+00 | 1.0000000E+00 | 1.0000000E+00 | 1.0000000E+00 | 1.0000000E+00 |
| A3 | 4.0460023E−21 | −1.2548636E−20 | 8.6736174E−20 | 0.0000000E+00 | 0.0000000E+00 |
| A4 | −1.4114206E−05 | −1.7165653E−06 | 1.1894439E−04 | 7.2628903E−05 | −2.7236992E−05 |
| A5 | −1.0219271E−06 | −3.1779854E−06 | −1.7582637E−05 | −1.5615298E−05 | 5.7102393E−06 |
| A6 | 5.0745250E−08 | 2.3857269E−07 | −5.9467910E−07 | −7.2668120E−07 | −9.2625984E−07 |
| A7 | 7.6888853E−09 | 9.2602597E−09 | 3.4687344E−07 | 3.0740543E−07 | −1.8838005E−09 |
| A8 | −7.6710182E−10 | −1.9818685E−09 | −1.1164209E−08 | −7.1690861E−09 | 1.3846061E−08 |
| A9 | −2.1313414E−12 | −5.0902477E−11 | −1.8066767E−09 | −1.8487776E−09 | −4.8280516E−10 |
| A10 | 1.1078286E−12 | 6.4888469E−12 | 1.0078962E−10 | 8.4762987E−11 | −1.3151255E−10 |

| Sn | 15 | 21 | 22 |
|---|---|---|---|
| KA | 1.0000000E+00 | 1.0000000E+00 | 1.0000000E+00 |
| A3 | 2.1684043E−20 | 1.3877788E−18 | −1.3877788E−18 |
| A4 | 3.0445147E−05 | −3.7054707E−05 | 4.4527487E−05 |
| A5 | 3.5820040E−06 | −2.2841010E−05 | −1.7819648E−05 |
| A6 | −1.4268244E−07 | 1.0073075E−05 | 6.9839189E−06 |
| A7 | −1.2516016E−08 | −2.5095814E−06 | −1.7087197E−06 |
| A8 | 7.0096759E−09 | 3.7341999E−07 | 2.5827328E−07 |
| A9 | −3.7852546E−10 | −3.1630727E−08 | −2.2516527E−08 |
| A10 | −8.3963915E−11 | 1.0939354E−09 | 7.9591119E−10 |

Example 12

Figure 24:
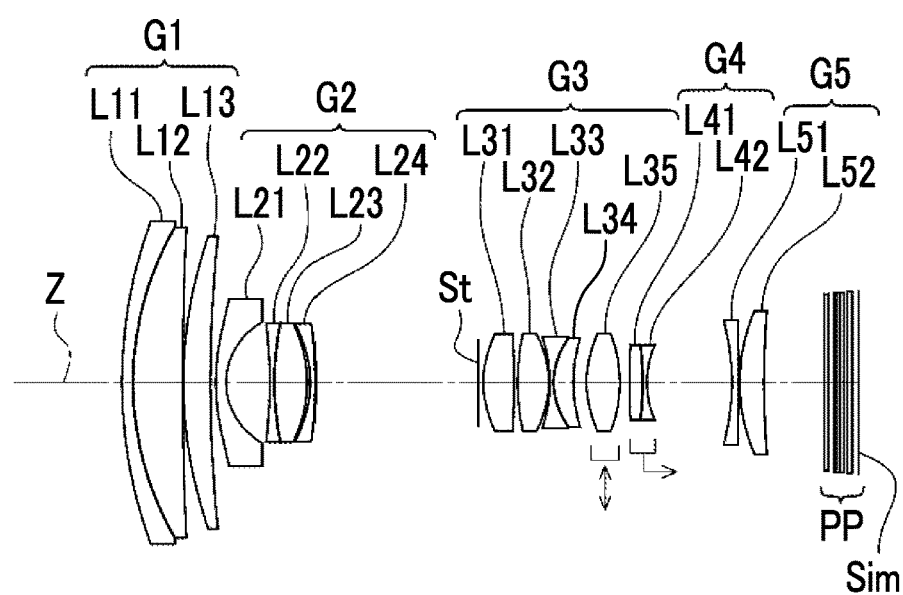
FIG. 24 is a diagram illustrating a cross-sectional view of a configuration and a movement trajectory of a zoom lens of Example 12 of the present disclosure.
Figure 25:
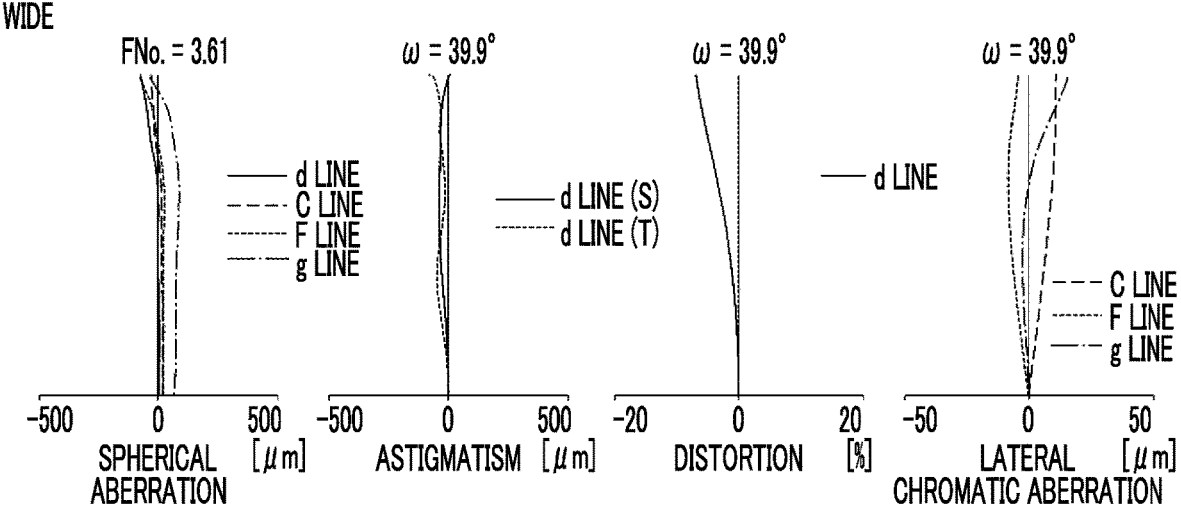
FIG. 25 is each aberration diagram of the zoom lens of Example 12 of the present disclosure.
Figure 25:
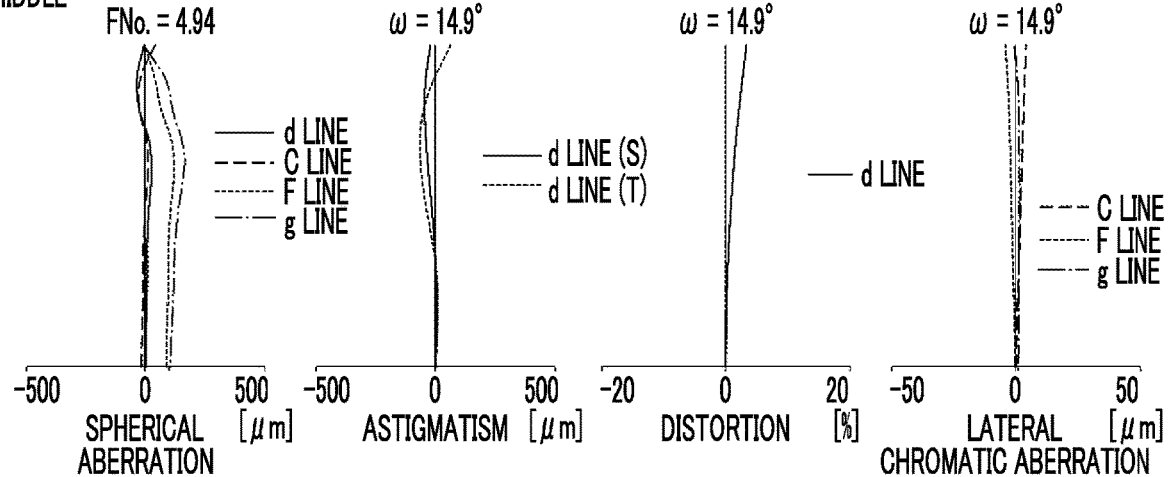
Figure 25:
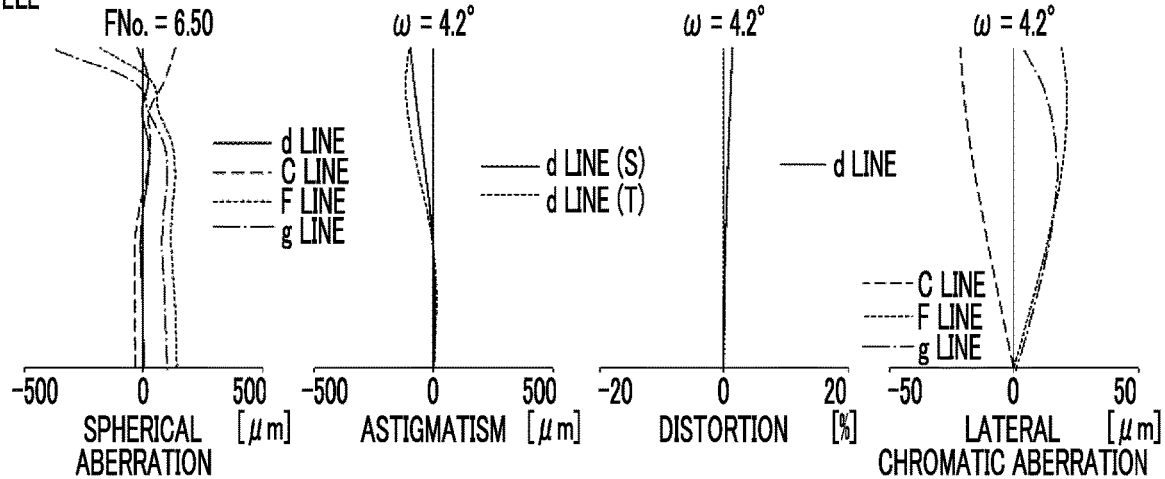

FIG. 24 illustrates a cross-sectional view of a configuration and a movement trajectory of a zoom lens of Example 12. The zoom lens of Example 12 has the same configuration as the summary of the zoom lens of Example 1 except that the fifth lens group G5 has a negative refractive power. For the zoom lens of Example 12, fundamental lens data is shown in Table 34, specifications and variable surface intervals are shown in Table 35, aspherical coefficients are shown in Table 36, and aberration diagrams are illustrated in FIG. 25.

TABLE 34

Example 12

| Sn | R | D | Nd | νd | θgF | Material |
|---|---|---|---|---|---|---|
| 1 | 75.91612 | 1.700 | 1.72825 | 28.46 | 0.60772 | S-TIH10.OHARA |
| 2 | 50.43929 | 7.510 | 1.49700 | 81.61 | 0.53887 | FCD1.HOYA |
| 3 | 498.17395 | 0.150 | | | | |
| 4 | 73.03592 | 4.097 | 1.61800 | 63.33 | 0.54414 | S-PHM52.OHARA |
| 5 | 236.61525 | DD[5] | | | | |
| *6 | 34.57249 | 1.600 | 1.85400 | 40.38 | 0.56890 | L-LAH85V.OHARA |
| *7 | 10.95979 | 6.664 | | | | |
| 8 | −75.41639 | 0.700 | 1.83481 | 42.72 | 0.56486 | S-LAH55V.OHARA |
| 9 | 49.50782 | 4.950 | 1.80809 | 22.76 | 0.63073 | S-NPHIW.OHARA |
| 10 | −21.93133 | 0.494 | | | | |
| *11 | −17.80035 | 0.700 | 1.85400 | 40.38 | 0.56890 | L-LAH85V.OHARA |
| *12 | −89.72360 | DD[12] | | | | |
| 13 (St) | ∞ | 0.800 | | | | |
| *14 | 16.82053 | 4.640 | 1.58313 | 59.38 | 0.54237 | L-BAL42.OHARA |
| *15 | −97.43388 | 0.562 | | | | |
| 16 | 36.44236 | 4.742 | 1.48749 | 70.24 | 0.53007 | S-FSL5.OHARA |
| 17 | −16.27287 | 0.150 | | | | |
| 18 | −24.16756 | 0.600 | 1.76200 | 40.10 | 0.57655 | S-LAM55.OHARA |
| 19 | 11.88271 | 3.010 | 1.49700 | 81.54 | 0.53748 | S-FPL51.OHARA |
| 20 | 24.06356 | 2.000 | | | | |
| *21 | 16.49882 | 5.056 | 1.49710 | 81.56 | 0.53848 | M-FCD1.HOYA |
| *22 | −21.60603 | DD[22] | | | | |
| 23 | 153.73002 | 2.015 | 1.85026 | 32.27 | 0.59299 | S-LAH71.OHARA |
| 24 | −45.77562 | 0.610 | 1.61800 | 63.33 | 0.54414 | S-PHM52.OHARA |
| 25 | 15.16827 | DD[25] | | | | |
| 26 | −38.58338 | 1.000 | 1.65412 | 39.68 | 0.57378 | S-NBH5.OHARA |
| 27 | −390.04981 | 0.196 | | | | |
| 28 | 29.84549 | 3.672 | 1.53996 | 59.46 | 0.54418 | S-BAL12.OHARA |
| 29 | 137.76812 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 35

| Example 12 | | | |
|---|---|---|---|
| | WIDE | MIDDLE | TELE |
| Zr | 1.0 | 2.8 | 10.5 |
| f | 18.55 | 52.65 | 193.89 |
| Bf | 13.48 | 28.92 | 48.41 |
| FNo. | 3.61 | 4.94 | 6.50 |
| 2ω (°) | 79.8 | 29.8 | 8.4 |
| DD[5] | 0.8000 | 26.8714 | 59.3848 |
| DD[12] | 24.6910 | 9.3613 | 1.5251 |
| DD[22] | 1.4841 | 4.3651 | 1.5126 |
| DD[25] | 12.9716 | 10.0906 | 12.9431 |
| DD[29] | 9.2073 | 24.6670 | 44.1645 |

TABLE 36

| Example 12 | | | | | |
|---|---|---|---|---|---|
| Sn | 6 | 7 | 11 | 12 | 14 |
| KA | 1.0000000E+00 | 1.0000000E+00 | 1.0000000E+00 | 1.0000000E+00 | 1.0000000E+00 |
| A3 | −1.4161008E−20 | 1.2548636E−20 | 0.0000000E+00 | 0.0000000E+00 | 2.1684043E−20 |
| A4 | −6.4940100E−06 | 8.4300564E−06 | 1.1681124E−04 | 7.0490459E−05 | −2.7243889E−05 |
| A5 | −1.0652837E−06 | −3.0662980E−06 | −1.6533226E−05 | −1.4755292E−05 | 5.3717033E−06 |
| A6 | −1.4933325E−08 | 1.5937038E−07 | −5.3845256E−07 | −6.8286991E−07 | −8.8131847E−07 |
| A7 | 6.6598503E−09 | 1.5165621E−08 | 3.3178142E−07 | 2.9582757E−07 | −2.7217741E−10 |
| A8 | −4.7384081E−10 | −2.2655129E−09 | −1.1683093E−08 | −7.6713103E−09 | 1.3061377E−08 |
| A9 | 1.0214831E−12 | −8.4859424E−11 | −1.7366625E−09 | −1.7979985E−09 | −4.7791556E−10 |
| A10 | 6.3765687E−13 | 7.2264061E−12 | 1.0225811E−10 | 8.6270995E−11 | −1.2779591E−10 |

| | Sn | 15 | 21 | 22 |
|---|---|---|---|---|
| | KA | 1.0000000E+00 | 1.0000000E+00 | 1.0000000E+00 |
| | A3 | −2.1684043E−20 | −2.7755576E−18 | −2.7755576E−18 |
| | A4 | 3.1467394E−05 | −4.0700743E−05 | 4.1669659E−05 |
| | A5 | 3.4717752E−06 | −2.2341707E−05 | −1.7335922E−05 |
| | A6 | −1.0768853E−07 | 1.0123810E−05 | 7.0062165E−06 |
| | A7 | −9.2499298E−09 | −2.5211741E−06 | −1.7115968E−06 |
| | A8 | 5.8281444E−09 | 3.7391437E−07 | 2.5821694E−07 |
| | A9 | −3.9269618E−10 | −3.1573553E−08 | −2.2519475E−08 |
| | A10 | −7.5965835E−11 | 1.0869420E−09 | 7.9545426E−10 |

Example 13

Figure 26:
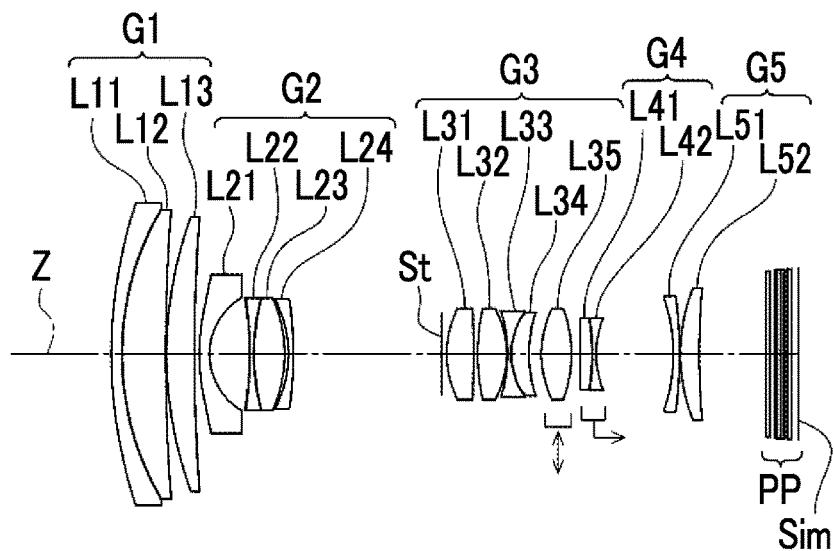
FIG. 26 is a diagram illustrating a cross-sectional view of a configuration and a movement trajectory of a zoom lens of Example 13 of the present disclosure.
Figure 27:
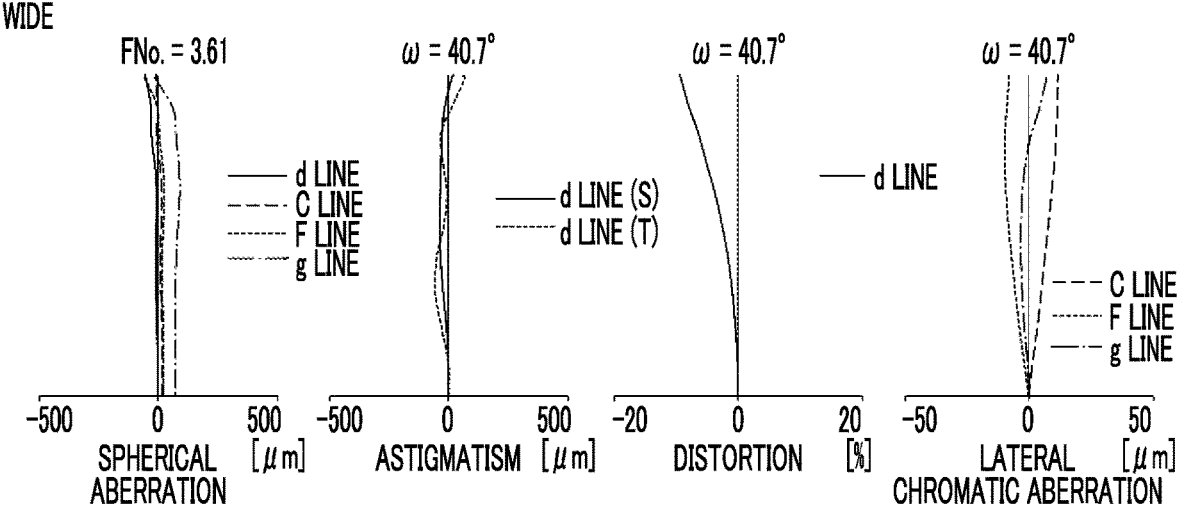
FIG. 27 is each aberration diagram of the zoom lens of Example 13 of the present disclosure.
Figure 27:
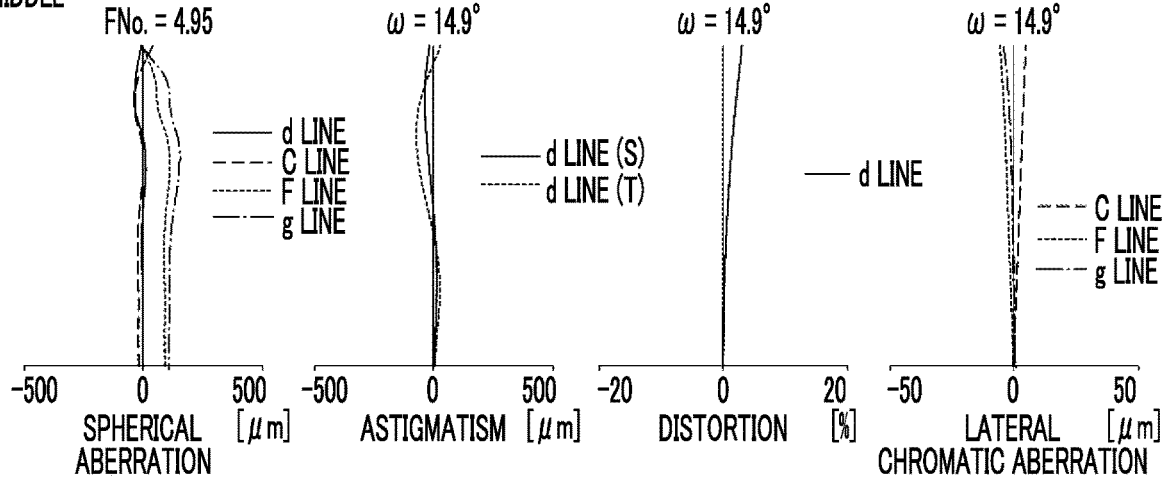
Figure 27:
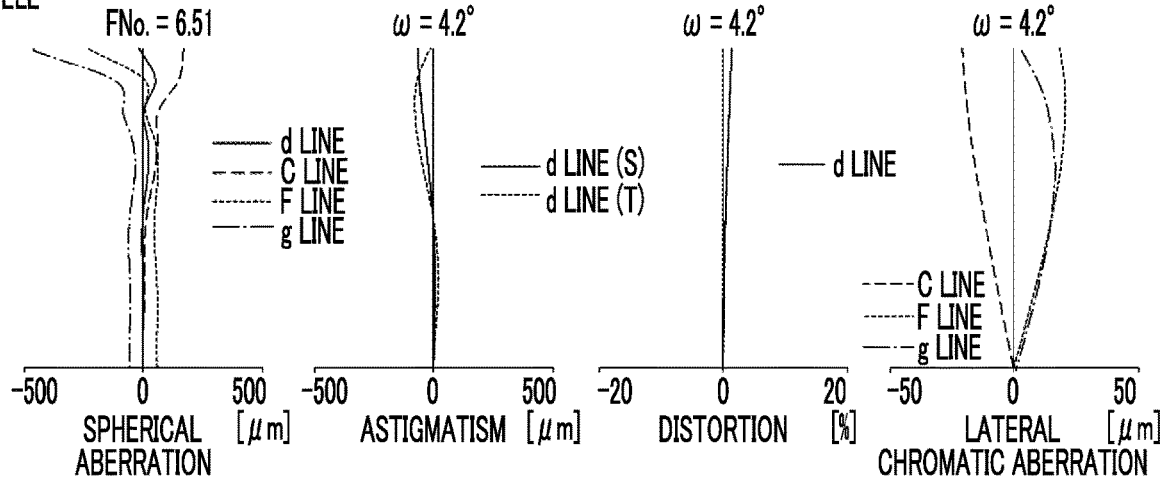

FIG. 26 illustrates a cross-sectional view of a configuration and a movement trajectory of a zoom lens of Example 13. The zoom lens of Example 13 has the same configuration as the summary of the zoom lens of Example 1. For the zoom lens of Example 13, fundamental lens data is shown in Table 37, specifications and variable surface intervals are shown in Table 38, aspherical coefficients are shown in Table 39, and aberration diagrams are illustrated in FIG. 27.

TABLE 37

| Example 13 | | | | | | |
|---|---|---|---|---|---|---|
| Sn | R | D | Nd | νd | θgF | Material |
| 1 | 83.62492 | 1.700 | 1.68960 | 31.14 | 0.60319 | E-FD80.HOYA |
| 2 | 49.56603 | 7.154 | 1.49700 | 81.61 | 0.53887 | FCD1.HOYA |
| 3 | 333.10979 | 0.150 | | | | |
| 4 | 69.71949 | 4.553 | 1.61800 | 63.33 | 0.54414 | S-PHM52.OHARA |
| 5 | 336.15131 | DD[5] | | | | |
| *6 | 35.41004 | 1.600 | 1.80625 | 40.91 | 0.56920 | L-LAH53.OHARA |
| *7 | 10.82734 | 6.544 | | | | |
| 8 | −69.92564 | 0.700 | 1.83481 | 42.72 | 0.56486 | S-LAH55V.OHARA |
| 9 | 38.82207 | 5.002 | 1.80809 | 22.76 | 0.63073 | S-NPH1W.OHARA |
| 10 | −23.73144 | 0.634 | | | | |
| *11 | −18.79998 | 0.700 | 1.85400 | 40.38 | 0.56890 | L-LAH85V.OHARA |
| *12 | −96.03372 | DD[12] | | | | |
| 13 (St) | ∞ | 0.800 | | | | |

TABLE 37-continued

Example 13

| Sn | R | D | Nd | νd | θgF | Material |
|---|---|---|---|---|---|---|
| *14 | 16.64061 | 4.395 | 1.58313 | 59.38 | 0.54237 | L-BAL42.OHARA |
| *15 | -97.04835 | 0.653 | | | | |
| 16 | 35.13651 | 4.753 | 1.48749 | 70.24 | 0.53007 | S-FSL5.OHARA |
| 17 | -16.39143 | 0.150 | | | | |
| 18 | -24.29062 | 0.600 | 1.76200 | 40.10 | 0.57655 | S-LAM55.OHARA |
| 19 | 11.54202 | 3.010 | 1.49700 | 81.54 | 0.53748 | S-FPL51.OHARA |
| 20 | 23.80052 | 2.000 | | | | |
| *21 | 16.15736 | 4.924 | 1.49710 | 81.56 | 0.53848 | M-FCD1.HOYA |
| *22 | -21.56263 | DD[22] | | | | |
| 23 | 847.32475 | 2.000 | 1.85026 | 32.27 | 0.59299 | S-LAH71.OHARA |
| 24 | -35.13200 | 0.610 | 1.61800 | 63.33 | 0.54414 | S-PHM52.OHARA |
| 25 | 15.97260 | DD[25] | | | | |
| 26 | -30.50240 | 1.000 | 1.59551 | 39.24 | 0.58043 | S-TIM8.OHARA |
| 27 | -76.13160 | 0.150 | | | | |
| 28 | 30.63911 | 3.065 | 1.51823 | 58.90 | 0.54567 | S-NSL3.OHARA |
| 29 | 122.64818 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 38

Example 13

| | WIDE | MIDDLE | TELE |
|---|---|---|---|
| Zr | 1.0 | 2.8 | 10.5 |
| f | 18.55 | 52.65 | 193.95 |
| Bf | 15.19 | 31.54 | 52.30 |
| FNo. | 3.61 | 4.95 | 6.51 |
| 2ω (°) | 81.4 | 29.8 | 8.4 |
| DD[5] | 0.8000 | 26.4738 | 59.4737 |
| DD[12] | 24.2795 | 9.0802 | 1.5394 |
| DD[22] | 1.3970 | 4.2688 | 1.4249 |
| DD[25] | 12.5946 | 9.7228 | 12.5667 |
| DD[29] | 10.9226 | 27.2913 | 48.0335 |

TABLE 39

Example 13

| Sn | 6 | 7 | 11 | 12 | 14 |
|---|---|---|---|---|---|
| KA | 1.0000000E+00 | 1.0000000E+00 | 1.0000000E+00 | 1.0000000E+00 | 1.0000000E+00 |
| A3 | 2.8322016E-20 | 3.7645909E-20 | 0.0000000E+00 | 0.0000000E+00 | 0.0000000E+00 |
| A4 | -1.6572562E-05 | -1.5301424E-06 | 1.0127365E-04 | 5.7256659E-05 | -2.3613915E-05 |
| A5 | -9.7187772E-07 | -4.4301352E-06 | -1.8027940E-05 | -1.6256307E-05 | 4.5234712E-06 |
| A6 | 5.0363461E-09 | 2.6196046E-07 | -3.0118370E-07 | -3.9450832E-07 | -8.0791109E-07 |
| A7 | 7.3179191E-09 | 1.3153368E-08 | 3.4696470E-07 | 3.1074967E-07 | 1.8404491E-08 |
| A8 | -2.9240580E-10 | -2.0078398E-09 | -1.3643545E-08 | -1.0091598E-08 | 1.1341496E-08 |
| A9 | -1.2873825E-11 | -3.3993827E-10 | -1.8118506E-09 | -1.8677657E-09 | -5.9032824E-10 |
| A10 | 7.0605150E-13 | 2.4177386E-11 | 1.0838839E-10 | 9.4645208E-11 | -1.2120810E-10 |

| Sn | 15 | 21 | 22 |
|---|---|---|---|
| KA | 1.0000000E+00 | 1.0000000E+00 | 1.0000000E+00 |
| A3 | 2.1684043E-20 | 2.7755576E-18 | -2.7755576E-18 |
| A4 | 3.5655408E-05 | -3.6290925E-05 | 4.5764058E-05 |
| A5 | 2.2992569E-06 | -2.3575396E-05 | -1.7506819E-05 |
| A6 | 5.8399663E-09 | 1.0267542E-05 | 6.9352130E-06 |
| A7 | 1.5818034E-08 | -2.5180833E-06 | -1.6838993E-06 |
| A8 | 2.0602181E-09 | 3.7207890E-07 | 2.5591514E-07 |
| A9 | -3.6686125E-10 | -3.1624547E-08 | -2.2700989E-08 |
| A10 | -7.0829927E-11 | 1.0949127E-09 | 8.0982067E-10 |

Example 14

Figure 28:
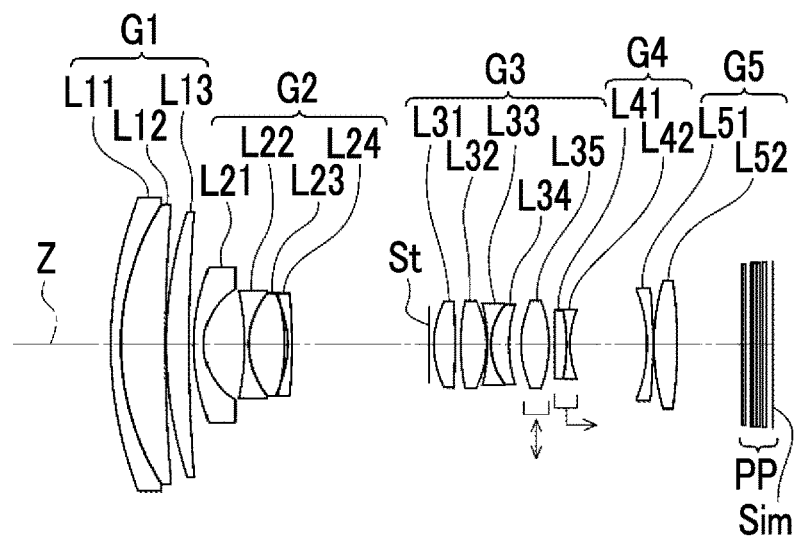
FIG. 28 is a diagram illustrating a cross-sectional view of a configuration and a movement trajectory of a zoom lens of Example 14 of the present disclosure.
Figure 28:
Figure 29:
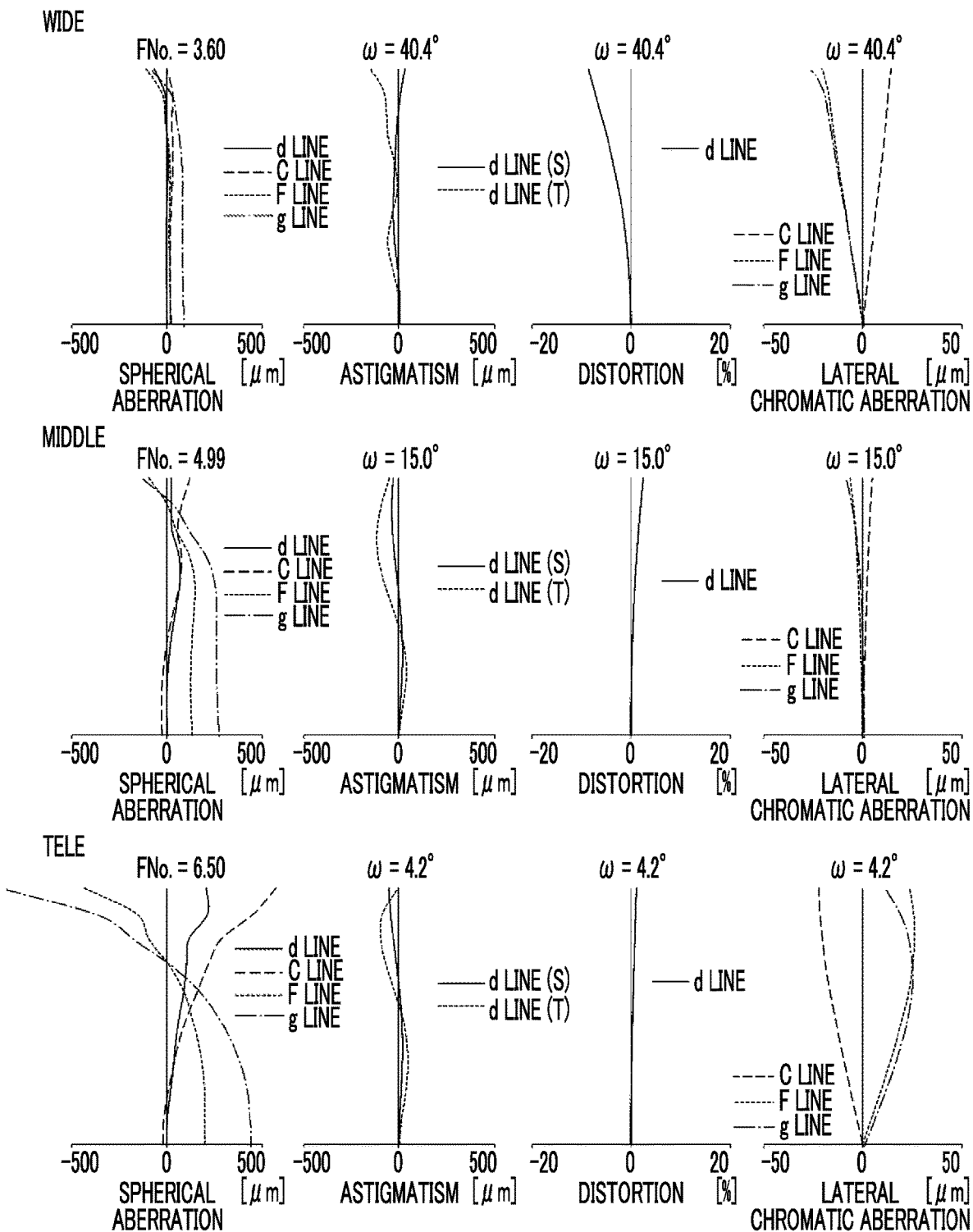
FIG. 29 is each aberration diagram of the zoom lens of Example 14 of the present disclosure.

FIG. 28 illustrates a cross-sectional view of a configuration and a movement trajectory of a zoom lens of Example 14. The zoom lens of Example 14 has the same configuration as the summary of the zoom lens of Example 1. For the zoom lens of Example 14, fundamental lens data is shown in Table 40, specifications and variable surface intervals are shown in Table 41, aspherical coefficients are shown in Table 42, and aberration diagrams are illustrated in FIG. 29.

TABLE 40

Example 14

| Sn | R | D | Nd | υd | θgF | Material |
|---|---|---|---|---|---|---|
| 1 | 73.10348 | 1.700 | 1.68960 | 31.14 | 0.60319 | E-FD80.HOYA |
| 2 | 46.56448 | 7.510 | 1.49700 | 81.61 | 0.53887 | FCD1.HOYA |
| 3 | 301.42428 | 0.150 | | | | |
| 4 | 77.33826 | 3.936 | 1.61800 | 63.33 | 0.54414 | S-PHM52.OHARA |
| 5 | 303.37294 | DD[5] | | | | |
| *6 | 37.24720 | 1.600 | 1.80625 | 40.91 | 0.56920 | L-LAH53.OHARA |
| *7 | 11.68782 | 6.794 | | | | |
| 8 | −45.99267 | 0.710 | 1.72916 | 54.67 | 0.54534 | TAC8.HOYA |
| 9 | 14.39307 | 6.000 | 1.85883 | 30.00 | 0.59793 | NBFD30.HOYA |
| 10 | −35.45877 | 0.540 | | | | |
| *11 | −19.34758 | 0.700 | 1.85400 | 40.38 | 0.56890 | L-LAH85V.OHARA |
| *12 | −100.00360 | DD[12] | | | | |
| 13 (St) | ∞ | 0.800 | | | | |
| *14 | 16.88821 | 3.552 | 1.58313 | 59.38 | 0.54237 | L-BAL42.OHARA |
| *15 | −93.36887 | 0.955 | | | | |
| 16 | 39.71527 | 4.485 | 1.48749 | 70.24 | 0.53007 | S-FSL5.OHARA |
| 17 | −16.72710 | 0.150 | | | | |
| 18 | −29.95648 | 0.600 | 1.76200 | 40.10 | 0.57655 | S-LAM55.OHARA |
| 19 | 11.57835 | 3.010 | 1.49700 | 81.54 | 0.53748 | S-FPL51.OHARA |
| 20 | 24.51871 | 2.000 | | | | |
| *21 | 16.61473 | 4.781 | 1.49710 | 81.56 | 0.53848 | M-FCD1.HOYA |
| *22 | −22.16255 | DD[22] | | | | |
| 23 | −727.35924 | 2.000 | 1.85026 | 32.27 | 0.59299 | S-LAH71.OHARA |
| 24 | −31.92006 | 0.610 | 1.61800 | 63.33 | 0.54414 | S-PHM52.OHARA |
| 25 | 16.74530 | DD[25] | | | | |
| 26 | −26.34244 | 1.000 | 1.59551 | 39.24 | 0.58043 | S-TIM8.OHARA |
| 27 | −96.95542 | 0.150 | | | | |
| 28 | 40.94173 | 3.910 | 1.51823 | 58.90 | 0.54567 | S-NSL3.OHARA |
| 29 | −81.99136 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 41

Example 14

| | WIDE | MIDDLE | TELE |
|---|---|---|---|
| Zr | 1.0 | 2.8 | 10.5 |
| f | 18.55 | 52.66 | 193.94 |
| Bf | 15.21 | 33.22 | 55.27 |
| FNo. | 3.60 | 4.99 | 6.50 |
| 2ω (°) | 80.8 | 30.0 | 8.4 |
| DD[5] | 0.8000 | 25.6262 | 60.5470 |

TABLE 41-continued

Example 14

| | WIDE | MIDDLE | TELE |
|---|---|---|---|
| DD[12] | 23.0760 | 7.9162 | 0.7446 |
| DD[22] | 0.9565 | 3.8260 | 0.9766 |
| DD[25] | 12.9357 | 10.0662 | 12.9156 |
| DD[29] | 10.9302 | 28.9652 | 51.0013 |

TABLE 42

Example 14

| Sn | 6 | 7 | 11 | 12 | 14 |
|---|---|---|---|---|---|
| KA | 1.0000000E+00 | 1.0000000E+00 | 1.0000000E+00 | 1.0000000E+00 | 1.0000000E+00 |
| A3 | 2.8322016E−20 | 3.7645909E−20 | 0.0000000E+00 | 0.0000000E+00 | 0.0000000E+00 |
| A4 | 7.1442320E−06 | 2.0876617E−05 | 9.8743928E−05 | 7.2173642E−05 | −2.7288040E−05 |

TABLE 42-continued

| | | Example 14 | | | |
|---|---|---|---|---|---|
| A5 | −1.4145808E−06 | −7.4183530E−06 | −1.8445487E−05 | −1.6857344E−05 | 4.6470272E−06 |
| A6 | 8.6246364E−09 | 9.1597288E−07 | −2.6755104E−07 | −2.8135047E−07 | −5.6866578E−07 |
| A7 | 1.2625490E−08 | −9.2401929E−09 | 3.4929851E−07 | 3.1451042E−07 | 1.5287818E−08 |
| A8 | −5.8437574E−10 | −4.1167945E−09 | −1.3067646E−08 | −1.0332085E−08 | 9.9776709E−09 |
| A9 | −3.5054511E−11 | −1.2633913E−10 | −1.8534937E−09 | −1.9056249E−09 | −7.6368326E−10 |
| A10 | 1.9497144E−12 | 3.3628384E−11 | 9.7371208E−11 | 9.5369797E−11 | −1.4237404E−10 |

| | Sn | 15 | 21 | 22 |
|---|---|---|---|---|
| | KA | 1.0000000E+00 | 1.0000000E+00 | 1.0000000E+00 |
| | A3 | 2.1684043E−20 | 2.7755576E−18 | −2.7755576E−18 |
| | A4 | 4.0302994E−05 | −3.3356633E−05 | 4.1453539E−05 |
| | A5 | 3.4559009E−06 | −2.4146469E−05 | −1.7752729E−05 |
| | A6 | 6.9419725E−08 | 1.0175165E−05 | 6.8285906E−06 |
| | A7 | 2.1968653E−08 | −2.5059461E−06 | −1.7011566E−06 |
| | A8 | 1.6545554E−09 | 3.7199736E−07 | 2.5943152E−07 |
| | A9 | −6.4068020E−10 | −3.1703327E−08 | −2.2587065E−08 |
| | A10 | −9.4020170E−11 | 1.0929900E−09 | 7.7614912E−10 |

Example 15

Figure 30:
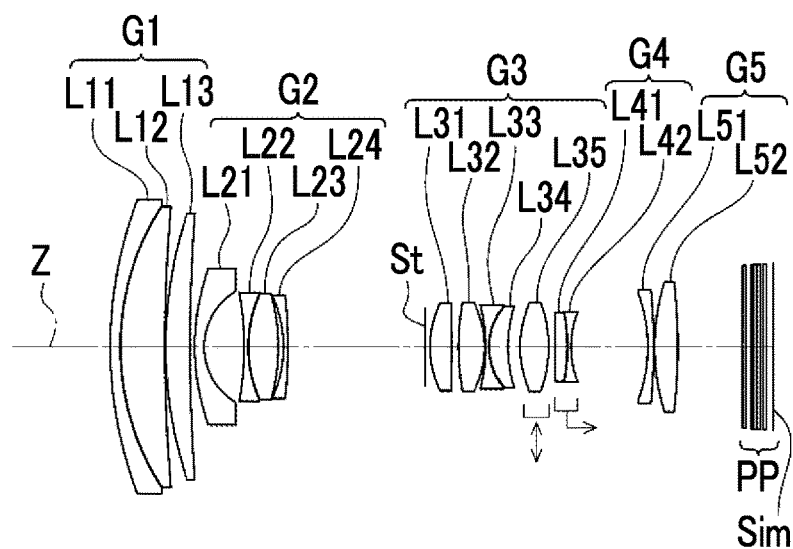
FIG. 30 is a diagram illustrating a cross-sectional view of a configuration and a movement trajectory of a zoom lens of Example 15 of the present disclosure.
Figure 31:
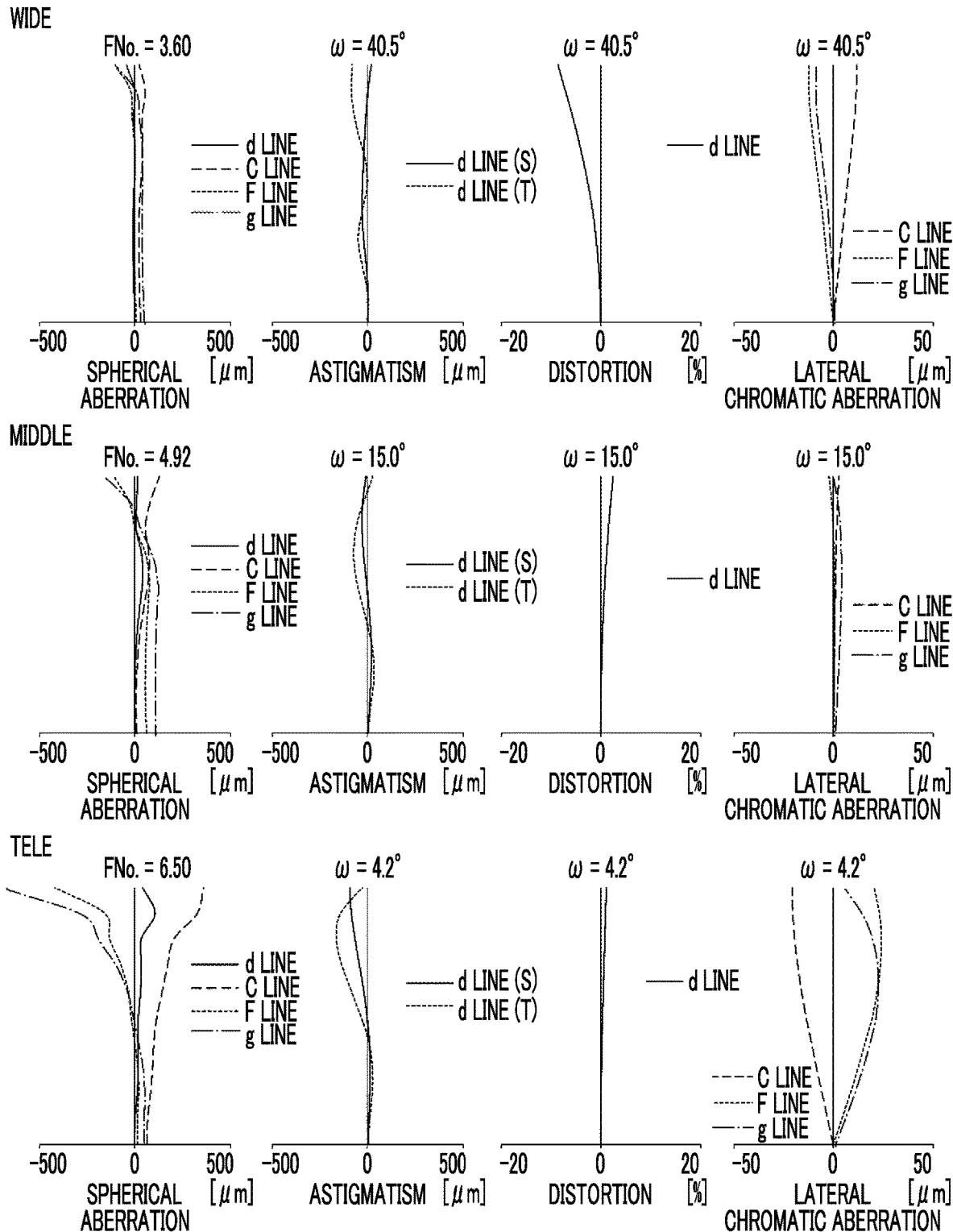
FIG. 31 is each aberration diagram of the zoom lens of Example 15 of the present disclosure.

FIG. 30 illustrates a cross-sectional view of a configuration and a movement trajectory of a zoom lens of Example 15. The zoom lens of Example 15 has the same configuration as the summary of the zoom lens of Example 1. For the zoom lens of Example 15, fundamental lens data is shown in Table 43, specifications and variable surface intervals are shown in Table 44, aspherical coefficients are shown in Table 45, and aberration diagrams are illustrated in FIG. 31.

TABLE 43

| | | | Example 15 | | | |
|---|---|---|---|---|---|---|
| Sn | R | D | Nd | νd | θgF | Material |
| 1 | 72.78780 | 1.700 | 1.68960 | 31.14 | 0.60318 | E-FD80.HOYA |
| 2 | 45.85871 | 7.510 | 1.49700 | 81.61 | 0.53887 | FCD1.HOYA |
| 3 | 282.07537 | 0.150 | | | | |
| 4 | 75.28807 | 4.189 | 1.61800 | 63.33 | 0.54414 | S-PHM52.OHARA |
| 5 | 318.49776 | DD[5] | | | | |
| *6 | 39.14290 | 1.600 | 1.80625 | 40.91 | 0.56920 | L-LAH53.OHARA |
| *7 | 11.55845 | 6.733 | | | | |
| 8 | −54.66173 | 0.710 | 1.72916 | 54.67 | 0.54534 | TAC8.HOYA |
| 9 | 23.28159 | 5.010 | 1.85451 | 25.15 | 0.61031 | NBFD25.HOYA |
| 10 | −34.78322 | 0.911 | | | | |
| *11 | −19.76566 | 0.700 | 1.85400 | 40.38 | 0.56890 | L-LAH85V.OHARA |
| *12 | −98.29151 | DD[12] | | | | |
| 13 (St) | ∞ | 0.800 | | | | |
| *14 | 16.89668 | 3.643 | 1.58313 | 59.38 | 0.54237 | L-BAL42.OHARA |
| *15 | −91.61292 | 1.137 | | | | |
| 16 | 41.74656 | 4.523 | 1.48749 | 70.24 | 0.53007 | S-FSL5.OHARA |
| 17 | −16.53176 | 0.150 | | | | |
| 18 | −30.32637 | 0.600 | 1.76200 | 40.10 | 0.57655 | S-LAM55.OHARA |
| 19 | 11.44718 | 3.043 | 1.49700 | 81.54 | 0.53748 | S-FPL51.OHARA |
| 20 | 24.22660 | 2.000 | | | | |
| *21 | 16.38875 | 4.851 | 1.49710 | 81.56 | 0.53848 | M-FCD1.HOYA |
| *22 | −22.76096 | DD[22] | | | | |
| 23 | −1108.48356 | 2.000 | 1.85026 | 32.27 | 0.59299 | S-LAH71.OHARA |
| 24 | −33.01952 | 0.610 | 1.61800 | 63.33 | 0.54414 | S-PHM52.OHARA |
| 25 | 16.69380 | DD[25] | | | | |
| 26 | −27.38407 | 1.000 | 1.59551 | 39.24 | 0.58043 | S-TIM8.OHARA |
| 27 | −100.59857 | 0.150 | | | | |
| 28 | 38.51542 | 3.912 | 1.51823 | 58.90 | 0.54567 | S-NSL3.OHARA |
| 29 | −101.22337 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 44

Example 15

| | WIDE | MIDDLE | TELE |
|---|---|---|---|
| Zr | 1.0 | 2.8 | 10.5 |
| f | 18.55 | 52.66 | 194.00 |
| Bf | 15.19 | 32.39 | 55.57 |
| FNo. | 3.60 | 4.92 | 6.50 |
| 2ω (°) | 81.0 | 30.0 | 8.4 |
| DD[5] | 0.8000 | 26.7404 | 59.5184 |
| DD[12] | 23.1197 | 8.5405 | 1.2884 |
| DD[22] | 1.1622 | 4.0318 | 1.1829 |
| DD[25] | 12.9089 | 10.0393 | 12.8882 |
| DD[29] | 10.9123 | 28.1202 | 51.2607 |

TABLE 45

Example 15

| Sn | 6 | 7 | 11 | 12 | 14 |
|---|---|---|---|---|---|
| KA | 1.0000000E+00 | 1.0000000E+00 | 1.0000000E+00 | 1.0000000E+00 | 1.0000000E+00 |
| A3 | 2.8322016E−20 | 3.7645909E−20 | 0.0000000E+00 | 0.0000000E+00 | 0.0000000E+00 |
| A4 | 7.8261949E−06 | 2.4292408E−05 | 1.0386597E−04 | 6.8812801E−05 | −2.8222542E−05 |
| A5 | −1.4711683E−06 | −6.9408617E−06 | −1.8303840E−05 | −1.6973597E−05 | 4.4153722E−06 |
| A6 | 5.3506856E−10 | 8.7820516E−07 | −2.6428552E−07 | −2.8487113E−07 | −5.6223205E−07 |
| A7 | 1.2770276E−08 | −5.8638792E−09 | 3.4937098E−07 | 3.1334042E−07 | 1.3555830E−08 |
| A8 | −6.0049836E−10 | −4.0522254E−09 | −1.3176032E−08 | −1.0412583E−08 | 1.0084334E−08 |
| A9 | −3.4873440E−11 | −1.3872577E−10 | −1.8428614E−09 | −1.9438813E−09 | −7.2021426E−10 |
| A10 | 1.8690381E−12 | 4.0111099E−11 | 9.3758607E−11 | 9.4549251E−11 | −1.3370213E−10 |

| | Sn | 15 | 21 | 22 |
|---|---|---|---|---|
| | KA | 1.0000000E+00 | 1.0000000E+00 | 1.0000000E+00 |
| | A3 | 2.1684043E−20 | 2.7755576E−18 | −2.7755576E−18 |
| | A4 | 3.9520711E−05 | −3.5704118E−05 | 3.8691555E−05 |
| | A5 | 3.2244678E−06 | −2.3999694E−05 | −1.7858126E−05 |
| | A6 | 7.1574126E−08 | 1.0163278E−05 | 6.8514173E−06 |
| | A7 | 2.3812894E−08 | −2.5091538E−06 | −1.6999719E−06 |
| | A8 | 1.7547556E−09 | 3.7315561E−07 | 2.5936569E−07 |
| | A9 | −5.9452370E−10 | −3.1798051E−08 | −2.2696225E−08 |
| | A10 | −8.6586701E−11 | 1.0945186E−09 | 7.8535693E−10 |

Example 16

Figure 32:
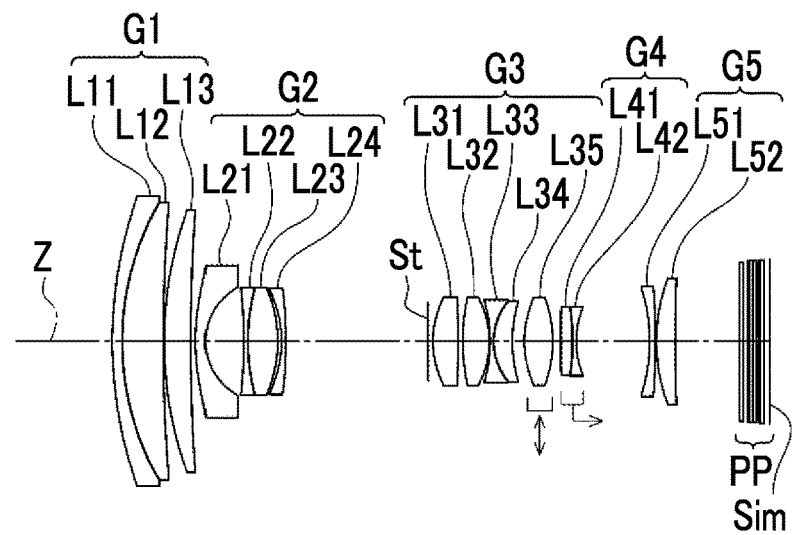
FIG. 32 is a diagram illustrating a cross-sectional view of a configuration and a movement trajectory of a zoom lens of Example 16 of the present disclosure.
Figure 32:
Figure 33:
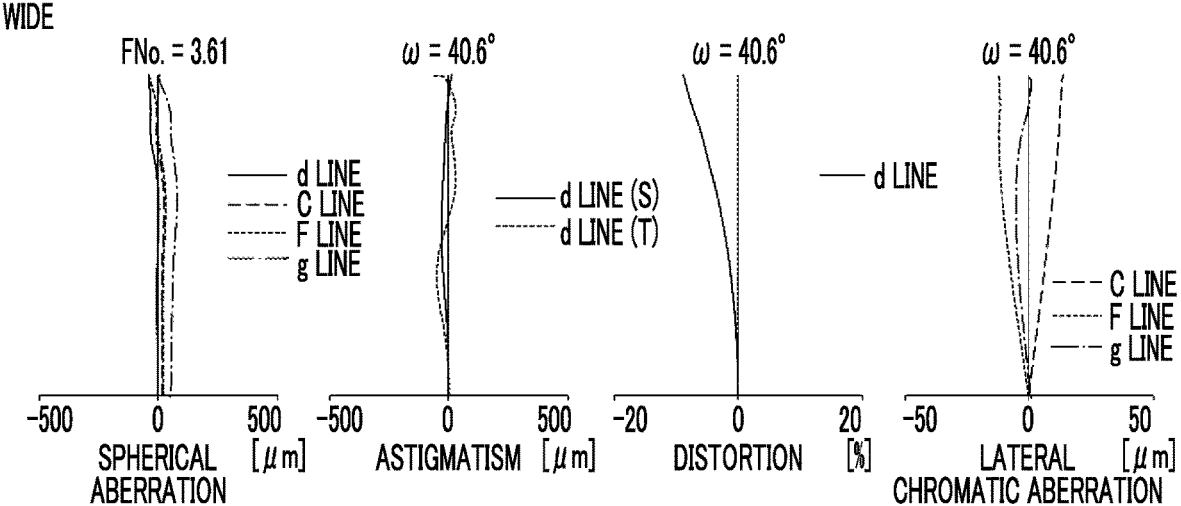
FIG. 33 is each aberration diagram of the zoom lens of Example 16 of the present disclosure.

FIG. 32 illustrates a cross-sectional view of a configuration and a movement trajectory of a zoom lens of Example 16. The zoom lens of Example 16 has the same configuration as the summary of the zoom lens of Example 1. For the zoom lens of Example 16, fundamental lens data is shown in Table 46, specifications and variable surface intervals are shown in Table 47, aspherical coefficients are shown in Table 48, and aberration diagrams are illustrated in FIG. 33.

TABLE 46

Example 16

| Sn | R | D | Nd | νd | θgF | Material |
|---|---|---|---|---|---|---|
| 1 | 77.80567 | 1.700 | 1.77047 | 29.74 | 0.59514 | NBFD29.HOYA |
| 2 | 50.15099 | 7.027 | 1.49700 | 81.61 | 0.53887 | FCD1.HOYA |
| 3 | 309.32421 | 0.150 | | | | |
| 4 | 69.32581 | 4.608 | 1.61800 | 63.33 | 0.54414 | S-PHM52.OHARA |
| 5 | 337.23882 | DD[5] | | | | |
| *6 | 38.77476 | 1.600 | 1.80625 | 40.91 | 0.56920 | L-LAH53.OHARA |
| *7 | 10.82420 | 6.489 | | | | |
| 8 | −85.49622 | 0.700 | 1.83481 | 42.72 | 0.56486 | S-LAH55V.OHARA |
| 9 | 37.78138 | 5.032 | 1.80809 | 22.76 | 0.63073 | S-NPHIW.OHARA |
| 10 | −24.45612 | 0.683 | | | | |
| *11 | −18.93902 | 0.700 | 1.85400 | 40.38 | 0.56890 | L-LAH85V.OHARA |
| *12 | −94.44371 | DD[12] | | | | |
| 13 (St) | ∞ | 0.800 | | | | |

TABLE 46-continued

Example 16

| Sn | R | D | Nd | υd | θgF | Material |
|---|---|---|---|---|---|---|
| *14 | 16.49188 | 4.339 | 1.58313 | 59.38 | 0.54237 | L-BAL42.OHARA |
| *15 | −92.26920 | 0.748 | | | | |
| 16 | 37.40822 | 4.605 | 1.48749 | 70.24 | 0.53007 | S-FSL5.OHARA |
| 17 | −16.95887 | 0.150 | | | | |
| 18 | −25.89895 | 0.600 | 1.76200 | 40.10 | 0.57655 | S-LAM55.OHARA |
| 19 | 11.21135 | 3.195 | 1.49700 | 81.54 | 0.53748 | S-FPL51.OHARA |
| 20 | 24.93372 | 2.000 | | | | |
| *21 | 16.35377 | 4.934 | 1.49710 | 81.56 | 0.53848 | M-FCD1.HOYA |
| *22 | −21.98242 | DD[22] | | | | |
| 23 | 538.26370 | 2.000 | 1.85883 | 30.00 | 0.59793 | NBFD30.HOYA |
| 24 | −39.03390 | 0.610 | 1.61800 | 63.33 | 0.54414 | S-PHM52.OHARA |
| 25 | 15.93633 | DD[25] | | | | |
| 26 | −31.89197 | 1.000 | 1.59551 | 39.24 | 0.58043 | S-TIM8.OHARA |
| 27 | −122.28968 | 0.150 | | | | |
| 28 | 32.17212 | 3.243 | 1.51823 | 58.90 | 0.54567 | S-NSL3.OHARA |
| 29 | 318.26584 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 47

Example 16

| | WIDE | MIDDLE | TELE |
|---|---|---|---|
| Zr | 1.0 | 2.8 | 10.5 |
| f | 18.56 | 52.66 | 193.98 |
| Bf | 15.15 | 31.64 | 52.22 |
| FNo. | 3.61 | 4.97 | 6.51 |
| 2ω (°) | 81.2 | 29.8 | 8.4 |
| DD[5] | 0.8000 | 26.2757 | 59.2296 |
| DD[12] | 24.2299 | 9.0515 | 1.5754 |
| DD[22] | 1.3547 | 4.2283 | 1.3804 |
| DD[25] | 12.4830 | 9.6094 | 12.4573 |
| DD[29] | 10.8782 | 27.3941 | 47.9707 |

TABLE 48

Example 16

| Sn | 6 | 7 | 11 | 12 | 14 |
|---|---|---|---|---|---|
| KA | 1.0000000E+00 | 1.0000000E+00 | 1.0000000E+00 | 1.0000000E+00 | 1.0000000E+00 |
| A3 | 2.8322016E−20 | 3.7645909E−20 | 0.0000000E+00 | 0.0000000E+00 | 0.0000000E+00 |
| A4 | −1.4796820E−05 | −3.8586445E−06 | 1.1080529E−04 | 6.6814729E−05 | −2.5455244E−05 |
| A5 | 5.6452783E−08 | −7.9652924E−07 | −1.6713766E−05 | −1.5640492E−05 | 3.5433520E−06 |
| A6 | −5.1221884E−08 | −2.4610283E−07 | −3.7350400E−07 | −4.1021669E−07 | −6.350325IE−07 |
| A7 | 6.2802808E−09 | 5.4535669E−08 | 3.4722853E−07 | 3.0725237E−07 | 1.4563074E−08 |
| A8 | −3.4494723E−10 | −1.449518IE−09 | −1.3529167E−08 | −1.0197118E−08 | 1.0510754E−08 |
| A9 | −1.7331233E−11 | −3.9956503E−10 | −1.8402511E−09 | −1.8737057E−09 | −7.0907184E−10 |
| A10 | 1.4168912E−12 | 1.6457921E−11 | 1.0903929E−10 | 9.3461854E−11 | −1.1044683E−10 |

| Sn | 15 | 21 | 22 |
|---|---|---|---|
| KA | 1.0000000E+00 | 1.0000000E+00 | 1.0000000E+00 |
| A3 | 2.1684043E−20 | 2.7755576E−18 | −2.7755576E−18 |
| A4 | 3.2707311E−05 | −3.6643079E−05 | 4.3672716E−05 |
| A5 | 2.0014989E−06 | −2.2839046E−05 | −1.7558017E−05 |
| A6 | 4.7587707E−08 | 1.0227493E−05 | 7.0371533E−06 |
| A7 | 2.1669507E−08 | −2.5128274E−06 | −1.6937776E−06 |
| A8 | 4.2990499E−11 | 3.7146508E−07 | 2.5604224E−07 |
| A9 | −4.1056888E−10 | −3.1628178E−08 | −2.2719706E−08 |
| A10 | −6.2839249E−11 | 1.0944112E−09 | 8.1041056E−10 |

Example 17

Figure 34:
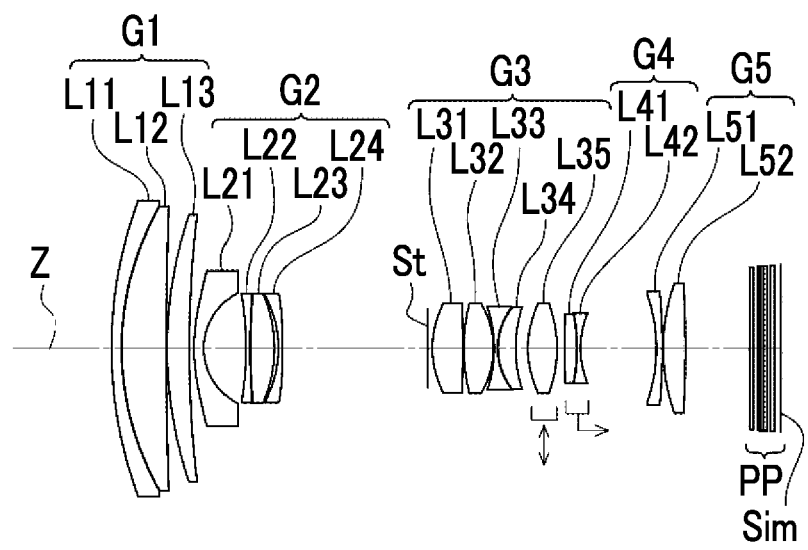
FIG. 34 is a diagram illustrating a cross-sectional view of a configuration and a movement trajectory of a zoom lens of Example 17 of the present disclosure.
Figure 35:
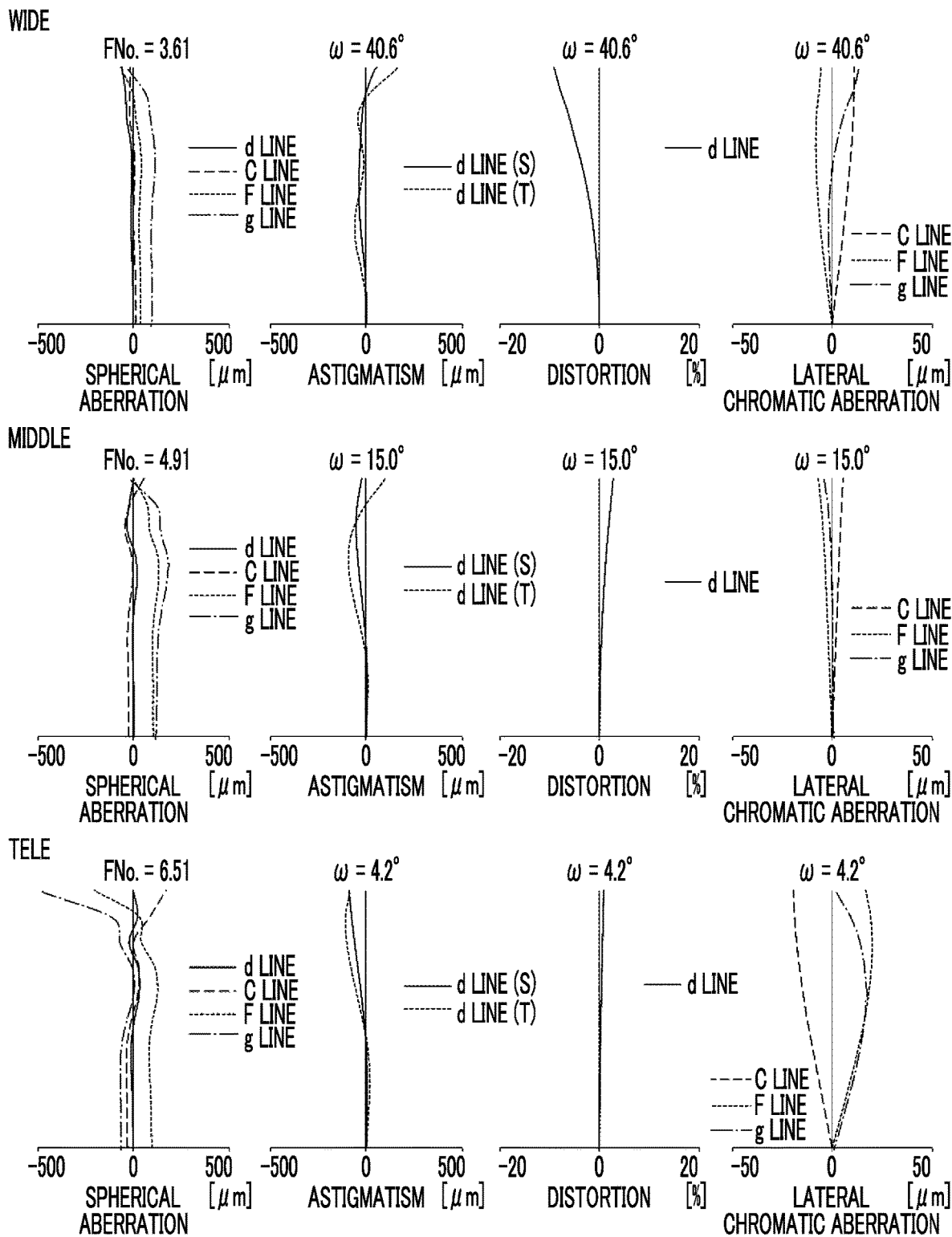
FIG. 35 is each aberration diagram of the zoom lens of Example 17 of the present disclosure.

FIG. 34 illustrates a cross-sectional view of a configuration and a movement trajectory of a zoom lens of Example 17. The zoom lens of Example 17 has the same configuration as the summary of the zoom lens of Example 1. For the zoom lens of Example 17, fundamental lens data is shown in Table 49, specifications and variable surface intervals are shown in Table 50, aspherical coefficients are shown in Table 51, and aberration diagrams are illustrated in FIG. 35.

TABLE 49

Example 17

| Sn | R | D | Nd | υd | θgF | Material |
|---|---|---|---|---|---|---|
| 1 | 75.30114 | 1.700 | 1.72825 | 28.46 | 0.60772 | S-TIH10.OHARA |
| 2 | 50.80097 | 7.510 | 1.49700 | 81.61 | 0.53887 | FCD1.HOYA |
| 3 | 683.03583 | 0.150 | | | | |
| 4 | 74.58661 | 3.724 | 1.61800 | 63.33 | 0.54414 | S-PHM52.OHARA |
| 5 | 207.21827 | DD[5] | | | | |
| *6 | 33.84080 | 1.600 | 1.80625 | 40.91 | 0.56920 | L-LAH53.OHARA |
| *7 | 10.77295 | 6.935 | | | | |
| 8 | −57.63231 | 0.710 | 1.85150 | 40.78 | 0.56958 | S-LAH89.OHARA |
| 9 | 114.46394 | 4.019 | 1.86966 | 20.02 | 0.64349 | FDS20-W.HOYA |
| 10 | −24.39714 | 0.709 | | | | |
| *11 | −18.21330 | 0.700 | 1.85400 | 40.38 | 0.56890 | L-LAH85V.OHARA |
| *12 | −88.96722 | DD[12] | | | | |
| 13 (St) | ∞ | 0.800 | | | | |
| *14 | 16.67262 | 5.117 | 1.58313 | 59.38 | 0.54237 | L-BAL42.OHARA |
| *15 | −100.00057 | 0.150 | | | | |
| 16 | 32.75376 | 4.926 | 1.48749 | 70.24 | 0.53007 | S-FSL5.OHARA |
| 17 | −15.79372 | 0.150 | | | | |
| 18 | −22.44428 | 0.600 | 1.76200 | 40.10 | 0.57655 | S-LAM55.OHARA |
| 19 | 11.63759 | 3.010 | 1.49700 | 81.54 | 0.53748 | S-FPL51.OHARA |
| 20 | 24.22068 | 2.000 | | | | |
| *21 | 15.99503 | 4.980 | 1.49710 | 81.56 | 0.53848 | M-FCD1.HOYA |
| *22 | −21.62268 | DD[22] | | | | |
| 23 | 899.16307 | 2.000 | 1.85026 | 32.27 | 0.59299 | S-LAH71.OHARA |
| 24 | −33.93007 | 0.610 | 1.61800 | 63.33 | 0.54414 | S-PHM52.OHARA |
| 25 | 15.95515 | DD[25] | | | | |
| 26 | −28.61803 | 1.000 | 1.59551 | 39.24 | 0.58043 | S-TIM8.OHARA |
| 27 | −109.71072 | 0.150 | | | | |
| 28 | 34.61500 | 3.688 | 1.51823 | 58.90 | 0.54567 | S-NSL3.OHARA |
| 29 | −214.81072 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 50

Example 17

| | WIDE | MIDDLE | TELE |
|---|---|---|---|
| Zr | 1.0 | 2.8 | 10.5 |
| f | 18.55 | 52.66 | 193.93 |
| Bf | 15.05 | 31.61 | 54.15 |
| FNo. | 3.61 | 4.91 | 6.51 |
| 2ω (°) | 81.2 | 30.0 | 8.4 |
| DD[5] | 0.8000 | 27.3701 | 60.2331 |
| DD[12] | 24.2851 | 9.2277 | 1.7154 |
| DD[22] | 1.3052 | 4.1799 | 1.3344 |
| DD[25] | 12.7180 | 9.8433 | 12.6888 |
| DD[29] | 10.7863 | 27.3703 | 49.9001 |

TABLE 51

Example 17

| Sn | 6 | 7 | 11 | 12 | 14 |
|---|---|---|---|---|---|
| KA | 1.0000000E+00 | 1.0000000E+00 | 1.0000000E+00 | 1.0000000E+00 | 1.0000000E+00 |
| A3 | 0.0000000E+00 | 2.5097273E−20 | −8.6736174E−20 | 0.0000000E+00 | 0.0000000E+00 |
| A4 | −6.2654378E−06 | 8.1782638E−06 | 1.2192618E−04 | 7.5015223E−05 | −2.3021350E−05 |

TABLE 51-continued

| | | | Example 17 | | |
|---|---|---|---|---|---|
| A5 | −2.0147307E−06 | −4.3704873E−06 | −1.7203302E−05 | −1.5581264E−05 | 5.1771992E−06 |
| A6 | 2.2616196E−08 | 1.0885976E−07 | −8.0738008E−07 | −8.7698469E−07 | −9.5807766E−07 |
| A7 | 1.0879495E−08 | 2.6553138E−08 | 3.3883728E−07 | 3.0240561E−07 | 1.2530688E−08 |
| A8 | −5.8663423E−10 | −2.1904828E−09 | −8.3352523E−09 | −5.1441492E−09 | 1.3555655E−08 |
| A9 | −8.3081710E−12 | −2.1082053E−10 | −1.8098039E−09 | −1.8336798E−09 | −5.4696821E−10 |
| A10 | 8.5219597E−13 | 8.8881858E−12 | 8.7434805E−11 | 7.4518758E−11 | −1.3053596E−10 |

| | Sn | 15 | 21 | 22 |
|---|---|---|---|---|
| | KA | 1.0000000E+00 | 1.0000000E+00 | 1.0000000E+00 |
| | A3 | −2.1684043E−20 | −5.5511151E−18 | −1.3877788E−18 |
| | A4 | 3.5189647E−05 | −3.8539869E−05 | 4.7080565E−05 |
| | A5 | 3.0792785E−06 | −2.3729041E−05 | −1.8411709E−05 |
| | A6 | −1.0286882E−07 | 1.0282464E−05 | 7.0877417E−06 |
| | A7 | 4.9242736E−09 | −2.4967243E−06 | −1.6723688E−06 |
| | A8 | 5.5248852E−09 | 3.7181057E−07 | 2.5504276E−07 |
| | A9 | −4.4379471E−10 | −3.1672631E−08 | −2.2713647E−08 |
| | A10 | −7.3841753E−11 | 1.0929599E−09 | 8.1484245E−10 |

Example 18

Figure 36:
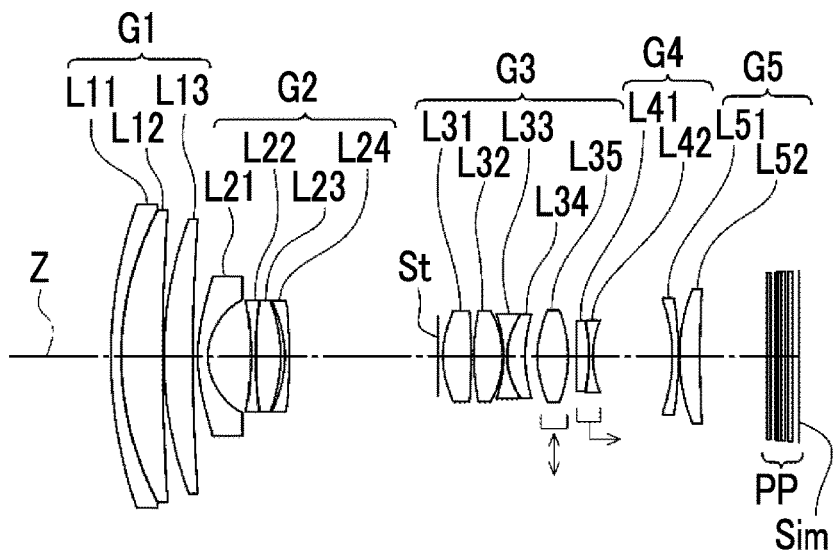
FIG. 36 is a diagram illustrating a cross-sectional view of a configuration and a movement trajectory of a zoom lens of Example 18 of the present disclosure.
Figure 37:
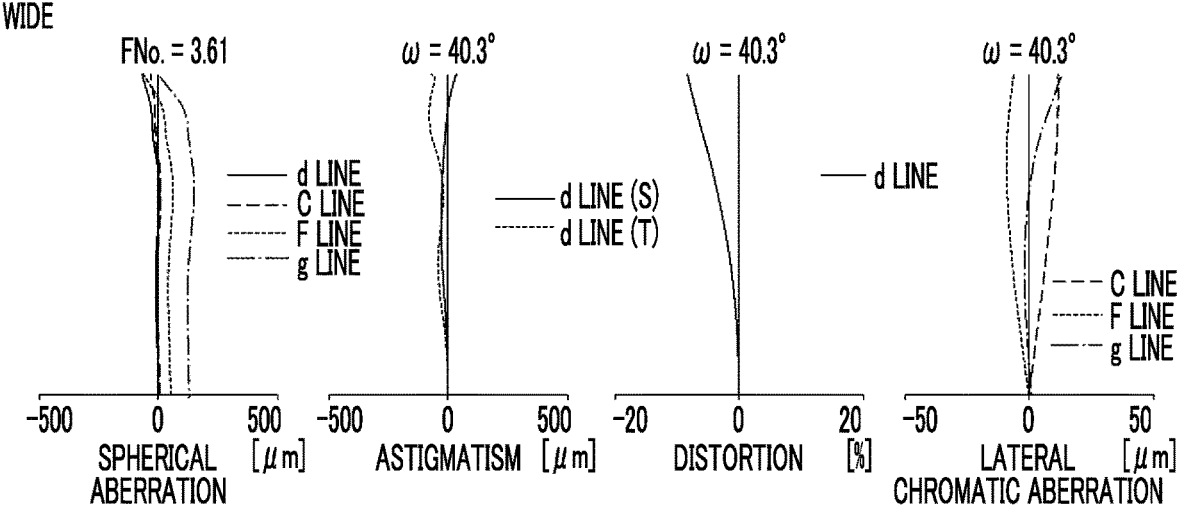
FIG. 37 is each aberration diagram of the zoom lens of Example 18 of the present disclosure.
Figure 37:
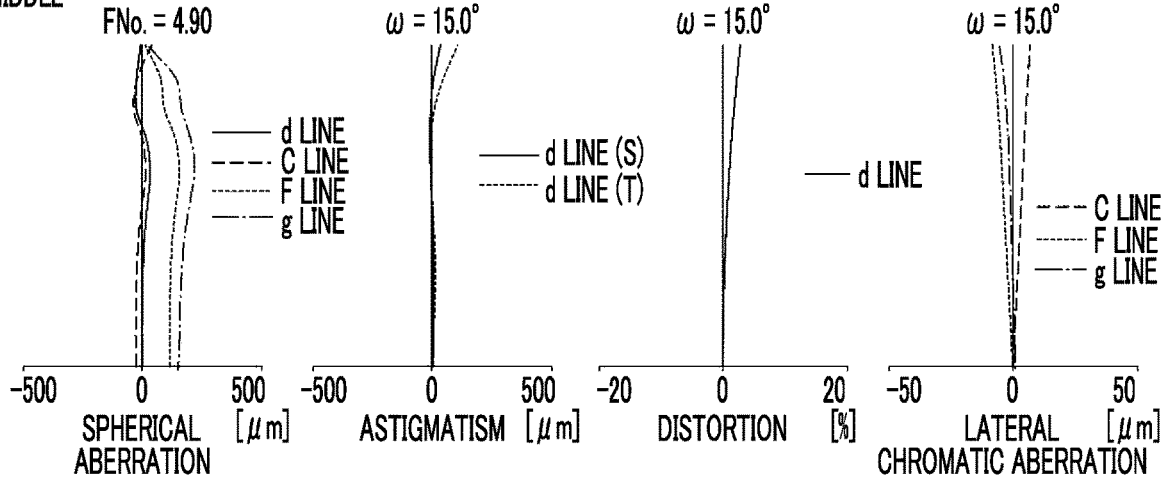
Figure 37:
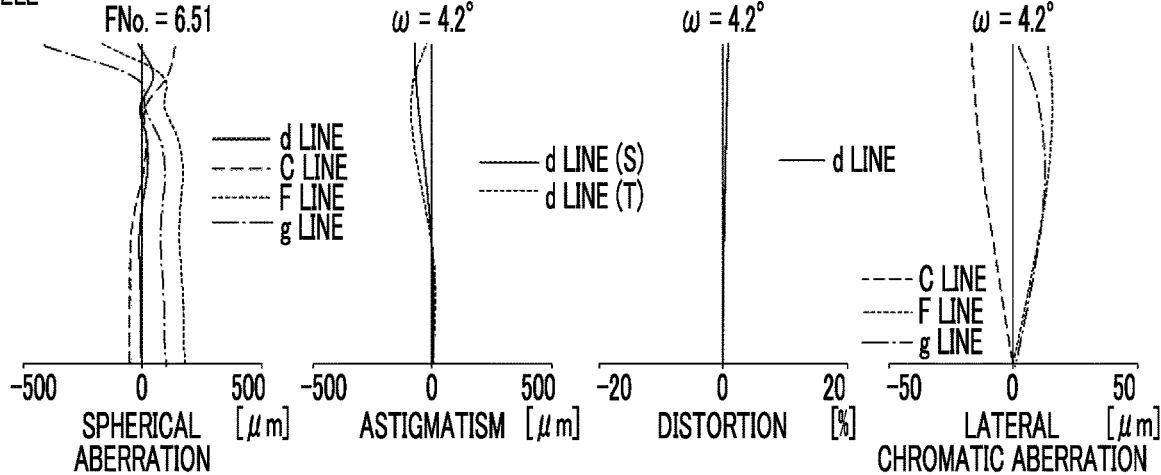

FIG. 36 illustrates a cross-sectional view of a configuration and a movement trajectory of a zoom lens of Example 18. The zoom lens of Example 18 has the same configuration as the summary of the zoom lens of Example 1. For the zoom lens of Example 18, fundamental lens data is shown in Table 52, specifications and variable surface intervals are shown in Table 53, aspherical coefficients are shown in Table 54, and aberration diagrams are illustrated in FIG. 37.

TABLE 52

| | | | Example 18 | | | |
|---|---|---|---|---|---|---|
| Sn | R | D | Nd | υd | θgF | Material |
| 1 | 79.40303 | 1.700 | 1.85883 | 30.00 | 0.59793 | NBFD30.HOYA |
| 2 | 53.96863 | 6.767 | 1.45860 | 90.19 | 0.53516 | FCD10A.HOYA |
| 3 | 404.02934 | 0.150 | | | | |
| 4 | 67.47140 | 4.748 | 1.61800 | 63.33 | 0.54414 | S-PHM52.OHARA |
| 5 | 344.29069 | DD[5] | | | | |
| *6 | 30.38460 | 1.600 | 1.80625 | 40.91 | 0.56920 | L-LAH53.OHARA |
| *7 | 10.61078 | 7.056 | | | | |
| 8 | −57.27234 | 0.710 | 1.85150 | 40.78 | 0.56958 | S-LAH89.OHARA |
| 9 | 75.27628 | 4.021 | 1.89286 | 20.36 | 0.63944 | S-NPH4.OHARA |
| 10 | −26.77931 | 0.730 | | | | |
| *11 | −19.20908 | 0.700 | 1.85400 | 40.38 | 0.56890 | L-LAH85V.OHARA |
| *12 | −100.00360 | DD[12] | | | | |
| 13 (St) | ∞ | 0.800 | | | | |
| *14 | 16.68672 | 4.609 | 1.58313 | 59.38 | 0.54237 | L-BAL42.OHARA |
| *15 | −73.70684 | 0.418 | | | | |
| 16 | 38.64274 | 4.686 | 1.48749 | 70.24 | 0.53007 | S-FSL5.OHARA |
| 17 | −16.01526 | 0.150 | | | | |
| 18 | −22.72681 | 0.600 | 1.76200 | 40.10 | 0.57655 | S-LAM55.OHARA |
| 19 | 11.84750 | 3.010 | 1.49700 | 81.54 | 0.53748 | S-FPL51.OHARA |
| 20 | 24.24230 | 2.000 | | | | |
| *21 | 16.38275 | 5.017 | 1.49710 | 81.56 | 0.53848 | M-FCD1.HOYA |
| *22 | −21.17540 | DD[22] | | | | |
| 23 | −384.07459 | 2.000 | 1.85026 | 32.27 | 0.59299 | S-LAH71.OHARA |
| 24 | −30.84268 | 0.610 | 1.59410 | 60.47 | 0.55516 | FCD600.HOYA |
| 25 | 16.07465 | DD[25] | | | | |
| 26 | −28.74898 | 1.000 | 1.59551 | 39.24 | 0.58043 | S-TIM8.OHARA |
| 27 | −63.22934 | 0.150 | | | | |
| 28 | 31.67296 | 3.333 | 1.51823 | 58.90 | 0.54567 | S-NSL3.OHARA |
| 29 | 209.23535 | DD[29] | | | | |
| 30 | ∞ | 0.600 | 1.54763 | 54.99 | 0.55229 | |
| 31 | ∞ | 0.810 | | | | |
| 32 | ∞ | 0.350 | 1.54763 | 54.99 | 0.55229 | |
| 33 | ∞ | 0.600 | 1.54763 | 54.99 | 0.55229 | |
| 34 | ∞ | 0.600 | 1.54763 | 54.99 | 0.55229 | |
| 35 | ∞ | 0.500 | | | | |
| 36 | ∞ | 0.700 | 1.49784 | 54.95 | 0.54959 | |
| 37 | ∞ | 1.100 | | | | |

TABLE 53

| Example 18 | | | |
|---|---|---|---|
| | WIDE | MIDDLE | TELE |
| Zr | 1.0 | 2.8 | 10.5 |
| f | 18.55 | 52.65 | 193.91 |
| Bf | 15.14 | 31.54 | 54.22 |
| FNo. | 3.61 | 4.90 | 6.51 |
| 2ω (°) | 80.6 | 30.0 | 8.4 |
| DD[5] | 0.8000 | 27.5531 | 60.7036 |
| DD[12] | 24.2152 | 9.0623 | 1.4138 |
| DD[22] | 1.3918 | 4.2674 | 1.4212 |
| DD[25] | 12.9865 | 10.1109 | 12.9571 |
| DD[29] | 12.9865 | 27.3003 | 50.0077 |

TABLE 54

| Example 18 | | | | | |
|---|---|---|---|---|---|
| Sn | 6 | 7 | 11 | 12 | 14 |
| KA | 1.0000000E+00 | 1.0000000E+00 | 1.0000000E+00 | 1.0000000E+00 | 1.0000000E+00 |
| A3 | 0.0000000E+00 | 2.5097273E−20 | −8.6736174E−20 | 0.0000000E+00 | 0.0000000E+00 |
| A4 | −7.5171511E−06 | 1.6867144E−07 | 1.2324324E−04 | 1.2324324E−04 | −2.7924841E−05 |
| A5 | −1.7235212E−06 | −1.9991825E−06 | −1.6357033E−05 | −1.6052967E−05 | 4.7598448E−06 |
| A6 | −3.5162213E−08 | −1.8790448E−07 | −8.4904332E−07 | −7.6586630E−07 | −8.5622307E−07 |
| A7 | 1.4746072E−08 | 2.6523918E−08 | 3.3354750E−07 | 2.9607110E−07 | 9.3512712E−09 |
| A8 | −5.7830619E−10 | −1.2558017E−09 | −8.0266291E−09 | −5.4343341E−09 | 1.2878905E−08 |
| A9 | −2.0593538E−11 | −1.6536653E−11 | −1.8025336E−09 | −1.8275597E−09 | −6.1868394E−10 |
| A10 | 1.1702360E−12 | −9.0880770E−12 | 8.7648580E−11 | 7.4732387E−11 | −1.3415196E−10 |

| | Sn | 15 | 21 | 22 |
|---|---|---|---|---|
| | KA | 1.0000000E+00 | 1.0000000E+00 | 1.0000000E+00 |
| | A3 | −2.1684043E−20 | −5.5511151E−18 | −1.3877788E−18 |
| | A4 | 2.8304831E−05 | −3.7588457E−05 | 4.8211963E−05 |
| | A5 | 3.4484108E−06 | −2.4486363E−05 | −1.9641699E−05 |
| | A6 | −1.2253394E−07 | 1.0307453E−05 | 7.1268569E−06 |
| | A7 | 2.4196088E−09 | −2.5018060E−06 | −1.6839951E−06 |
| | A8 | 4.6258406E−09 | 3.7050466E−07 | 2.5509892E−07 |
| | A9 | −5.2635939E−10 | −3.1916562E−08 | −2.2729807E−08 |
| | A10 | −6.9908604E−11 | 1.1267397E−09 | 8.1457625E−10 |

Table 55, Table 56, and Table 57 show d line-based corresponding values of Conditional Expressions (1) to (25) of the zoom lenses of Examples 1 to 18. In Examples 1 to 18, d line is used as a reference wavelength.

TABLE 55

| Expression Number | | Example 1 | Example 2 | Example 3 | Example 4 | Example 5 | Example 6 |
|---|---|---|---|---|---|---|---|
| (1) | β4t/β4w | 1.632 | 1.709 | 1.610 | 1.765 | 1.690 | 1.681 |
| (2) | f3/f5 | 0.025 | 0.049 | 0.018 | 0.063 | 0.045 | 0.042 |
| (3) | $(1 − β4w^2) × β5w^2$ | −2.627 | −2.642 | −2.646 | −2.652 | −2.641 | −2.616 |
| (4) | $(1 − β4t^2) × β5t^2$ | −7.849 | −7.803 | −7.896 | −7.773 | −7.808 | −7.754 |
| (5) | $(1 − βisw) × βrw$ | 1.991 | 1.978 | 2.001 | 1.985 | 1.991 | 1.974 |
| (6) | $(1 − βist) × βrt$ | 4.083 | 4.082 | 4.085 | 4.103 | 4.111 | 4.075 |
| (7) | $\frac{(1 − βist) × βrt}{(1 − βisw) × βrw}$ | 2.050 | 2.064 | 2.042 | 2.067 | 2.065 | 2.065 |
| (8) | β2t/β2w | 4.102 | 4.041 | 4.116 | 4.009 | 4.026 | 4.026 |
| (9) | β3t/β3w | 1.638 | 1.676 | 1.631 | 1.695 | 1.686 | 1.681 |
| (10) | (β2t/β2w) (β3t/β3w) | 2.505 | 2.411 | 2.524 | 2.364 | 2.388 | 2.395 |
| (11) | (β3t/β3w) (β4t/β4w) | 1.003 | 0.981 | 1.013 | 0.961 | 0.997 | 1.000 |
| (12) | $\frac{(1 − β4t^2) × β5t^2}{(1 − β4w^2) × β5w^2}$ | 2.987 | 2.954 | 2.985 | 2.931 | 2.956 | 2.964 |
| (13) | N1p | 1.55750 | 1.55750 | 1.55750 | 1.55750 | 1.58416 | 1.58416 |
| (14) | ν1p | 72.470 | 72.470 | 72.470 | 72.470 | 69.415 | 69.415 |
| (15) | θ1n-θ1p | 0.0662 | 0.0662 | 0.0662 | 0.0662 | 0.0633 | 0.0588 |
| (16) | θ12n-θ12p | 0.0064 | 0.0047 | 0.0063 | 0.0006 | 0.0037 | 0.0026 |
| (17) | N4p-N4n | 0.232 | 0.232 | 0.232 | 0.232 | 0.232 | 0.232 |
| (18) | ν4n-ν4p | 31.060 | 31.060 | 31.060 | 31.060 | 31.060 | 31.060 |

TABLE 55-continued

| Expression Number | | Example 1 | Example 2 | Example 3 | Example 4 | Example 5 | Example 6 |
|---|---|---|---|---|---|---|---|
| (19) | N5n-N5p | 0.077 | 0.077 | 0.085 | 0.077 | 0.077 | 0.077 |
| (20) | $\upsilon 5p-\upsilon 5n$ | 19.660 | 19.660 | 20.870 | 19.660 | 19.660 | 19.660 |
| (21) | fw/f1 | 0.181 | 0.177 | 0.182 | 0.175 | 0.177 | 0.176 |
| (22) | fw/f2 | −1.298 | −1.285 | −1.292 | −1.277 | −1.302 | −1.283 |
| (23) | fw/f3 | 0.935 | 0.936 | 0.933 | 0.937 | 0.942 | 0.932 |
| (24) | fw/f4 | −0.575 | −0.579 | −0.572 | −0.582 | −0.570 | −0.566 |
| (25) | fw/f5 | 0.023 | 0.046 | 0.017 | 0.059 | 0.042 | 0.039 |

TABLE 56

| Expression Number | | Example 7 | Example 8 | Example 9 | Example 10 | Example 11 | Example 12 |
|---|---|---|---|---|---|---|---|
| (1) | β4t/β4w | 1.714 | 1.594 | 1.587 | 1.573 | 1.521 | 1.523 |
| (2) | f3/f5 | 0.050 | 0.011 | 0.009 | 0.004 | −0.018 | −0.017 |
| (3) | $(1 - \beta 4w^2) \times \beta 5w^2$ | −2.642 | −2.659 | −2.643 | −2.633 | −2.545 | −2.551 |
| (4) | $(1 - \beta 4t^2) \times \beta 5t^2$ | −7.769 | −7.963 | −7.925 | −7.889 | −7.703 | −7.730 |
| (5) | $(1 - \beta isw) \times \beta rw$ | 1.983 | 2.000 | 2.000 | 1.996 | 1.998 | 2.006 |
| (6) | $(1 - \beta ist) \times \beta rt$ | 4.084 | 4.079 | 4.078 | 4.074 | 4.067 | 4.088 |
| (7) | $\frac{(1 - \beta ist) \times \beta rt}{(1 - \beta isw) \times \beta rw}$ | 2.059 | 2.040 | 2.039 | 2.041 | 2.036 | 2.038 |
| (8) | β2t/β2w | 4.049 | 4.133 | 4.135 | 4.139 | 4.155 | 4.147 |
| (9) | β3t/β3w | 1.676 | 1.620 | 1.617 | 1.618 | 1.604 | 1.606 |
| (10) | (β2t/β2w) (β3t/β3w) | 2.416 | 2.552 | 2.557 | 2.558 | 2.591 | 2.582 |
| (11) | (β3t/β3w) (β4t/β4w) | 0.978 | 1.016 | 1.019 | 1.029 | 1.055 | 1.054 |
| (12) | $\frac{(1 - \beta 4t^2) \times \beta 5t^2}{(1 - \beta 4w^2) \times \beta 5w^2}$ | 2.940 | 2.994 | 2.999 | 2.996 | 3.027 | 3.030 |
| (13) | N1p | 1.57788 | 1.51611 | 1.50456 | 1.50336 | 1.51491 | 1.55750 |
| (14) | $\upsilon 1p$ | 69.015 | 81.415 | 84.275 | 84.720 | 81.860 | 72.470 |
| (15) | θ1n-θ1p | 0.0592 | 0.0688 | 0.0687 | 0.0688 | 0.0641 | 0.0662 |
| (16) | θ12n-θ12p | 0.0065 | 0.0081 | 0.0080 | 0.0105 | 0.0069 | 0.0063 |
| (17) | N4p-N4n | 0.232 | 0.232 | 0.232 | 0.255 | 0.232 | 0.232 |
| (18) | $\upsilon 4n-\upsilon 4p$ | 31.060 | 31.060 | 31.060 | 35.460 | 31.060 | 31.060 |
| (19) | N5n-N5p | 0.053 | 0.085 | 0.085 | 0.085 | 0.114 | 0.114 |
| (20) | $\upsilon 5p-\upsilon 5n$ | 24.150 | 20.870 | 20.870 | 20.870 | 19.780 | 19.780 |
| (21) | fw/f1 | 0.179 | 0.182 | 0.182 | 0.183 | 0.183 | 0.182 |
| (22) | fw/f2 | −1.316 | −1.288 | −1.285 | −1.303 | −1.286 | −1.286 |
| (23) | fw/f3 | 0.943 | 0.934 | 0.932 | 0.937 | 0.929 | 0.928 |
| (24) | fw/f4 | −0.572 | −0.576 | −0.573 | −0.564 | −0.553 | −0.552 |
| (25) | fw/f5 | 0.048 | 0.011 | 0.008 | 0.004 | −0.017 | −0.016 |

TABLE 57

| Expression Number | | Example 13 | Example 14 | Example 15 | Example 16 | Example 17 | Example 18 |
|---|---|---|---|---|---|---|---|
| (1) | β4t/β4w | 1.641 | 1.743 | 1.766 | 1.620 | 1.708 | 1.754 |
| (2) | f3/f5 | 0.026 | 0.057 | 0.061 | 0.019 | 0.046 | 0.058 |
| (3) | $(1 - \beta 4w^2) \times \beta 5w^2$ | −2.698 | −2.736 | −2.705 | −2.710 | −2.691 | −2.670 |
| (4) | $(1 - \beta 4t^2) \times \beta 5t^2$ | −8.047 | −7.932 | −7.890 | −8.112 | −7.972 | −7.840 |
| (5) | $(1 - \beta isw) \times \beta rw$ | 2.038 | 1.958 | 19.71 | 2.010 | 2.046 | 2.031 |
| (6) | $(1 - \beta ist) \times \beta rt$ | 4.182 | 4.048 | 4.086 | 4.123 | 4.230 | 4.200 |
| (7) | $\frac{(1 - \beta ist) \times \beta rt}{(1 - \beta isw) \times \beta rw}$ | 2.052 | 2.067 | 20.72 | 2.051 | 5.067 | 2.068 |
| (8) | β2t/β2w | 4.105 | 3.999 | 4.025 | 4.117 | 4.052 | 4.029 |
| (9) | β3t/β3w | 1.632 | 1.706 | 1.692 | 1.625 | 1.665 | 1.680 |
| (10) | (β2t/β2w) (β3t/β3w) | 2.515 | 2.344 | 2.379 | 2.534 | 2.433 | 2.936 |
| (11) | (β3t/β3w) (β4t/β4w) | 0.995 | 0.979 | 0.958 | 1.003 | 0.975 | 0.958 |
| (12) | $\frac{(1 - \beta 4t^2) \times \beta 5t^2}{(1 - \beta 4w^2) \times \beta 5w^2}$ | 2.983 | 2.899 | 2.917 | 2.993 | 2.962 | 2.936 |
| (13) | N1p | 1.55750 | 1.55750 | 1.55750 | 1.55750 | 1.55750 | 1.55750 |
| (14) | $\upsilon 1p$ | 72.470 | 72.470 | 72.470 | 72.470 | 72.470 | 72.470 |
| (15) | θ1n-θ1p | 0.0617 | 00617 | 0.0617 | 0.0536 | 0.0662 | 0.0583 |
| (16) | θ12n-θ12p | 0.0053 | 0.0113 | 0.0072 | 0.0033 | 0.0034 | 0.0035 |

TABLE 57-continued

| Expression Number | | Example 13 | Example 14 | Example 15 | Example 16 | Example 17 | Example 18 |
|---|---|---|---|---|---|---|---|
| (17) | N4p-N4n | 0.232 | 0.232 | 0.232 | 0.241 | 0.232 | 0.256 |
| (18) | ν4n-ν4p | 31.060 | 31.060 | 31.060 | 33.330 | 31.060 | 28.200 |
| (19) | N5n-N5p | 0.077 | 0.077 | 0.077 | 0.077 | 0.077 | 0.077 |
| (20) | ν5p-ν5n | 19.660 | 19.660 | 19.660 | 19.660 | 19.660 | 19.660 |
| (21) | fw/f1 | 0.182 | 0.177 | 0.180 | 0.183 | 0.179 | 0.178 |
| (22) | fw/f2 | −1.309 | −1.331 | −1.360 | −1.315 | −1.323 | −1.307 |
| (23) | fw/f3 | 0.938 | 0.972 | 0.961 | 0.938 | 0.939 | 0.940 |
| (24) | fw/f4 | −0.574 | −0.571 | −0.569 | −0.572 | −0.3571 | −0.572 |
| (25) | fw/f5 | 0.024 | 0.055 | 0.058 | 0.017 | 0.043 | 0.055 |

As is perceived from the above data, even in a case where the zoom lenses of Examples 1 to 18 are configured in a small size, a high magnification of "greater than or equal to 10 times" is achieved as the zoom magnification, and various types of aberration are favorably corrected. In addition, a change in various types of aberration in the case of the zooming is suppressed, and high optical performance is implemented.

Figure 38:
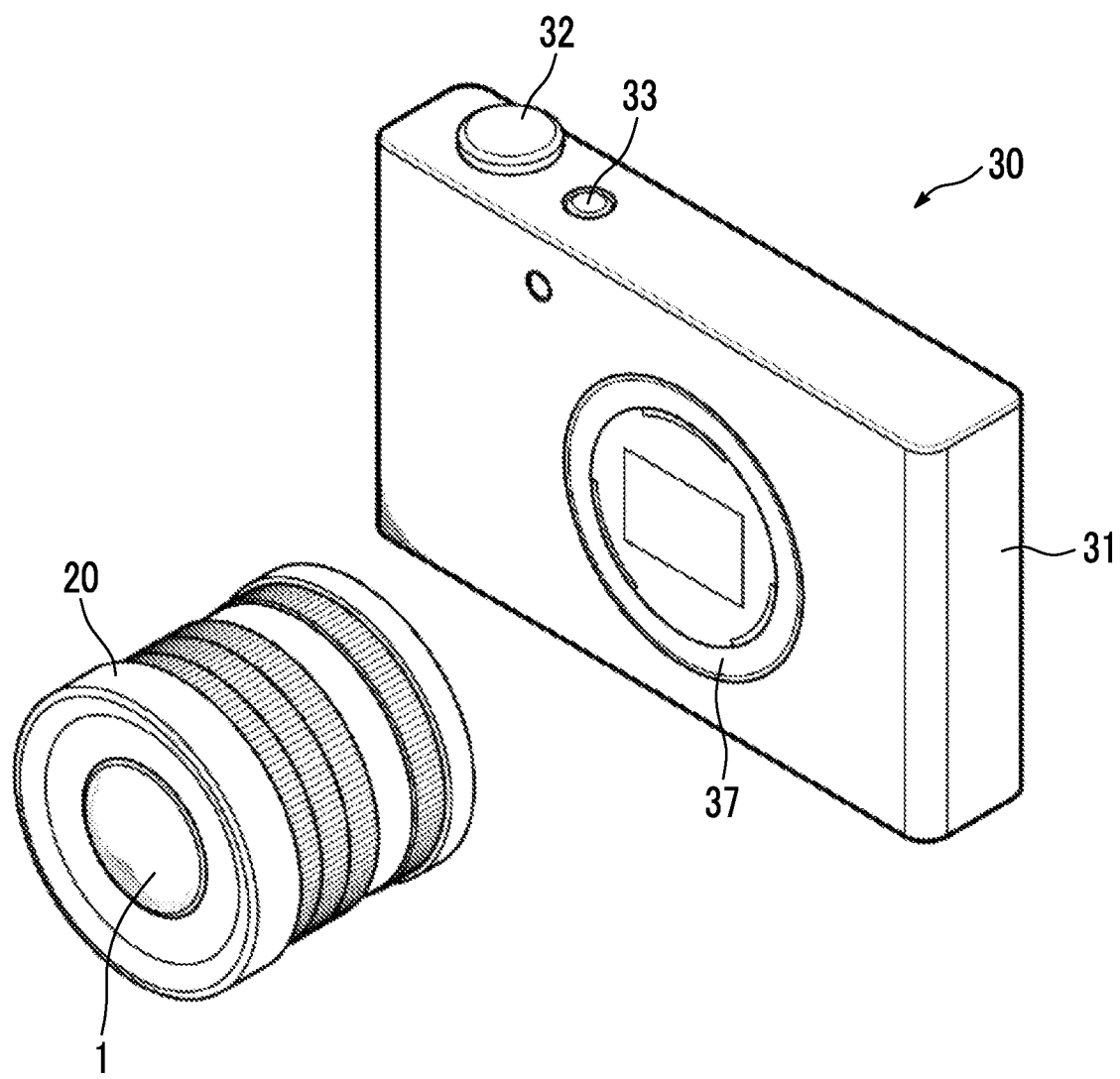
FIG. 38 is a perspective view of a front surface side of an imaging apparatus according to one embodiment of the present disclosure.
Figure 39:
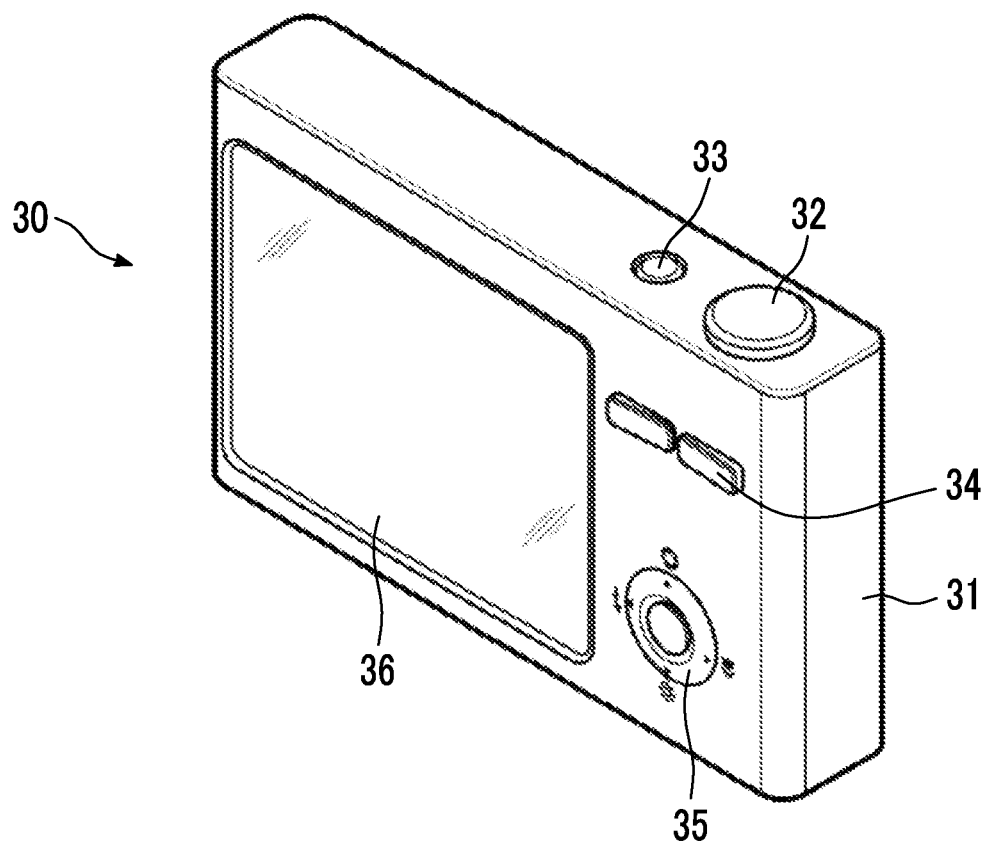
FIG. 39 is a perspective view of a rear surface side of the imaging apparatus according to one embodiment of the present disclosure.

Next, an imaging apparatus according to the embodiment of the present disclosure will be described. FIG. 38 and FIG. 39 illustrate exterior views of a camera 30 that is the imaging apparatus according to one embodiment of the present disclosure. FIG. 38 illustrates a perspective view of the camera 30 seen from a front surface side, and FIG. 39 illustrates a perspective view of the camera 30 seen from a rear surface side. The camera 30 is a so-called mirrorless type digital camera, and an interchangeable lens 20 can be attachably and detachably mounted on the camera 30. The interchangeable lens 20 is configured to include a zoom lens 1 according to one embodiment of the present disclosure. The zoom lens 1 is accommodated in a lens barrel.

The camera 30 comprises a camera body 31. A shutter button 32 and a power button 33 are disposed on the upper surface of the camera body 31. In addition, an operation unit 34, an operation unit 35, and a display unit 36 are disposed on the rear surface of the camera body 31. The display unit 36 displays a captured image and an image in an angle of view before imaging.

An imaging aperture on which light from an imaging target is incident is disposed in the front surface center portion of the camera body 31. A mount 37 is disposed at a position corresponding to the imaging aperture. The interchangeable lens 20 is mounted on the camera body 31 through the mount 37.

In the camera body 31, an imaging element such as a charge coupled device (CCD) or a complementary metal oxide semiconductor (CMOS) that outputs an imaging signal corresponding to a subject image formed by the interchangeable lens 20, a signal processing circuit that generates an image by processing the imaging signal output from the imaging element, a recording medium for recording the generated image, and the like are disposed. In the camera 30, a still picture or a motion picture can be imaged by pushing the shutter button 32, and image data obtained by imaging is recorded on the recording medium.

While the technology of the present disclosure has been illustratively described with the embodiment and the examples, the technology of the present disclosure is not limited to the embodiment and the examples and can be subjected to various modifications. For example, the radius of curvature, the surface interval, the refractive index, the Abbe number, the aspherical coefficient, and the like of each lens are not limited to the values shown in each example and may have other values.

The imaging apparatus according to the embodiment of the present disclosure is not limited to the above example and, for example, can have various embodiments of a camera other than a mirrorless type, a film camera, and a video camera.

What is claimed is:

1. A zoom lens comprising:
   a first lens group having a positive refractive power, a second lens group having a negative refractive power, a third lens group having a positive refractive power, and a subsequent group consisting of a plurality of lens groups in order from an object side to an image side as lens groups,
   wherein in a case of zooming from a wide angle end to a telephoto end, an interval between the first lens group and the second lens group is increased, an interval between the second lens group and the third lens group is changed, an interval between the third lens group and the subsequent group is changed, and each interval between adjacent lens groups in the subsequent group is changed,
   the third lens group includes two uncemented positive lenses, one negative lens, and one positive lens consecutively arranged in order from a side closest to the object side to the image side, and
   a lens group closest to the image side in the subsequent group consists of a negative meniscus lens having a concave surface toward the object side and a positive lens having a convex surface toward the object side in order from the object side to the image side.

2. The zoom lens according to claim 1,
   wherein the subsequent group consists of a fourth lens group having a negative refractive power and a fifth lens group in order from an object side to an image side.

3. The zoom lens according to claim 2,
   wherein the fourth lens group is moved along an optical axis in a case of focusing.

4. The zoom lens according to claim 1,
   wherein the first lens group at the telephoto end is positioned on the object side from the first lens group at the wide angle end.

5. The zoom lens according to claim 1,
   wherein a stop is arranged between a surface of the second lens group closest to the image side and a surface of the third lens group closest to the image side.

6. The zoom lens according to claim 5,
   wherein a lens of the third lens group closest to the image side is a biconvex lens, and the biconvex lens of the third lens group closest to the image side is moved in a direction intersecting with an optical axis in a case of image shake correction.

7. The zoom lens according to claim 2,
wherein in the case of the zooming from the wide angle end to the telephoto end, the third lens group and the fifth lens group are moved as a single unit.

8. The zoom lens according to claim 2,
wherein a lens of the third lens group closest to the image side is moved in a direction intersecting with an optical axis in a case of image shake correction, and
in a case where a lateral magnification of the fourth lens group at the wide angle end in a state where an object at infinity is focused is denoted by β4w, and a lateral magnification of the fourth lens group at the telephoto end in a state where the object at infinity is focused is denoted by β4t, Conditional Expression (1) is satisfied, which is represented by $$1.45 < \beta 4t/\beta 4w < 2 \qquad (1).$$

9. The zoom lens according to claim 2,
wherein in a case where a focal length of the third lens group is denoted by f3, and a focal length of the fifth lens group is denoted by f5, Conditional Expression (2) is satisfied, which is represented by $$-0.05 < f3/f5 < 0.3 \qquad (2).$$

10. The zoom lens according to claim 2,
wherein the fourth lens group is moved along an optical axis in a case of focusing, and
in a case where a lateral magnification of the fourth lens group at the wide angle end in a state where an object at infinity is focused is denoted by β4w, and a lateral magnification of the fifth lens group at the wide angle end in a state where the object at infinity is focused is denoted by β5w, Conditional Expression (3) is satisfied, which is represented by $$-3 < (1-\beta 4w^2) \times \beta 5w^2 < -2 \qquad (3).$$

11. The zoom lens according to claim 2,
wherein the fourth lens group is moved along an optical axis in a case of focusing, and
in a case where a lateral magnification of the fourth lens group at the telephoto end in a state where an object at infinity is focused is denoted by β4t, and a lateral magnification of the fifth lens group at the telephoto end in a state where the object at infinity is focused is denoted by β5t, Conditional Expression (4) is satisfied, which is represented by $$-10 < (1-\beta 4t^2) \times \beta 5t^2 < -7 \qquad (4).$$

12. The zoom lens according to claim 1,
wherein a lens of the third lens group closest to the image side is moved in a direction intersecting with an optical axis in a case of image shake correction, and
in a case where a lateral magnification of the lens of the third lens group closest to the image side at the wide angle end in a state where an object at infinity is focused is denoted by βisw, and a combined lateral magnification of all lens groups on the image side from the third lens group at the wide angle end in a state where the object at infinity is focused is denoted by βrw, Conditional Expression (5) is satisfied, which is represented by $$1.8 < (1-\beta isw) \times \beta rw < 2.5 \qquad (5).$$

13. The zoom lens according to claim 1,
wherein a lens of the third lens group closest to the image side is moved in a direction intersecting with an optical axis in a case of image shake correction, and
in a case where a lateral magnification of the lens of the third lens group closest to the image side at the telephoto end in a state where an object at infinity is focused is denoted by βist, and a combined lateral magnification of all lens groups on the image side from the third lens group at the telephoto end in a state where the object at infinity is focused is denoted by βrt, Conditional Expression (6) is satisfied, which is represented by $$3.8 < (1-\beta ist) \times \beta rt < 5 \qquad (6).$$

14. The zoom lens according to claim 1,
wherein a lens of the third lens group closest to the image side is moved in a direction intersecting with an optical axis in a case of image shake correction, and
in a case where a lateral magnification of the lens of the third lens group closest to the image side at the wide angle end in a state where an object at infinity is focused is denoted by βisw, a combined lateral magnification of all lens groups on the image side from the third lens group at the wide angle end in a state where the object at infinity is focused is denoted by βrw, a lateral magnification of the lens of the third lens group closest to the image side at the telephoto end in a state where the object at infinity is focused is denoted by βist, and a combined lateral magnification of all lens groups on the image side from the third lens group at the telephoto end in a state where the object at infinity is focused is denoted by βrt, Conditional Expression (7) is satisfied, which is represented by $$1.5 < \{(1-\beta ist) \times \beta rt\}/\{(1-\beta isw) \times \beta rw\} < 2.4 \qquad (7).$$

15. The zoom lens according to claim 1,
wherein in a case where a lateral magnification of the second lens group at the wide angle end in a state where an object at infinity is focused is denoted by β2w, and a lateral magnification of the second lens group at the telephoto end in a state where the object at infinity is focused is denoted by β2t, Conditional Expression (8) is satisfied, which is represented by $$3.5 < \beta 2t/\beta 2w < 5 \qquad (8).$$

16. The zoom lens according to claim 1,
wherein in a case where a lateral magnification of the third lens group at the wide angle end in a state where an object at infinity is focused is denoted by β3w, and a lateral magnification of the third lens group at the telephoto end in a state where the object at infinity is focused is denoted by β3t, Conditional Expression (9) is satisfied, which is represented by $$1.4 < \beta 3t/\beta 3w < 2 \qquad (9).$$

17. The zoom lens according to claim 1,
wherein in a case where a lateral magnification of the second lens group at the wide angle end in a state where an object at infinity is focused is denoted by β2w, a lateral magnification of the second lens group at the telephoto end in a state where the object at infinity is focused is denoted by β2t, a lateral magnification of the third lens group at the wide angle end in a state where the object at infinity is focused is denoted by β3w, and a lateral magnification of the third lens group at the telephoto end in a state where the object at infinity is focused is denoted by β3t, Conditional Expression (10) is satisfied, which is represented by $$2 < (\beta 2t/\beta 2w)/(\beta 3t/\beta 3w) < 3 \tag{10}$$

18. The zoom lens according to claim 2,
wherein the fourth lens group is moved along an optical axis in a case of focusing, and
in a case where a lateral magnification of the third lens group at the wide angle end in a state where an object at infinity is focused is denoted by β3w, a lateral magnification of the third lens group at the telephoto end in a state where the object at infinity is focused is denoted by β3t, a lateral magnification of the fourth lens group at the wide angle end in a state where the object at infinity is focused is denoted by β4w, and a lateral magnification of the fourth lens group at the telephoto end in a state where the object at infinity is focused is denoted by β4t, Conditional Expression (11) is satisfied, which is represented by $$0.8 < (\beta 3t/\beta 3w)/(\beta 4t/\beta 4w) < 1.2 \tag{11}$$

19. The zoom lens according to claim 2,
wherein the fourth lens group is moved along an optical axis in a case of focusing, and
in a case where a lateral magnification of the fourth lens group at the wide angle end in a state where an object at infinity is focused is denoted by β4w, a lateral magnification of the fourth lens group at the telephoto end in a state where the object at infinity is focused is denoted by β4t, a lateral magnification of the fifth lens group at the wide angle end in a state where the object at infinity is focused is denoted by β5w, and a lateral magnification of the fifth lens group at the telephoto end in a state where the object at infinity is focused is denoted by β5t, Conditional Expression (12) is satisfied, which is represented by $$2.5 < \{(1-\beta 4t^2) \times \beta 5t^2\}/\{(1-\beta 4w^2) \times \beta 5w^2\} < 3.5 \tag{12}$$

20. An imaging apparatus comprising:
the zoom lens according to claim 1.

* * * * *